(12) United States Patent
Bafna et al.

(10) Patent No.: US 12,541,431 B2
(45) Date of Patent: Feb. 3, 2026

(54) PARALLEL CHANGE FILE TRACKING IN A DISTRIBUTED FILE SERVER VIRTUAL MACHINE (FSVM) ARCHITECTURE

(71) Applicant: Nutanix, Inc., San Jose, CA (US)

(72) Inventors: Kalpesh Ashok Bafna, Milpitas, CA (US); Jayapaul Paul, Bangalore (IN); Abhinav Radheshyam Tiwari, Bangalore (IN); Sanjeev Manohar Bagewadi, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/129,425

(22) Filed: Dec. 21, 2020

(65) Prior Publication Data

US 2021/0200641 A1    Jul. 1, 2021

Related U.S. Application Data

(60) Provisional application No. 62/955,983, filed on Dec. 31, 2019.

(51) Int. Cl.
*G06F 16/00* (2019.01)
*G06F 9/455* (2018.01)
*G06F 11/14* (2006.01)
*G06F 16/17* (2019.01)
(Continued)

(52) U.S. Cl.
CPC ...... *G06F 11/1451* (2013.01); *G06F 9/45558* (2013.01); *G06F 11/1464* (2013.01); *G06F 11/1469* (2013.01); *G06F 16/1734* (2019.01); *G06F 16/1824* (2019.01);
(Continued)

(58) Field of Classification Search
None
See application file for complete search history.

(56) References Cited

U.S. PATENT DOCUMENTS 5,095,421 A    3/1992  Freund
5,276,867 A    1/1994  Kenley et al.
5,317,728 A    5/1994  Tevis et al.
(Continued)

FOREIGN PATENT DOCUMENTS

CN    103746997 A    4/2014
CN    105100210 A    11/2015
(Continued)

OTHER PUBLICATIONS

US 10,514,899 B2, 12/2019, Bafna et al. (withdrawn)
(Continued)

*Primary Examiner* — Farhan M Syed
(74) *Attorney, Agent, or Firm* — Stoel Rives LLP

(57) ABSTRACT

System and method for implementing parallel Change File Tracking (CFT) between a distributed File Server Virtual Machine (FSVM) system and a scale-out backup system using underlying snapshot technology. The FSVM system executes efficient assignments of backup streams between worker nodes of the backup system and computing nodes of the FSVM system based on the number of available worker nodes at the backup system. The assignment of backup streams allows for parallel processing of incremental backup data based on successive data file snapshots. The parallel incremental backup may, for example, be per node, per share, or per data size across nodes or shares.

26 Claims, 18 Drawing Sheets

(51) Int. Cl.
*G06F 16/182* (2019.01)
*G06F 16/188* (2019.01)
(52) U.S. Cl.
CPC .. *G06F 16/188* (2019.01); *G06F 2009/45595* (2013.01); *G06F 2201/84* (2013.01)

(56) References Cited

U.S. PATENT DOCUMENTS

| | | | |
|---|---|---|---|
| 5,533,036 A | 7/1996 | Blake et al. |
| 5,596,754 A | 1/1997 | Lomet |
| 5,664,144 A | 9/1997 | Yanai et al. |
| 5,870,555 A | 2/1999 | Pruett et al. |
| 5,873,085 A | 2/1999 | Enoki et al. |
| 5,920,872 A | 7/1999 | Grewell et al. |
| 5,924,096 A | 7/1999 | Draper et al. |
| 6,055,543 A | 4/2000 | Christensen et al. |
| 6,085,234 A | 7/2000 | Pitts et al. |
| 6,098,066 A | 8/2000 | Snow et al. |
| 6,101,508 A | 8/2000 | Wolff |
| 6,108,654 A | 8/2000 | Chan et al. |
| 6,144,983 A | 11/2000 | Klots et al. |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,412,034 B1 | 6/2002 | Chan |
| 6,442,602 B1 | 8/2002 | Choudhry |
| 6,473,849 B1 | 10/2002 | Keller et al. |
| 6,539,381 B1 | 3/2003 | Prasad et al. |
| 6,539,446 B1 | 3/2003 | Chan |
| 6,944,785 B2 | 9/2005 | Gadir et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman et al. |
| 7,337,290 B2 | 2/2008 | Rajamani et al. |
| 7,356,679 B1 | 4/2008 | Le et al. |
| 7,366,738 B2 | 4/2008 | Yorke et al. |
| 7,383,463 B2 | 6/2008 | Hayden et al. |
| 7,409,511 B2 | 8/2008 | Edwards et al. |
| 7,526,622 B1 | 4/2009 | Bonwick et al. |
| 7,571,290 B1 | 8/2009 | Ranade et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,877,463 B2 | 1/2011 | Lentini et al. |
| 7,890,529 B1 | 2/2011 | Srinivasan et al. |
| 7,937,453 B1 | 5/2011 | Hayden et al. |
| 8,095,810 B2 | 1/2012 | Matsuzawa et al. |
| 8,095,931 B1 | 1/2012 | Chen et al. |
| 8,145,947 B1 | 3/2012 | Hayden et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty et al. |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,595,595 B1 | 11/2013 | Grcanac et al. |
| 8,601,473 B1 | 12/2013 | Aron et al. |
| 8,620,870 B2 | 12/2013 | Dwarampudi et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,725,679 B2 | 5/2014 | Nair et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,812,566 B2 | 8/2014 | Aizman et al. |
| 8,838,923 B2 | 9/2014 | Prahlad et al. |
| 8,850,130 B1 | 9/2014 | Aron et al. |
| 8,863,124 B1 | 10/2014 | Aron |
| 8,914,429 B2 | 12/2014 | Pitts |
| 8,935,563 B1 | 1/2015 | Rajaa et al. |
| 8,943,203 B1 | 1/2015 | Lent et al. |
| 8,949,557 B2 | 2/2015 | Kamei et al. |
| 8,966,188 B1 | 2/2015 | Bardale |
| 8,983,952 B1* | 3/2015 | Zhang ............ G06F 7/00 707/736 |
| 8,996,783 B2 | 3/2015 | Huang et al. |
| 9,009,106 B1 | 4/2015 | Aron et al. |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,171,019 B1* | 10/2015 | Donlan ............ G06F 16/2343 |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,229,850 B1 | 1/2016 | Wang et al. |
| 9,244,674 B2 | 1/2016 | Waterman et al. |
| 9,244,969 B1 | 1/2016 | Love et al. |
| 9,250,823 B1 | 2/2016 | Kamat et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,268,947 B1 | 2/2016 | Jarlstrom et al. |
| 9,274,817 B1 | 3/2016 | Fan et al. |
| 9,286,298 B1 | 3/2016 | Gillett, Jr. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,482 B2* | 8/2016 | Varadharajan ...... G06F 11/1451 |
| 9,405,566 B2 | 8/2016 | Chawla et al. |
| 9,411,628 B2 | 8/2016 | Bezbaruah et al. |
| 9,430,646 B1 | 8/2016 | Mushtaq et al. |
| 9,448,887 B1 | 9/2016 | Ben Dayan et al. |
| 9,465,953 B2 | 10/2016 | Sharma et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,590,843 B2 | 3/2017 | Cui et al. |
| 9,600,307 B1 | 3/2017 | Pulkayath et al. |
| 9,602,341 B1 | 3/2017 | Degwekar et al. |
| 9,613,064 B1 | 4/2017 | Chou et al. |
| 9,619,257 B1 | 4/2017 | Aron et al. |
| 9,632,892 B1 | 4/2017 | Sledz et al. |
| 9,634,990 B2 | 4/2017 | Lee |
| 9,639,428 B1 | 5/2017 | Boda et al. |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui et al. |
| 9,740,436 B2 | 8/2017 | Fiebrich-kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,760,447 B2 | 9/2017 | Durge et al. |
| 9,772,866 B1 | 9/2017 | Aron et al. |
| 9,798,486 B1 | 10/2017 | Singh |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,922,201 B2 | 3/2018 | Von Muhlen et al. |
| 9,940,154 B2 | 4/2018 | Ramani et al. |

(56) References Cited

U.S. PATENT DOCUMENTS

| | | |
|---|---|---|
| 9,940,460 B1 | 4/2018 | Derbeko et al. |
| 9,946,573 B2 | 4/2018 | Mcdermott |
| 9,959,054 B1 | 5/2018 | Vankamamidi et al. |
| 9,961,145 B1 | 5/2018 | Faibish et al. |
| 9,965,357 B1 | 5/2018 | Earl et al. |
| 10,009,215 B1 | 6/2018 | Shorey |
| 10,019,159 B2 | 7/2018 | Wires et al. |
| 10,050,862 B2 | 8/2018 | Nambiar et al. |
| 10,061,660 B1 | 8/2018 | Jagannatha et al. |
| 10,069,909 B1 * | 9/2018 | Chopra ............... G06F 11/1464 |
| 10,078,583 B1 | 9/2018 | Wallace |
| 10,083,022 B2 | 9/2018 | Fukui et al. |
| 10,084,873 B2 | 9/2018 | Domnemann |
| 10,095,506 B2 | 10/2018 | Gopalapura Venkatesh et al. |
| 10,101,989 B2 | 10/2018 | Sinha et al. |
| 10,108,502 B1 | 10/2018 | Gopinath et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,262,023 B1 | 4/2019 | Kuang et al. |
| 10,311,153 B2 | 6/2019 | Mason, Jr. et al. |
| 10,333,901 B1 | 6/2019 | Bauman et al. |
| 10,362,092 B1 | 7/2019 | Parthasarathy |
| 10,367,753 B2 | 7/2019 | Schultze et al. |
| 10,379,759 B2 | 8/2019 | Bhardwaj et al. |
| 10,382,963 B2 | 8/2019 | Jassal et al. |
| 10,394,412 B2 | 8/2019 | Torman et al. |
| 10,394,547 B2 | 8/2019 | Fukui et al. |
| 10,409,653 B2 * | 9/2019 | von Muhlen ............ G06F 16/00 |
| 10,419,426 B2 | 9/2019 | Bakshan et al. |
| 10,452,456 B2 * | 10/2019 | von Muhlen ......... G06F 16/183 |
| 10,496,321 B2 * | 12/2019 | Varadharajan .......... G06F 3/067 |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,542,049 B2 | 1/2020 | Cui et al. |
| 10,552,266 B1 | 2/2020 | Kogtev et al. |
| 10,572,317 B2 * | 2/2020 | von Muhlen ....... G06F 16/1873 |
| 10,579,443 B2 * | 3/2020 | von Muhlen ....... G06F 16/1774 |
| 10,635,544 B1 | 4/2020 | Kitson |
| 10,642,507 B2 | 5/2020 | Gupta et al. |
| 10,642,800 B2 | 5/2020 | Gummaraju et al. |
| 10,678,651 B1 | 6/2020 | Borodin et al. |
| 10,705,889 B2 * | 7/2020 | von Muhlen .......... G06Q 10/10 |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,789,138 B2 | 9/2020 | Wang et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh et al. |
| 10,949,387 B1 | 3/2021 | Grider |
| 11,010,011 B2 | 5/2021 | Varadharajan et al. |
| 11,025,626 B1 | 6/2021 | Todd et al. |
| 11,074,138 B2 * | 7/2021 | Alonzo ............... H04L 67/1095 |
| 11,086,826 B2 | 8/2021 | Thummala et al. |
| 11,106,442 B1 | 8/2021 | Gupta et al. |
| 11,106,447 B2 | 8/2021 | Gupta et al. |
| 11,144,407 B1 | 10/2021 | Shankar et al. |
| 11,194,680 B2 | 12/2021 | Konka et al. |
| 11,204,710 B2 * | 12/2021 | Varadharajan ........ G06F 3/0643 |
| 11,218,418 B2 | 1/2022 | Gupta et al. |
| 11,281,484 B2 | 3/2022 | Bafna et al. |
| 11,288,239 B2 | 3/2022 | Bafna |
| 11,294,777 B2 | 4/2022 | Venkatesh et al. |
| 11,310,286 B2 | 4/2022 | Cui et al. |
| 11,474,796 B1 * | 10/2022 | Mather ..................... G06F 8/77 |
| 11,489,839 B2 | 11/2022 | Sankavaram et al. |
| 11,537,384 B2 | 12/2022 | Sharpe et al. |
| 11,544,049 B2 | 1/2023 | Gopalapura Venkatesh et al. |
| 11,546,337 B2 | 1/2023 | Le et al. |
| 11,550,557 B2 | 1/2023 | Sharpe et al. |
| 11,550,558 B2 | 1/2023 | Bafna et al. |
| 11,550,559 B2 | 1/2023 | Bafna et al. |
| 11,562,034 B2 | 1/2023 | Arikatla et al. |
| 11,563,800 B1 | 1/2023 | Trendafilov et al. |
| 11,568,073 B2 | 1/2023 | Nair et al. |
| 11,579,861 B2 | 2/2023 | Sharpe et al. |
| 11,609,826 B2 * | 3/2023 | Alonzo ................... H04L 67/56 |
| 11,645,065 B2 | 5/2023 | Gupta et al. |
| 11,669,320 B2 | 6/2023 | Gopalapura Venkatesh et al. |
| 11,675,746 B2 | 6/2023 | Thummala et al. |
| 11,775,397 B2 | 10/2023 | Venkatesh et al. |
| 11,922,157 B2 | 3/2024 | Sharpe et al. |
| 11,922,203 B2 | 3/2024 | Bafna et al. |
| 11,947,952 B2 | 4/2024 | Gopalapura Venkatesh et al. |
| 11,954,078 B2 | 4/2024 | Bafna et al. |
| 11,966,729 B2 | 4/2024 | Sharpe et al. |
| 11,966,730 B2 | 4/2024 | Sharpe et al. |
| 12,014,166 B2 | 6/2024 | Gupta et al. |
| 12,131,192 B2 | 10/2024 | Venkatesh et al. |
| 12,135,963 B2 | 11/2024 | Sharpe et al. |
| 12,153,913 B2 | 11/2024 | Bafna et al. |
| 2001/0047400 A1 | 11/2001 | Coates et al. |
| 2002/0069196 A1 | 6/2002 | Betros et al. |
| 2002/0120763 A1 | 8/2002 | Miloushev et al. |
| 2003/0033308 A1 | 2/2003 | Patel et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0111608 A1 | 6/2004 | Oom et al. |
| 2004/0133606 A1 | 7/2004 | Miloushev et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0120160 A1 | 6/2005 | Plouffe et al. |
| 2005/0120180 A1 | 6/2005 | Schorbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2006/0010227 A1 | 1/2006 | Atluri |
| 2006/0047685 A1 | 3/2006 | Dearing et al. |
| 2006/0080445 A1 | 4/2006 | Chang et al. |
| 2006/0112222 A1 | 5/2006 | Barrall |
| 2006/0167921 A1 | 7/2006 | Grebus et al. |
| 2006/0206901 A1 | 9/2006 | Chan |
| 2006/0224918 A1 | 10/2006 | Koike |
| 2006/0225065 A1 | 10/2006 | Chandhok et al. |
| 2006/0253856 A1 | 11/2006 | Hu et al. |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0041556 A1 | 2/2007 | Rana et al. |
| 2007/0055703 A1 | 3/2007 | Zimran et al. |
| 2007/0100905 A1 | 5/2007 | Masters et al. |
| 2007/0171921 A1 | 7/2007 | Wookey et al. |
| 2007/0300220 A1 | 12/2007 | Seliger et al. |
| 2008/0040483 A1 | 2/2008 | Nakatani et al. |
| 2008/0059174 A1 | 3/2008 | Lim |
| 2008/0071804 A1 | 3/2008 | Gunda |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0168154 A1 | 7/2008 | Skyrm et al. |
| 2008/0189468 A1 | 8/2008 | Schmidt et al. |
| 2008/0195827 A1 | 8/2008 | Saika |
| 2008/0201414 A1 | 8/2008 | Amir et al. |
| 2008/0201457 A1 | 8/2008 | London |

(56) References Cited

U.S. PATENT DOCUMENTS

| | | |
|---|---|---|
| 2008/0263113 A1 | 10/2008 | Krishnaiyer et al. |
| 2008/0270677 A1 | 10/2008 | Kolakowski |
| 2008/0271017 A1 | 10/2008 | Herington |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0150885 A1 | 6/2009 | Safari et al. |
| 2009/0158082 A1 | 6/2009 | Jain et al. |
| 2009/0171971 A1 | 7/2009 | Goddard et al. |
| 2009/0182860 A1 | 7/2009 | Hwang et al. |
| 2009/0193272 A1 | 7/2009 | Matsuzawa et al. |
| 2009/0216975 A1 | 8/2009 | Halperin et al. |
| 2009/0248847 A1 | 10/2009 | Sutoh et al. |
| 2009/0248870 A1 | 10/2009 | Kamei et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0070725 A1 | 3/2010 | Prahlad et al. |
| 2010/0082718 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2010/0299377 A1 | 11/2010 | Rimer et al. |
| 2010/0306256 A1 | 12/2010 | Blackman |
| 2011/0022694 A1 | 1/2011 | Dalal et al. |
| 2011/0022695 A1 | 1/2011 | Dalal et al. |
| 2011/0022812 A1 | 1/2011 | van der Linden et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0153561 A1 | 6/2011 | Sawdon et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0238949 A1 | 9/2011 | Archer et al. |
| 2011/0239039 A1 | 9/2011 | Dieffenbach et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0296069 A1 | 12/2011 | Tarta et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054738 A1 | 3/2012 | Arcese et al. |
| 2012/0081395 A1 | 4/2012 | Adi et al. |
| 2012/0084381 A1 | 4/2012 | Alladi et al. |
| 2012/0151249 A1 | 6/2012 | Swan et al. |
| 2012/0166866 A1 | 6/2012 | Rao et al. |
| 2012/0185437 A1 | 7/2012 | Pavlov et al. |
| 2012/0209983 A1 | 8/2012 | Bronner et al. |
| 2012/0210066 A1 | 8/2012 | Joshi et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0290630 A1 | 11/2012 | Aizman et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2012/0331119 A1 | 12/2012 | Bose et al. |
| 2013/0046740 A1 | 2/2013 | Li et al. |
| 2013/0047160 A1 | 2/2013 | Conover |
| 2013/0054979 A1 | 2/2013 | Basmov et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamel et al. |
| 2013/0117744 A1 | 5/2013 | Klein et al. |
| 2013/0132674 A1 | 5/2013 | Sundrani |
| 2013/0151888 A1 | 6/2013 | Bhattiprolu et al. |
| 2013/0152085 A1 | 6/2013 | D'Amore et al. |
| 2013/0174165 A1 | 7/2013 | Chopra |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0282994 A1 | 10/2013 | Wires et al. |
| 2013/0283287 A1 | 10/2013 | Cooper et al. |
| 2013/0297869 A1 | 11/2013 | Mills et al. |
| 2014/0006465 A1 | 1/2014 | Davis et al. |
| 2014/0006708 A1 | 1/2014 | Huynh et al. |
| 2014/0025796 A1 | 1/2014 | Vibhor et al. |
| 2014/0059392 A1 | 2/2014 | Ren et al. |
| 2014/0075029 A1 | 3/2014 | Lipchuk et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164449 A1 | 6/2014 | Kim et al. |
| 2014/0173199 A1 | 6/2014 | Gupta et al. |
| 2014/0181048 A1* | 6/2014 | Varadharajan .......... G06F 3/065 707/661 |
| 2014/0181116 A1 | 6/2014 | Wang |
| 2014/0181438 A1* | 6/2014 | Varadharajan ...... G06F 11/2094 711/162 |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365549 A1 | 12/2014 | Jenkins |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0058475 A1 | 2/2015 | Earl et al. |
| 2015/0074536 A1 | 3/2015 | Varadharajan et al. |

(56) References Cited

U.S. PATENT DOCUMENTS

| | | |
|---|---|---|
| 2015/0074659 A1 | 3/2015 | Madsen et al. |
| 2015/0081644 A1 | 3/2015 | Pitts |
| 2015/0095597 A1 | 4/2015 | Ayanam et al. |
| 2015/0095788 A1 | 4/2015 | Thiele et al. |
| 2015/0106802 A1 | 4/2015 | Ivanov et al. |
| 2015/0120925 A1 | 4/2015 | Das |
| 2015/0142745 A1* | 5/2015 | Tekade .................. H04L 67/10 |
| | | 707/646 |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0186635 A1 | 7/2015 | Nakhjiri et al. |
| 2015/0193144 A1 | 7/2015 | Bilas et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0248402 A1 | 9/2015 | Patterson, III et al. |
| 2015/0256617 A1 | 9/2015 | Klose et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309825 A1 | 10/2015 | Farkas et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0356125 A1 | 12/2015 | Golander et al. |
| 2015/0378761 A1 | 12/2015 | Sevigny et al. |
| 2015/0378853 A1 | 12/2015 | Sevigny et al. |
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0100016 A1 | 4/2016 | Mu et al. |
| 2016/0110214 A1 | 4/2016 | Vincent et al. |
| 2016/0110267 A1 | 4/2016 | Earl et al. |
| 2016/0124663 A1 | 5/2016 | Mitkar et al. |
| 2016/0124865 A1 | 5/2016 | Jain et al. |
| 2016/0127307 A1 | 5/2016 | Jain et al. |
| 2016/0142745 A1 | 5/2016 | Tekade et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0180107 A1 | 6/2016 | Panchbudhe et al. |
| 2016/0188232 A1 | 6/2016 | Ramachandran et al. |
| 2016/0188407 A1 | 6/2016 | Bronnikov et al. |
| 2016/0202918 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0306558 A1* | 10/2016 | Varadharajan ......... G06F 3/0619 |
| 2016/0306751 A1 | 10/2016 | Amarendran et al. |
| 2016/0314046 A1 | 10/2016 | Kumarasamy |
| 2016/0316003 A1 | 10/2016 | Snider et al. |
| 2016/0328007 A1 | 11/2016 | Aranjani et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0371020 A1 | 12/2016 | Sarkar et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039082 A1 | 2/2017 | Ganesan et al. |
| 2017/0039218 A1 | 2/2017 | Prahlad et al. |
| 2017/0041296 A1* | 2/2017 | Ford ...................... G06F 21/64 |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0091262 A1 | 3/2017 | Beard et al. |
| 2017/0109184 A1 | 4/2017 | Ramani et al. |
| 2017/0123890 A1 | 5/2017 | Haridas et al. |
| 2017/0155691 A1 | 6/2017 | Knauft et al. |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1* | 8/2017 | Sharpe ................ H04L 67/1097 |
| | | 707/827 |
| 2017/0235950 A1 | 8/2017 | Gopalapura Venkatesh et al. |
| 2017/0242599 A1 | 8/2017 | Patnaik et al. |
| 2017/0242871 A1 | 8/2017 | Kilaru et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1* | 10/2017 | Redko ................... G06F 16/128 |
| 2017/0302589 A1 | 10/2017 | Leafe et al. |
| 2017/0302731 A1 | 10/2017 | Cui |
| 2017/0329554 A1 | 11/2017 | Voigt et al. |
| 2018/0004766 A1 | 1/2018 | Darling |
| 2018/0062993 A1 | 3/2018 | Wu et al. |
| 2018/0107838 A1 | 4/2018 | Amarendran et al. |
| 2018/0129426 A1 | 5/2018 | Aron et al. |
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157880 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0181266 A1* | 6/2018 | von Muhlen ........... G06F 16/00 |
| 2018/0181448 A1* | 6/2018 | von Muhlen .......... G06Q 10/06 |
| 2018/0181449 A1* | 6/2018 | von Muhlen ........... G06F 9/545 |
| 2018/0181587 A1* | 6/2018 | von Muhlen ......... G06F 40/169 |
| 2018/0181723 A1* | 6/2018 | von Muhlen ....... G06F 16/1774 |
| 2018/0196719 A1 | 7/2018 | Glass |
| 2018/0205787 A1 | 7/2018 | Ben Dayan et al. |
| 2018/0225204 A1 | 8/2018 | Choudhari et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi et al. |
| 2019/0079747 A1 | 3/2019 | Sinha et al. |
| 2019/0087279 A1* | 3/2019 | Kumar ................ G06F 11/1469 |
| 2019/0087280 A1* | 3/2019 | Kumar ................ G06F 11/2048 |

(56) References Cited

U.S. PATENT DOCUMENTS

| | | | |
|---|---|---|---|
| 2019/0087281 A1* | 3/2019 | Kumar | G06F 11/2094 |
| 2019/0087282 A1* | 3/2019 | Kumar | G06F 16/14 |
| 2019/0087285 A1* | 3/2019 | Kumar | G06F 16/182 |
| 2019/0087286 A1* | 3/2019 | Kumar | G06F 11/2023 |
| 2019/0129808 A1 | 5/2019 | Acharya et al. | |
| 2019/0196718 A1 | 6/2019 | Pai et al. | |
| 2019/0207925 A1 | 7/2019 | Anantha Padmanaban et al. | |
| 2019/0286330 A1* | 9/2019 | Varadharajan | G06F 11/00 |
| 2019/0332683 A1 | 10/2019 | Thummala et al. | |
| 2019/0339883 A1 | 11/2019 | Aron et al. | |
| 2020/0007530 A1 | 1/2020 | Mohamad Abdul et al. | |
| 2020/0034069 A1 | 1/2020 | Batra et al. | |
| 2020/0036647 A1 | 1/2020 | Gupta et al. | |
| 2020/0042537 A1 | 2/2020 | Kaushik et al. | |
| 2020/0050522 A1 | 2/2020 | Coleman et al. | |
| 2020/0081704 A1 | 3/2020 | Bafna et al. | |
| 2020/0081733 A1 | 3/2020 | Buck et al. | |
| 2020/0125426 A1* | 4/2020 | von Muhlen | G06F 16/1794 |
| 2020/0125580 A1 | 4/2020 | Shao | |
| 2020/0137157 A1* | 4/2020 | Joseph | H04L 69/40 |
| 2020/0274869 A1 | 8/2020 | Tahenakos et al. | |
| 2020/0387575 A1 | 12/2020 | Palekar et al. | |
| 2021/0049240 A1* | 2/2021 | Earl | G06F 9/45558 |
| 2021/0081358 A1 | 3/2021 | Khurana et al. | |
| 2021/0141630 A1 | 5/2021 | Sharpe | |
| 2021/0165759 A1 | 6/2021 | Bar-Nissan et al. | |
| 2021/0200641 A1 | 7/2021 | Bafna et al. | |
| 2021/0224233 A1 | 7/2021 | Bafna et al. | |
| 2021/0247973 A1 | 8/2021 | Gupta et al. | |
| 2021/0334178 A1 | 10/2021 | Yang et al. | |
| 2021/0344772 A1 | 11/2021 | Arikatla et al. | |
| 2021/0349859 A1 | 11/2021 | Bafna et al. | |
| 2021/0365257 A1 | 11/2021 | Gopalapura Venkatesh et al. | |
| 2021/0382636 A1 | 12/2021 | Perumal et al. | |
| 2021/0390080 A1* | 12/2021 | Tripathi | G06F 21/62 |
| 2021/0397587 A1 | 12/2021 | Thummala et al. | |
| 2021/0406136 A1 | 12/2021 | Venkatesh et al. | |
| 2022/0004377 A1 | 1/2022 | Sharpe et al. | |
| 2022/0147342 A1 | 5/2022 | Sharpe et al. | |
| 2022/0147495 A1 | 5/2022 | Sharpe et al. | |
| 2022/0155964 A1* | 5/2022 | Varadharajan | G06F 3/0643 |
| 2022/0156107 A1 | 5/2022 | Bafna et al. | |
| 2022/0229687 A1 | 7/2022 | Singhal et al. | |
| 2022/0300335 A1 | 9/2022 | Venkatesh et al. | |
| 2022/0350591 A1 | 11/2022 | Bafna et al. | |
| 2022/0350592 A1 | 11/2022 | Gopalapura Venkatesh et al. | |
| 2023/0185944 A1 | 6/2023 | Nair et al. | |
| 2023/0237102 A1 | 7/2023 | Arikatla et al. | |
| 2023/0289170 A1 | 9/2023 | Sharpe et al. | |
| 2023/0325173 A1 | 10/2023 | Gupta et al. | |
| 2024/0103985 A1 | 3/2024 | Venkatesh et al. | |

FOREIGN PATENT DOCUMENTS

| | | |
|---|---|---|
| CN | 106357744 A | 1/2017 |
| CN | 110516005 A | 11/2019 |
| CN | 110519112 A | 11/2019 |
| CN | 110569269 A | 12/2019 |
| CN | 111259376 A | 6/2020 |
| CN | 109076126 B | 9/2020 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

US 11,048,595 B2, 06/2021, Venkatesh et al. (withdrawn)
U.S. Appl. No. 17/865,907 titled "Virtualized File Server Deployment" filed Jul. 15, 2022.
U.S. Appl. No. 17/866,225 titled Virtualized File Server Disaster Recovery filed Jul. 15, 2022.
"Citrix XenDesktop 7.1 on Microsoft Hyper-V Server 2012 R2 on Nutanix Virtual Computing Platform", Citrix APAC Solutions, Jun. 25, 2014, pp. 1-94.
Jeffrey, Hemmes, et al., "Cacheable Decentralized Groups for Grid Resource Access Control", 2006 7th IEEE/ACM International Conference on Grid Computing Department of Computer Science and Engineering, University of Notre Dame, Sep. 2006, pp. 192-199.
Lye, Ben, "Implementing Windows Server 2008 FileSystem Quotas", Nov. 19, 2009, pp. 1-17.
U.S. Appl. No. 17/580,555 titled "Virtualized File Server" filed Jan. 20, 2022.
U.S. Appl. No. 17/581,418 titled "File Server Managers and Systems for Managing Virtualized File Servers" filed Jan. 21, 2022.
U.S. Appl. No. 17/585,403 titled "Virtualized File Server Smart Data Ingestion" filed Jan. 27, 2022.
U.S. Appl. No. 17/648,796 titled "Virtualized Server Systems and Methods Including Scaling of File System Virtual Machines" filed Jan. 24, 2022.
Ruth, Paul "Autonomic Live Adaption of Virtual Computational Environments in a Multi-Domain Infrastructure"; 2006 IEEE International Conference on Autonomic Computing, 2006, pp. 5-14.
U.S. Appl. No. 17/302,343 titled "Disaster Recovery for Distributed File Servers, Including Metadata Fixers" filed Apr. 30, 2021, pp. all.
U.S. Appl. No. 17/238,001 titled "Cloning Virtualized File Servers" filed Apr. 22, 2021, pp. all.
U.S. Appl. No. 17/364,453 titled "Virtualized Server Systems and Methods Including Domain Joining Techniques" filed Jun. 30, 2021, pp. all.
"Tech TopX: AHV One Click Upgrade", Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6gZM Dec. 8, 2015, pp. all.
Bhardwaj, Rishi "The Wonderful World of Distributed Systems and the Art of Metadata Management", Nutanix, Inc. https://www.nutanix.com/blog/the-wonderful-world-of-distributed-systems-and-metadata-management pp. 1-8.
Hogan, Cormac "New updates from Nutanix—NOS 3.0 and NX-3000", https://cormachogan.com/2012/12/20/new-from-nutanix-nos3-0-nx-3000/ Dec. 20, 2012, pp. 1-7.
Leibovici, Andre "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor.too/ Jul. 31, 2014, pp. 1-4.
U.S. Appl. No. 17/448,315 titled "Virtualized File Server" filed Sep. 21, 2021, pp. all.
VMware vSphere VMFS "Technical Overview and Best Practices", a VMware Technical White Paper updated for VMware vSphere 5.1, Version 3.0; Nov. 27, 2012, pp. all.
"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, pp. 34.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.
"Understanding Multipathing and Failover", vSphere Storage; VMware vSphere 7.0; VMware ESXi 7.0; vCenter Server 7.0, https://docs.vmware.com/en/VMware-vSphere/7.0/vsphere-esxi-vcenter-server-702-storage-guide.pdf, Jun. 25, 2021, pp. 234-268.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, pp. 1-2.
"VMware VSAN 7.0 Release Notes", VMware; https://docs.vmware.com/en/VMware-vSphere/7.0/m/vmware-vsan-70-release-notes.html, Mar. 8, 2021, pp. 1-12.

(56) References Cited

OTHER PUBLICATIONS

"VSAN 7.0 U2 Proof of Concept Guide", VMwareStorage; https://images.core.vmware.com/sites/default/files/resource/vsan_70_u2_proof_of_concept_guide_noindex.pdf, printed May 18, 2021, Apr. 2021, pp. 1-267.

"VSAN Health Service—File Service—File Server Health (77165)", VMware, Knowledge Base; https://kb.vmware.com/s/article/77165, May 15, 2021, pp. 1-5.

"VSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.

"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.

Rajendran, Cedric "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.

Cano, Ignacio et al. "Curator: Self-Managing Storage for Enterprise Clusters"; University of Washington; published Mar. 2017; pp. all.

NetApp; "Clustered Data Ontap 8.2 File Access Management Guide for CIFS"; Feb. 2014 (year 2014); pp. all.

U.S. Appl. No. 15/829,602 entitled "Handling Permissions for Virtualized File Servers", filed Dec. 1, 2017, pp. all.

Young-Woo Jung et al. "Standard-Based Virtual Infrastructure Resource Management for Distributed and Heterogeneous Servers"; Feb. 15, 2009; ICACT; pp. all.

U.S. Appl. No. 15/966,943 titled "Virtualized Server Systems and Methods Including Domain Joining Techniques" filed Apr. 30, 2018, pp. all.

U.S. Appl. No. 16/687,327, titled "Virtualized File Server Rolling Upgrade", filed Nov. 19, 2019, pp. all.

U.S. Appl. No. 16/144,637, titled "Computing Node Clusters Supporting Network Segmentation", filed Sep. 27, 2018, pp. all.

Dell EMC; Dell EMC Isilon OneFS Operating System; Scale-out NAS to maximize the data capital and business value of your unstructured data; 2020, pp. all.

Dell EMC; White Paper; Dell EMC Isilon OneFS Operating System; Powering the Isilon Scale-Out Storage Platform; Dec. 2019, pp. all.

EMC Isilon OneFS Operating System; Powering scale-out storage for the new world of Big Data in the enterprise; www.EMC.com; captured Feb. 2020, pp. all.

Isilon OneFS, Version 8.0.1; Web Administration Guide; Published Oct. 2016, pp. all.

U.S. Appl. No. 15/833,255, entitled "Cloning Virtualized File Servers", filed Dec. 6, 2017, pp. all.

U.S. Appl. No. 15/833,391, entitled "Virtualized Server Systems and Methods Including Scaling of File System Virtual Machines", filed Dec. 6, 2017, pp. all.

U.S. Appl. No. 15/422,220, entitled " Virtualized File Server" filed Feb. 1, 2017, pp. all.

U.S. Appl. No. 15/829,340, entitled "Configuring Network Segmentation for a Virtualization Environment", filed Dec. 1, 2017, pp. all.

U.S. Appl. No. 15/829,731, entitled "Transparent Referrals for Distributed File Servers", filed Dec. 1, 2017, pp. all.

U.S. Appl. No. 15/829,781, entitled "Virtualized Server Systems and Methods Including Load Balancing for Virtualized File Servers", filed Dec. 1, 2017, pp. all.

U.S. Appl. No. 15/832,310 entitled "Disaster Recovery for Distributed File Servers, Including Metadata Fixers", filed Dec. 5, 2017, pp. all.

U.S. Appl. No. 16/140,250 titled "Virtualized File Server Data Sharing" filed Sep. 24, 2018, pp. all.

U.S. Appl. No. 16/160,618 titled "Virtualized File Server Backup to Cloud" filed Oct. 15, 2018, pp. all.

U.S. Appl. No. 16/942,929 titled "Method Using Access Information in a Distributed File Server Virtual Machine (FSVM) Architecture, Including Web Access"; filed Jul. 30, 2020, pp. all.

U.S. Appl. No. 16/944,323 titled "Actions Based on File Tagging in a Distributed File Server Virtual Machine (FSVM) Environment", filed Jul. 31, 2020, pp. all.

U.S. Appl. No. 17/091,758 titled "Virtualized File Server Distribution Across Clusters", filed Nov. 6, 2020, pp. all.

"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html Captured Sep. 19, 2019, pp. all.

"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html Captured Sep. 19, 2019, pp. all.

"How to troubleshoot the 'Autolocation' feature in Clustered Data ONTAP", NetApp https://kb.netapp.com/app/answers/answer_view/a_id/1030857/loc/en_US#_highlight Captured Sep. 19, 2019, pp. all.

"How to Troubleshoot the 'Autolocation' feature in Clustered Data ONTAP—Results", NetApp https://kb.netapp.com/app/results/kw/autolocation/ Captured Sep. 19, 2019, pp. all.

"Hybrid Cloud Storage with Cloudian HyperStore and Amazon S3", Cloudian Inc.; www.cloudian.com 2014, pp. all.

"Improving client response time by providing SMB automatic node referrals with Auto Location", NetApp https://library.netapp.com/ecmdocs/ECMP1196891/html/GUID-0A5772A4-A6D7-4A00-AC2A-92B868C5B385.html Captured Sep. 19, 2019, pp. all.

"Managing Workloads", NetApp https://docs.netapp.com/ontap-9/index.jsp?topic=%2Fcom.netapp.doc.pow-perf-mon%2FGUID-13D35FC5-AF37-4BBO-8A8E-B10841451A16.html captured Sep. 19, 2019, pp. all.

"Nutanix AFS—Introduction & Steps for Setting Up", Retrieved from https ://virtualbuilding blocks. com/2018/01/03/nutanix-afs-introduction-steps-for-setting-up/ (Year: 2018), Jan. 3, 2018, pp. 1-23.

"Protect Your Data With Netapp Element Software", Solution Brief; NetApp, 2018, pp. all.

Kemp, Erik "NetApp SolidFire SnapMirror Architecture and Configuration", Technical Report, NetApp, Dec. 2017, pp. all.

Kleyman, Bill "How Cloud Computing Changes Storage Tiering", https://www.datacenterknowledge.com captured Jun. 4, 2019, Nov. 12, 2015, pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven, "The Nutanix Bible" (Jan. 12, 2016), from https://nutanixbible.com/ pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Sep. 4, 2015), from https:/nutanixbible.com/ pp. all.

Poitras, Steven. "The Nutanix Bible" (Jan. 7, 2015), from http:/stevenpoitras.com/the-nutanix-bible/ (Publication date based on indicated capture date by Archive.org; first publication date unknown), pp. all.

Poitras, Steven. "The Nutanix Bible" (Jan. 8, 2019), from https://nutanixbible.com/ pp. all.

(56) References Cited

OTHER PUBLICATIONS

Poitras, Steven. "The Nutanix Bible" (Jun. 8, 2017), from https://nutanixbible.com/ pp. all.
Poitras, Steven. "The Nutanix Bible" (Jun. 9, 2015), from http://stevenpoitras.com/the-nutanix-bible/ (Publication date based on indicated capture date by Archive.org; first publication date unknown), pp. all.
Poitras, Steven. "The Nutanix Bible" (Jun. 9, 2016), from https://nutanixbible.com/ pp. all.
Poitras, Steven. "The Nutanix Bible" (Jul. 25, 2019), from https://nutanixbible.com/ pp. all.
Poitras, Steven. "The Nutanix Bible" (Sep. 17, 2019), from https://nutanixbible.com/ pp. all.
Poitras, Steven. "The Nutanix Bible" (Mar. 2, 2020), from https://nutanixbible.com/ pp. all.
Poitras, Steven. "The Nutanix Bible" (Sep. 1, 2020), from https:/nutanixbible.com/ pp. all.
"Nutanix Files Guide"; Nutanix; Sep. 14, 2018; pp. all.
"Setting up and Using Acropolis File Services (AFS) on Nutanix AOS 5.0"; Virtual Dennis—Sharing Technical Tips Learned the Hard Way; Posted Dec. 30, 2016; pp. all.
Bas van Kaam "New in AOS 5.0: Nutanix Acropolis File Services"; basvankaam.com; Jan. 5, 2017; pp. all.
Dell: "High Availability and Data Protection With Dell EMC Isilon Scale-Out Nas"; Jul. 2019, Dell Inc., pp. all.
Jay Bounds "High-Availability (HA) Pair Controller Configuration Overview and Best Practices"; NetApp; Feb. 2016; pp. all.
Jorge Costa "High Availability Setup Using Veritas Cluster Server and NetApp Synchronous SnapMirror—One button Failover/Failback with SnapMirror Sync and Veritas Cluster Server"; NetApp Community; Nov. 18, 2010; pp. all.
NetApp "Preparing Storage Systems for Snapmirror Replication"; Apr. 2005, NetApp, Inc., pp. all.
U.S. Appl. No. 17/443,009, titled "Scope-Based Distributed Lock Infrastructure for Virtualized File Server" filed Jul. 19, 2021, pp. all.
Bhardwaj, Rishi "The Wonderful World of Distributed Systems and the Art of Metadata Management", Nutanix, Inc., https://www.nutanix.com/blog/the-wonderful-world-of-distributed-systems-and-metadata-management, Sep. 24, 2015, captured Jul. 13, 2021, pp. 1-8.
U.S. Appl. No. 17/169,137 titled "Virtualized File Server Data Sharing" filed Feb. 5, 2021, pp. all.
U.S. Appl. No. 17/180,257 titled "Virtualized File Server User Views" filed Feb. 19, 2021, pp all.
Administering VMware vSAN—VMware vSphere 7.0, 2015-2020, pp. 1-114.
"Virtual Disk Manager User's Guide: Virtual Disk Development Kit", vmware.com, 2008, pp. 1-12.
"Characteristics of a vSAN Cluster", May 31, 2019, pp. 1-2.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, 1pp.—7.
Seget, Vladan , "VMware vSphere 7.0 and vSAN storage improvements", Apr. 1, 2020, pp. 1-12.
"VSAN Monitoring and Troubleshooting—VMware vSphere 7.0", https://docs.vmware.com/, 2018, pp. 1-61.
"VSAN Performance Graphs in the vSphere Web Client (2144493)", Nov. 9, 2020, pp. 1-42.
"VSphere Availability—VMware vSphere 6.7", https://docs.vmware.com/, Jan. 11, 2019, pp. 1-105.
Sturniolo, Andy , "VMware vSAN File Services and Veeam", Veeam Blog, https://www.veeam.com/blog/veeam-backup-vsan-file-services.html, Jul. 22, 2020, pp. 1-9.
Birk, Ryan, "How it Works: Understanding vSAN Architecture Components", altaro.com, Feb. 28, 2018, pp. 1-10.
Cormac "Native File Services for vSAN 7", CormacHogan.com, Mar. 11, 2020, pp. 1-23.
Feroce, Danilo "Leveraging VMware vSAM for Highly Available Management Clusters", VMware, Inc., Version 2.9, VMware, Inc., Jan. 2018, pp. 1-22.
Fojta, Tomas "Quotas and Quota Policies in VMware Cloud Director—Tom Fojta's Blog", Nov. 6, 2020, pp. 1-4.
Fojta, Tomas , "vSAN File Services with vCloud Director—Tom Fojta's Blog", (wordpress.com) ("Fojta Blog"), pp. 1-8.
Seget, Vladan , "VMware vSAN 7 now with native file services and quotas", May 1, 2020, pp. all.
U.S. Appl. No. 18/054,490 titled "Virtualized File Server Distribution Across Clusters" filed Nov. 10, 2022.
U.S. Appl. No. 18/069,920 titled "Transparent Referrals for Distributed File Servers" filed Dec. 21, 2022.
U.S. Appl. No. 18/306,595 titled Self-Healing Virtualized File Server filed Apr. 25, 2023.
"Assign Roles and Permissions using the vSphere Client", Youtube; https://www.youtube.com/watch?v=ZwRheTljapY, Oct. 16, 2018.
"Create a vSAN File Share in vSAN File Service—VMware vSAN 7.0", VMware Arena; https://www.vmwarearena.com/create-a-vsan-file-share/, May 8, 2020.
"How to Configure vSAN File Service—VMware vSAN 7.0", VMware Arena; https://www.vmwarearena.com/configure-vsan-file-service/, Jul. 27, 2020.
"How to Create a NFS File Share from vSAN Datastore | vSAN 7.0", Youtube; https://www.youtube.com/watch?v=Qrl_XKTv8O8&t=445s, Jul. 27, 2020.
"How to Create a NFS File Share from vSAN Datastore | vSAN 7.0", Youtube; https://youtu.be/i7fj4lHWwv8, Jul. 27, 2020.
Flecha , "Understanding vSAN Architecture: Disk Groups", VMware Virtual Blocks Blog; https://blogs.vmware.com/virtualblocks/2019/04/18/vsan-disk-groups/, Apr. 18, 2019.
"Configure Native File Services on vSAN 7.0!!", Native File Services on vSAN 7.0; My Cloud Arena Blog; https://mycloudarena.blogspot.com/2020/04/configure-native-file-services-on-vsan.html, Apr. 10, 2020.
"Designing and Sizing Virtual SAN Fault Domains", VMware Docs; https://docs.vmware.com/en/VMware-vSphere/6.5/com.vmware.vsphere.virtualsan.doc/GUID-FE7DBC6F-C204-4137-827F-7E04FE88D968.html, May 31, 2019.
"Local Storage", VMware Docs; https://docs.vmware.com/en/VMware-vSphere/7.0/com.vmware.vsphere.storage.doc/GUID-5F08F7A7-6D8E-45A6-B408-278B3A4C7D4C.html, May 31, 2019.
"Managing Your Data on vSAN with SPBM", VMware Blog; https://blogs.vmware.com/virtualblocks/2018/11/30/managing-your-data-on-vsan-with-spbm/, Nov. 30, 2018.
"Virtual Machine Backup Guide", ESX Server 3.0 and VirtualCenter 2.0; VMware; https://www.vmware.com/pdf/vi3_30_20_vm_backup.pdf, 2006.
"VMWare High Availability & Data Recovery Configuration Guide v1", IBM; https://www.ibm.com/support/pages/vmware-high-availability-data-recovery-configuration-guide-v1, Nov. 2015.
"VMware vSAN Beta Native Data Protection Feature with NextGen Snapshots", https://www.virtualizationhowto.com/2018/11/vmware-vsan-beta-native-data-protection-feature-with-nextgen-snapshots/, Nov. 7, 2018.
"VSAN 2-Node Cluster Guide", VMwareStorage; https://web.archive.org/web/20221127090148/https://core.vmware.com/resource/vsan-2-node-cluster-guide; dated Jun. 2020; printed Nov. 21, 2022, Jun. 2020.
"VSAN 7 U1 File Services", VMware Virtual Blocks Blog; https://blogs.vmware.com/virtualblocks/2020/09/17/vsan-7-u1-file-services/, Sep. 17, 2020.
"VSAN 7 U1 File Services", Youtube; https://www.youtube.com/watch?v=UvSpiDqh3Bk, Sep. 17, 2020.
"VSAN Disaster Recovery", VMware; The Cloud Platform Tech Zone; https://core.vmware.com/resource/vsan-disaster-recovery, Aug. 2020.
"VSAN File Services", VMwareStorage; https://core.vmware.com/resource/vsan-file-services, May 2020.
"VSAN File Services Tech Note", VMware; https://cdn-prod.scdn6.secure.raxcdn.com/static/media/8e656fe9-d4d2-4974-91df-2accc2abb7fd.pdf, May 26, 2020.
"VSAN File Services with vCloud Director", Tom Fojta's Blog; https://fojta.wordpress.com/2020/04/06/vsan-file-services-with-vcloud-director/, Apr. 6, 2020.

(56) References Cited

OTHER PUBLICATIONS

"VSAN File Services: Seeing an imbalance between protocol stack containers and FS VMs", https://www.yellow-bricks.com/2020/04/22/vsan-file-services-seeing-an-imbalance-between-protocol-stack-containers-and-fs-vms/, Apr. 22, 2020.
"VSan NFSv3 v NFSv4 balancing", Youtube; https://www.youtube.com/watch?v=3jWkgfhcg6M&t=3s, Mar. 18, 2020.
"VSan Specialist: Stretched Clusters & Two-Node Clusters—Part 1", vCallaway; http://vcallaway.com/vsan-specialist-stretched-clusters-two-node-clusters/, Sep. 26, 2017.
"VSphere Replication enhancements in vSAN 7.0", YouTube; https://www.youtube.com/watch?v=cjZUkxrYW1M; screen capture at 1:45, Mar. 2020.
"VSphere Replication Target Storage Consumption", VMware vSphere Blog; https://blogs.vmware.com/vsphere/2015/04/vsphere-replication-target-storage-consumption.html, Apr. 17, 2015.
"VSphere Replication Technical Overview", VMwareBC/DR; https://core.vmware.com/resource/vsphere-replication-technical-overview, Aug. 2020.
U.S. Appl. No. 18/183,142 titled "Virtualized File Server User Views" filed Mar. 13, 2023.
U.S. Appl. No. 18/450,319 titled " Disaster Recovery for Distributed File Servers, Including Metadata Fixers" filed Aug. 15, 2023.
""Eam-snapshot" snapshot on Service VMs (2150695)", VMWare Customer Connect; retrieved from: https://kb.vmware.com/s/article/2150695, Jan. 17, 2018.
"Architecting VMware vSAN 6.2 for VMware Cloud Providers", VMware vCloud Architecture Toolkit; retrieved: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2.010.html, Jan. 2018.
"Copy-on-write and Redirect-on-write", Mohan Kumar Blog; retrieved from: https://mohankumar-k.blogspot.com/2018/05/copy-on-write-and-redirect-on-write.html, May 31, 2018.
"Creating and Using Content Library", VMware vSphere Blog; retrieved from: https://blogs.vmware.com/vsphere/2020/01/creating-and-using-content-library.html, Jan. 22, 2020.
"Data Placement Optimizations in vSAN 6.7", VMWare Virtual Blocks Blog; retrieved from https://blogs.vmware.com/virtualblocks/2018/07/09/data-placement-optimizations-in-vsan-6-7/, Jul. 9, 2018.
"How to Efficiently Deploy Virtual Machines from VMware vSphere Content Library", VMware VROOM! Performance Blog; retrieved from: https://blogs.vmware.com/performance/2015/07/efficiently-deploy-vms-vmware-vsphere-content-library.html, Jul. 9, 2015.
"Managing Content Library Subscriptions", VMware vSphere Blog; retrieved from: https://blogs.vmware.com/vsphere/2020/02/managing-content-library-subscriptions.html, Feb. 4, 2020.
"New VMware Icons Visio Stencil Download", VM Today; obtained from: https://web.archive.org/web/20230130190532/https://vmtoday.com/2012/09/new-vmware-icons-visio-stencil-download/, Sep. 16, 2012.
"Open Virtualization Format White Paper", DMTF Informational, Version 2.0.0; Distributed Management Task Force, Inc. (DMTF); obtained from https://www.dmtf.org/sites/default/files/standards/documents/DSP2017_2.0.0.pdf, Apr. 14, 2014.
"Rebalance Workload on vSAN File Service Hosts", VMWare Docs; retrieved from: https://docs.vmware.com/en/VMware-vSphere/7.0/com.vmware.vsphere.vsan.doc/GUID-6D9184A4-23BB-411B-983B-D2A9BC6A33E6.html, Jul. 21, 2020.
"The Evolution of Content Library", VMware vSphere Blog; retrieved from: https://blogs.vmware.com/vsphere/2019/12/the-evolution-of-content-library.html, Dec. 3, 2019.
"Using Linked Clones", VMWare Docs; retrieved: https://docs.vmware.com/en/VMware-Fusion/13/com.vmware.fusion.using.doc/GUID-96D07E71-FF5D-4E82-A5BD-0B15586432E4.html, May 31, 2019.
"VMWare Clones", MacStadium; retrieved: https://docs.macstadium.com/docs/linked-vs-instant-clones, Jun. 2020.
"VMware vSAN Technology Overview", VMwareStorage, VMware, retrieved from https://core.vmware.com/resource/vmware-vsan-technology-overview, Sep. 2020.
"VMware vSphere: Handy tips on working with Content Libraries", StarWind blog; retrieved from: https://www.starwindsoftware.com/blog/working-with-content-libraries-in-vsphere-6-5, Jul. 18, 2018.
"VSAN File Services and the different communication layers", Yellowbricks.com blog; retrieved from: https://www.yellow-bricks.com/2020/04/21/vsan-file-services-communication-layers/, Apr. 21, 2020.
"VSAN File Services considerations", Yellow-Brick.com blog; retrieved from: https://www.yellow-bricks.com/2020/04/15/vsan-file-services-considerations, Apr. 15, 2020.
"VSAN Networking Terms and Definitions", VMWare Docs; retrieved from: https://docs.vmware.com/en/VMware-vSphere/7.0/vsan-network-design-guide/GUID-725668B0-B1B9-48A0-AB4F-A6386C7D649E.html, Dec. 10, 2019.
"VSAN NFS Share Configuration in VMware vSphere 7.0", retreieved from https://www.virtualizationhowto.com/2020/07/vsan-nfs-share-configuration-in-vmware-vsphere-7-0/, Jul. 24, 2020.
"VSAN Scalable File Services", It Should Just Work; retrieved from: https://www.isjw.uk/post/events/vmworld-2018/vsan-scalable-file-services/, Nov. 22, 2018.
"VSphere 7 Content libraries—Part 1: Concept and creating a library?", Virtual Maestro blog; https://blogs.virtualmaestro.in/2020/04/29/vsphere-7-content-libraries-part-1-how-do-they-work, Apr. 2020.
"VSphere ESX Agent Manager", VMWare Docs; retrieved from: https://docs.vmware.com/en/VMware-vSphere/7.0/com.vmware.vsphere.monitoring.doc/GUID-D56ABFF4-4529-409C-9AA2-8D8D4E235601.html, Aug. 22, 2020.
"VSphere ESX Agent Manager API Reference Documentation", VMware.com; vSphere ESX Agent Manager API | Version 7.0; obtained from: https://vdc-download.vmware.com/vmwb-repository/dcr-public/6bcc7a1f-e8e0-4cfb-a558-40147eac92f8/11fdf031-6e51-4b38-9768-3b9dace19188/doc/index.html, 2020.
Poitras, Steven , "The Nutanix Bible", https://nutanixbible.com/, Apr. 9, 2019, pp. all.
U.S. Appl. No. 18/393,105 titled "Virtualized File Server Smart Data Ingestion" filed Dec. 21, 2023.
"3.2.4.1Data Integrity (Software Checksum)", VMWare; retrieved from: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2.023.html, Jun. 2018.
"Changing the ESXi Host Name using vSphere Web Client", Pavanas Blog; retrieved from: https://pchawda.wordpress.com/category/esxi/page/3/, May 11, 2016.
"Create a Library", VMWare Docs; retrieved from: https://docs.vmware.com/en/VMware-vSphere/6.5/com.vmware.vsphere.vm_admin.doc/GUID-2A0F1C13-7336-45CE-B211-610D39A6E1F4.html, Jul. 22, 2019.
"Creating and Managing Protection Groups", VMWare Docs; retrieved from: https://docs.vmware.com/en/Site-Recovery-Manager/8.5/com.vmware.srm.admin.doc/GUID-294475D7-B136-4492-8F8E-522B8EDA26EA.html, Mar. 31, 2020.
"Data Protection and Backup Architecture", VMWare Docs; retrieved from: https://docs.vmware.com/en/VMware-Validated-Design/5.1/sddc-architecture-and-design/GUID-69105DDF-AC6D-4787-8E2E-6D887AFDDB9A.html, Jul. 30, 2019.
"How to Configure vSAN File Services in vSAN 7.0 | What's new with vSAN 7.0", YouTube; retrieved from: https://www.youtube.com/watch?v=ApLO1EhjMQY, Jul. 20, 2020.
"How to View and Close Open Files in Windows Server SMB Share?", WindowsOS Hub; retrieved from: https://web.archive.org/web/20221020230615/https://woshub.com/managing-open-files-windows-server-share/, Aug. 13, 2020.
"Managing Permissions in the VMware Host Client", VMWare Docs; retrieved from: https://docs.vmware.com/en/VMware-vSphere/7.0/com.vmware.vsphere.hostclient.doc/GUID-8F7CEFFA-B91A-4DE8-94A4-5A9257A04539.html, May 31, 2019.
"POSIX™ 1003.1 Frequently Asked Questions (FAQ Version 1.18)", retrieved from: https://www.opengroup.org/austin/papers/posix_faq.html, Jun. 13, 2020.

(56) References Cited

OTHER PUBLICATIONS

"Recovering a vSAN disk group from a failed ESXi host", VirtualSlices; retrieved from: https://www.virtualslices.com/2019/09/recovering-vsan-disk-group-from-a-failed-esxi-host/, Sep. 12, 2019.
"The Architecture of VMware ESXi", VMWare White Paper; retrieved from: https://www.vmware.com/content/dam/digitalmarketing/vmware/en/pdf/techpaper/ESXi_architecture.pdf, Oct. 24, 2008.
"Virtual Volumes and Replication Groups", VMWare Docs; retrieved from: https://web.archive.org/web/20220324234540/https://docs.vmware.com/en/VMware-vSphere/7.0/com.vmware.vsphere.storage.doc/GUID-365225BE-A87B-46F0-9112-53D7B2ED5028.html, Sep. 26, 2019.
"VMware Horizon on VMware vSAN Best Practices—Technical White Paper", VMWare; retrieved from: https://www.vmware.com/content/dam/digitalmarketing/vmware/en/pdf/products/vsan/vmware-horizon-7-on-vmware-vsan-best-practices.pdf, Dec. 2020.
"VSphere Storage", VMWare Update 2, VMware vSphere 6.7, VMWare EXSi 6.7, vCenter Server 6.7; retrieved from: https://docs.vmware.com/en/VMware-vSphere/6.7/vsphere-esxi-vcenter-server-672-storage-guide.pdf, Apr. 11, 2019.
"WSFC with Native Shared Disks on vSAN", Virtually Sensei; retrieved from: https://virtuallysensei.com/vsan-6-7-u3-native-shared-disks/, Dec. 8, 2019.
Adam, Michael, "Samba's Way Toward SMB 3.0", vol. 38, No. 1 | https://www.usenix.org/system/files/login/ articles/03adam_016-025_online.pdf, Feb. 2013, pp. 16-25.
Bergamasco, Davide, "Content Library Performance Tuning", VMware VROOM! Performance Blog; received from: https://blogs.vmware.com/performance/2015/09/content-library-performance-tuning.html, Sep. 15, 2015.
Bergamasco, Davide, "How to Efficiently Synchronize, Import and Export Content in VMware vSphere Content Library", VMware VROOM! Performance Blog; retrieved from: https://blogs.vmware.com/performance/2015/09/efficiently-synchronize-import-export-content-vmware-vsphere-content-library.html, Sep. 3, 2015.
Epping, "Introducing vSAN File Services as part of vSAN 7.0", retrieved from: https://www.yellow-bricks.com/2020/03/17/introducing-vsan-file-services-as-part-of-vsan-7-0/, Mar. 17, 2020.
Hickey, Nigel, "Creating and Using Content Library", VMware—VMware vSphere Blog; retrieved from: https://blogs.vmware.com/vsphere/2020/01/creating-and-using-content-library.html, Jan. 22, 2020.
Hickey, Nigel, "The Evolution of Content Library", VMware VMware vSphere Blog; retrieved from: https://blogs.vmware.com/vsphere/2019/12/the-evolution-of-content-library.html, Dec. 3, 2019.
Koehler, "Options in scalability with vSAN", VMWare; Virtual Blocks Blog; retrieved from: https://blogs.vmware.com/virtualblocks/2016/09/15/options-scalability-virtual-san/, Sep. 15, 2016.
Lüke, "Interaction Between the User and Kernel Space in Linux", retrieved from: https://pothos.github.io/papers/linux_userspace_kernel_interaction.pdf, 2018.

Oberacher, Peter, "vSAN: A Glance Behind the Curtain", VMware by Broadcom Livefire Solutions; retrieved from: https://www.livefire.solutions/vsan/vsan-a-glance-behind-the-curtain/, Aug. 6, 2019.
Seget, Vladan, "VMware vSAN 7 U1: Configure vSAN File Service", retrieved from: https://4sysops.com/archives/vmware-vsan-7-u1-configure-vsan-file-service/, Nov. 11, 2020.
"How NFS Referrals Work", From: Managing Network File Systems in Oracle® Solaris 11.2; Oracle.com; retrieved from: https://docs.oracle.com/cd/E36784_01/html/E36825/gjuaj.html#scrolltoc, Jul. 2014.
"Network File System (NFS) Version 4 Minor Version 1 Protocol", Internet Engineering Task Force (IETF); retrieved from: https://datatracker.ietf.org/doc/rfc8881/, Aug. 2020.
"VSAN File Services Demo", YouTube.com; retrieved from: https://www.youtube.com/watch?v=Hh2v9dNzC-0&t=114s, Jul. 13, 2020.
U.S. Appl. No. 18/497,919 titled "Virtualized Server Systems and Methods Including Scaling of File System Virtual Machines" filed Oct. 30, 2023.
"Data Protection for VMware vSAN", VMwareStorage; retrieved from https://core.vmware.com/resource/data-protection-vmware-vsan, Aug. 2020.
"Overview of the vSphere Auto Deploy Process by Using the vSphere Client", VMWare Docs; retrieved from: https://docs.vmware.com/en/VMware-vSphere/7.0/com.vmware.esxi.install.doc/GUID-33565F1C-5132-4953-8957-8982E87D86D7.html, Feb. 11, 2020.
"Rebalance file servers manually in vSAN 7.0", VMware Customer Connect; retrieved from: https://kb.vmware.com/s/article/80481, Oct. 6, 2020.
"The Open Virtual Machine Format Whitepaper for OVF Specification", VMWare; retrieved from https://www.vmware.com/pdf/ovf_whitepaper_specification.pdf, Sep. 9, 2007.
Epping, "Scaling out a vSAN Cluster with File Services enabled", Youtube.com; retrieved from: https://www.youtube.com/watch?v=1fkPGIOPQ6E, Apr. 10, 2020.
Epping, "Scaling out your vSAN File Services Cluster", YellowBricks Blog; retrieved from: https://www.yellow-bricks.com/2020/04/10/scaling-out-your-vsan-file-services-cluster/, Apr. 10, 2020.
Epping, "vSAN File Services considerations", YellowBricks blog; retrieved from: https://www.yellow-bricks.com/2020/04/15/vsan-file-services-considerations/, Apr. 15, 2020.
"Top-3 New Features in vSAN 7: #2—vSAN File Services", VMware Virtual Blocks Blog; retrieved from https://blogs.vmware.com/virtualblocks/2020/03/25/part-2-top-new-features-vsan-7-vsan-file-services/, Mar. 25, 2020.
"VSAN 7 U1 File Services Performance and Capacity Monitoring", Youtube.com; retrieved from: https://www.youtube.com/watch?v=Vk8_4Q_jhv8&t=22s, Sep. 17, 2020.
"Administering VMware vSAN—Update 1 VMware vSphere 8.0 VMware vSAN 8.0", https://docs.vmware.com/en/VMware-vSphere/8.0/vsan-801-administration-guide.pdf, 2015, pp. 1-151.
"File and Storage Services Overview", https://learn.microsoft.com/en-us/previous-versions/windows/it-pro/windows-server-2012-r2-and-2012/hh831487(v=ws.11), Dec. 29, 2016, pp. 1-6.

* cited by examiner

PARALLEL CHANGE FILE TRACKING IN A DISTRIBUTED FILE SERVER VIRTUAL MACHINE (FSVM) ARCHITECTURE

CROSS REFERENCE TO RELATED APPLICATION(S)

This application claims priority to U.S. Provisional Application No. 62/955,983 filed Dec. 31, 2019. The aforementioned application is incorporated herein by reference, in its entirety, for any purpose.

BACKGROUND

Change File Tracking (CFT) may be used to track changes to files and directories since a last snapshot and allow users to backup incremental changes. Older technologies such as Network Data Management Protocol (NDMP) required a scan for all changed files every time a backup was initiated, slowing the backup process down. CFT provides a reduction in time to backup and the amount of space required.

SUMMARY

In one embodiment, a non-transitory computer readable medium is encoded with executable instructions that, when executed by a processor, cause a system to perform operations comprising: receiving, at a distributed file server virtual machine (FSVM) system, an indicator of a number of available worker nodes of a distributed backup system and an incremental backup request of computing nodes in the distributed FSVM system; allocating URLs to the available worker nodes; and assigning the allocated URLs to the computing nodes having an identified change file, wherein the computing nodes are configured to transmit respective lists of files via the URLs to the worker nodes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
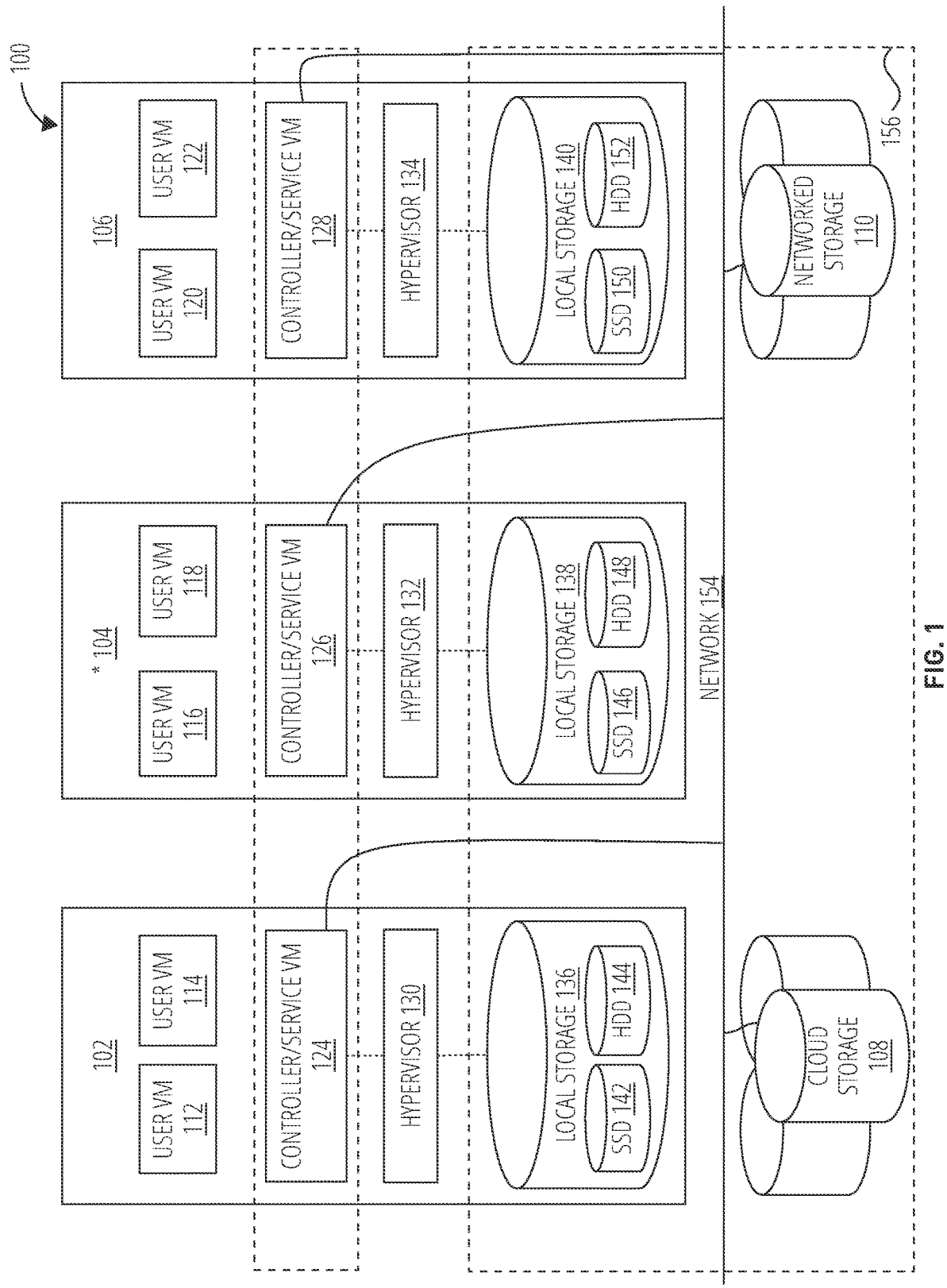
FIG. 1 illustrates a clustered virtualization environment 100 according to particular embodiments.

It would be advantageous to decrease further an amount of time used to perform a backup of a distributed file server (e.g., a distributed FSVM system). Further, it would be desirable to make efficient use of network resources during a backup of the system. Accordingly, examples described herein may allow a client system to specify a number of threads available for a backup process. Based on that number, a server may generate a number of streams of backup data and utilize those streams to maintain a number of parallel threads to perform a backup that efficiently utilizes time and network resources.

Moreover, examples described herein may identify particular bytes in a file that had been changed. In this manner, a backup system may not need to backup the complete changed file, but may backup only the changed bytes and/or blocks containing the changed bytes.

Generally, to back up a file server using CFT, the FSVM (File Server Virtual Machine) takes a first snapshot. A backup server implements a full backup of the first snapshot. After a defined period of time, the backup server asks the file server to take a second snapshot and return a diff of files (e.g., diff between first and second snapshots) that changed since the last backup (e.g., backup of first snapshot). Once the backup server receives the list of changed files (e.g., create, delete, rename, modify), the backup server backs up and/or changes the backed up files of the first snapshot based on the diff between the first and second snapshots. As such, the backup server does not back up the entire second snapshot data and instead leverages the diff between first and second snapshots for backup. In this manner, an incremental backup may be implemented.

The illustrative embodiments described in this detailed description and claims are not meant to be limiting. Other embodiments may be utilized, and other changes may be made, without departing from the spirit or scope of the subject matter presented here.

Various embodiments of the invention will now be described. The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some well-known structures or functions may not be shown or described in detail below, so as to avoid unnecessarily obscuring the relevant description.

The terminology used herein is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section.

Examples described herein include parallel change file tracking (CFT) running on a hyperconverged infrastructure such as a distributed File Server Virtual Machine (FSVM) architecture. The parallel CFT of the distributed FSVM may be leveraged with a scale-out architecture of a backup system to implement fast backups of data (e.g., files) stored in the hyperconverged infrastructure.

FIG. 1 illustrates a clustered virtualization environment 100 according to particular embodiments. The architectures of FIG. 1 can be implemented for a distributed platform that contains multiple computing nodes (e.g. host machines) 102, 106, and 104 that manage multiple tiers of storage. The multiple tiers of storage may include storage that is accessible through network 154, such as, by way of example and not limitation, cloud storage 108 (e.g., which may be accessible through the Internet), network-attached storage 110 (NAS) (e.g., which may be accessible through a LAN), or a storage area network (SAN). Unlike the prior art, the present embodiment also permits local storage 136, 138, and 140 that is incorporated into or directly attached to the host machine and/or appliance to be managed as part of storage pool 156. Examples of such local storage include Solid State Drives 142, 146, and 150 (henceforth "SSDs"), Hard Disk Drives 144, 148, and 152 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 156. Virtual disks (or "vDisks") may be structured from the physical storage devices in storage pool 156, as described in more detail below. As used herein, the term vDisk refers to the storage abstraction that is exposed by a Controller/Service VM (CVM) (e.g., 124) to be used by a user VM (e.g., user VM 112) and/or containers. In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Virtual disks (vDisks) may be structured from the storage devices in the storage pool 156. Generally, the distributed computing system of FIG. 1 may utilize an IP-based protocol, such as an Internet small computer system interface (iSCSI) or a network file system interface (NFS), to communicate between the user VMs, the containers, the CVMs, and/or the hypervisors 125(1)-(N). Thus, in some examples, the vDisk may be exposed via an iSCSI or an NFS interface, and may be mounted as a virtual disk on the user VMs 112-122 and/or operating systems supporting containers hosted by the computing nodes 102, 104, 106. iSCSI may generally refer to an IP-based storage networking standard for linking data storage facilities together. By carrying SCSI commands over IP networks, iSCSI can be used to facilitate data transfers over intranets and to manage storage over any suitable type of network or the Internet. The iSCSI protocol may allow iSCSI initiators to send SCSI commands to iSCSI targets at remote locations over a network. NFS may refer to an IP-based file access standard in which NFS clients send file-based requests to data protocol servers (e.g., NFS/SMB servers) via a proxy folder (directory) called "mount point".

Each computing node 102, 106, 104 may run virtualization software, such as VMWARE ESX(I), MICROSOFT HYPER-V, or REDHAT KVM. The virtualization software includes hypervisors 130, 132, and 134 to create, manage, and destroy user VMs, as well as managing the interactions between the underlying hardware and user VMs. User VMs may run one or more applications that may operate as "clients" with respect to other elements within clustered virtualization environment 100. Though not depicted in FIG. 1, a hypervisor may connect to network 154. In particular embodiments, a computing node 102, 106, or 104 may be a physical hardware computing device; in particular embodiments, a computing node 102, 106, or 104 may be a virtual machine. Each of the computing nodes may include one or more physical computing components, such as one or more processor units, respective local memory (e.g., cache memory, dynamic random-access memory (DRAM), non-volatile memory (e.g., flash memory), or combinations thereof), respective local storage, ports (not shown) to connect to peripheral input/output (I/O) devices (e.g., touchscreens, displays, speakers, keyboards, mice, cameras, microphones, environmental sensors, etc.).

Each of the hypervisors 130, 132, 134 may manage the allocation of physical resources (e.g., physical processor units, volatile memory, storage) to respective hosted components (e.g., CVMs, user VMs, containers) and performs various VM and/or container related operations, such as creating new VMs and/or containers, cloning existing VMs and/or containers, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors may all include a common hypervisor type, may all include different hypervisor types, or may include any combination of common and different hypervisor types.

CVMs 124, 126, and 128 may be used to manage storage and input/output ("I/O") activities according to particular embodiments. These special VMs act as the storage controller in the currently described architecture. Multiple such storage controllers may coordinate within a cluster to form a unified storage controller system. CVMs may run as virtual machines on the various host machines, and work together to form a distributed system that manages all the storage resources, including local storage, network-attached storage 110, and cloud storage 108. The CVMs may connect to network 154 directly, or via a hypervisor. Since the CVMs run independent of hypervisors 130, 132, 134, this means that the current approach can be used and implemented within any virtual machine architecture, since the CVMs of particular embodiments can be used in conjunction with any hypervisor from any virtualization vendor.

The CVMs may coordinate execution of respective services over the network, and the services running on the CVMs may utilize local memory to support operations. The local memory may be shared by components hosted on the respective computing node, and use of the respective local memory may be controlled by the respective hypervisor on that node. Moreover, multiple instances of the same service may be running throughout the distributed system. That is, the same services stack may be operating on more than one of the CVMs. For example, a first instance of a service may be running on the CVM 124, a second instance of the service may be running on the CVM 126, etc.

Generally, the CVMs may control and manage any type of storage device of the storage 156. The CVMs may implement storage controller logic and may virtualize all storage hardware of the storage 156 as one global resource pool to provide reliability, availability, and performance. IP-based requests may be generally used (e.g., by the user VMs and/or containers to send I/O requests to the CVMs. For example, user VMs and/or containers may send storage requests to CVMs using an IP request. The CVMs may directly implement storage and I/O optimizations within a direct data access path.

Note that the CVMs may be provided as virtual machines utilizing the hypervisors. Since the CVMs run "above" the hypervisors, some of the examples described herein may be implemented within any virtual machine architecture, since the CVMs may be used in conjunction with generally any type of hypervisor from any virtualization vendor.

A computing node may be designated as a leader node within a cluster of computing nodes. For example, computing node 104, as indicated by the asterisks, may be a leader node. A leader node may have a software component designated to perform operations of the leader. For example, CVM 126 on computing node 104 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 124, 126, and 128 exports one or more block devices or NFS server targets that appear as disks to user VMs 112, 114, 116, 118, 120, and 122. These disks are virtual, since they are implemented by the software running inside CVMs 124, 126, and 128. Thus, to user VMs, CVMs appear to be exporting a clustered storage appliance that contains some disks. All user data (including the operating system) in the user VMs reside on these virtual disks.

Each of the user VMs, such as user VMs 112, 114, 116, 118, 120, and 122, hosted on the respective computing node may include at least one application and other components (e.g., all components) the user VM needs to execute (e.g., run) the at least one application (e.g., system binaries, libraries, etc.). Each of the user VMs may generally be configured to execute any type and/or number of applications, such as those requested, specified, or desired by a user. Each of the user VMs further may include a respective virtualized hardware stack (e.g., virtualized network adaptors, virtual local storage, virtual memory, processor units, etc.). To manage the respective virtualized hardware stack, each of the user VMs may host a respective operating system (e.g., Windows®, Linux®, etc.). The respective virtualized hardware stack configured for each of the user VMs may be defined based on available physical resources (e.g., processors, local memory, local storage, etc.). That is, physical resources associated with a computing node may be divided between (e.g., shared among) components hosted on the computing node (e.g., the hypervisor, the CVM, other user VMs, containers, etc.), and the respective virtualized hardware stack configured for each of the user VMs may reflect the physical resources being allocated to the user VM. Thus, the user VMs may isolate an execution environment by packaging both the user space (e.g., application(s), system binaries and libraries, etc.) and the kernel and/or hardware (e.g., managed by an operating system). It will be appreciated that a given computing node may host no user VMs or may host any number of user VMs.

In some examples, in addition to or instead of providing hardware virtualization using user VMs, one or more of the computing nodes may provide any number of containers (not shown in FIG. 1) which may each provide operating system level virtualization. Thus, each of the respective containers may isolate the user space execution environment (e.g., at least one application and everything the container needs to execute (e.g., run) the at least one application (e.g., system binaries, libraries, etc.)) without using, or requiring in some examples, an operating system to manage hardware. Individual ones of the containers may execute any type and/or number of applications, such as those requested, specified, or desired by a user. Two or more of the containers may run on a shared operating system in some examples, such as an operating system of any of the hypervisors shown in FIG. 1, any CVM shown in FIG. 1, or other user VMs. In some examples, an interface engine may be installed to communicate between a container and an underlying operating system. It will be appreciate that a given computing node may host no containers or may host any number of containers.

Significant performance advantages can be gained by allowing the virtualization system to access and utilize local storage 136, 138, and 140 as disclosed herein. This is because I/O performance is typically much faster when performing access to local storage as compared to performing access to network-attached storage 110 across a network 154. This faster performance for locally attached storage can be increased even further by using certain types of optimized local storage devices, such as SSDs. Further details regarding methods and mechanisms for implementing the virtualization environment illustrated in FIG. 1 are described in U.S. Pat. No. 8,601,473, which is hereby incorporated by reference in its entirety.

Figure 2:
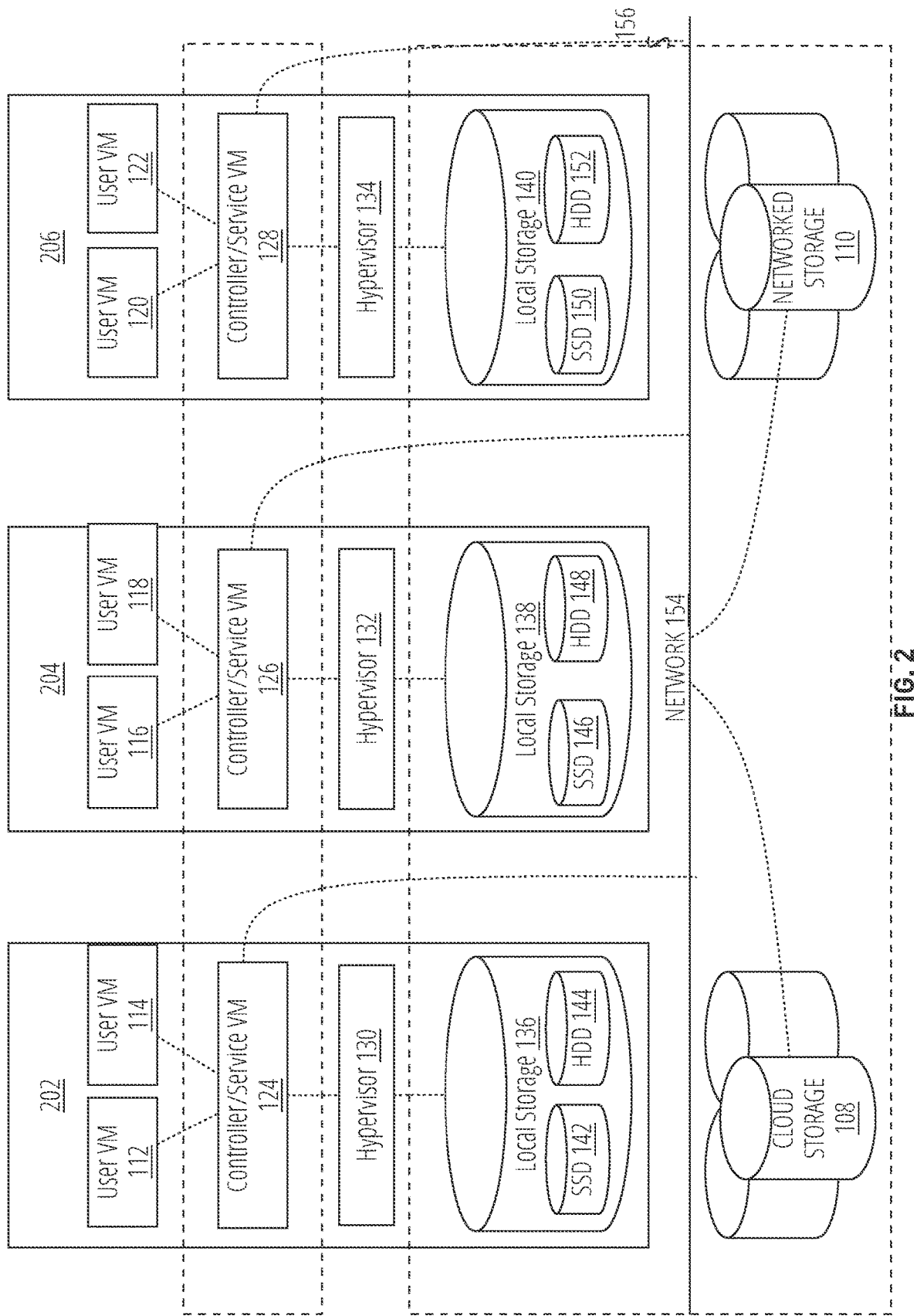
FIG. 2 illustrates data flow within a clustered virtualization environment 200 according to particular embodiments.

FIG. 2 illustrates data flow within an example clustered virtualization environment 100 according to particular embodiments. As described above, one or more user VMs and a CVM may run on each computing node 202, 204, or 206 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 156. Additionally or alternatively, CVMs 124, 126, 128 may present an emulated storage controller either to the hypervisor or to user VMs to facilitate I/O operations. CVMs 124, 126, and 128 may be connected to storage within storage pool 156. CVM 124 may have the ability to perform I/O operations using local storage 136 within the same computing node 202, by connecting via network 154 to cloud storage 108 or network-attached storage 110, or by connecting via network 154 to local storage 138 or local storage 140 within another computing node 204 or 206 (e.g., via connecting to another CVM 126 or 128). In particular embodiments, any suitable computing system may be used to implement a computing node.

During operation, the user VMs and/or operating systems supporting containers may provide storage input/output (I/O) requests to the CVMs and/or the hypervisors via iSCSI, NFS, and/or SMB requests. Each of the storage I/O requests may designate an IP address for a CVM from which the respective user VM desires U/O services. The storage I/O requests may be provided from the user VMs to a virtual switch within a hypervisor to be routed to the correct destination. For examples, the user VM 112 may provide a storage request to the hypervisor 130. The storage I/O request may request I/O services from any of the CVMs in FIG. 2. If the storage I/O request is intended to be handled by a respective CVM hosted on a same computing node as the requesting user VM (e.g., CVM 124 and the user VM 112 are hosted on the same computing node 202), then the storage I/O request may be internally routed within the respective computing node. In some examples, the storage I/O request may be directed to a CVM on another computing node from the requesting user VM. Accordingly, a hypervisor may provide the storage request to a physical switch to be sent over the network to another computing node hosting the requested CVM.

Figure 3:
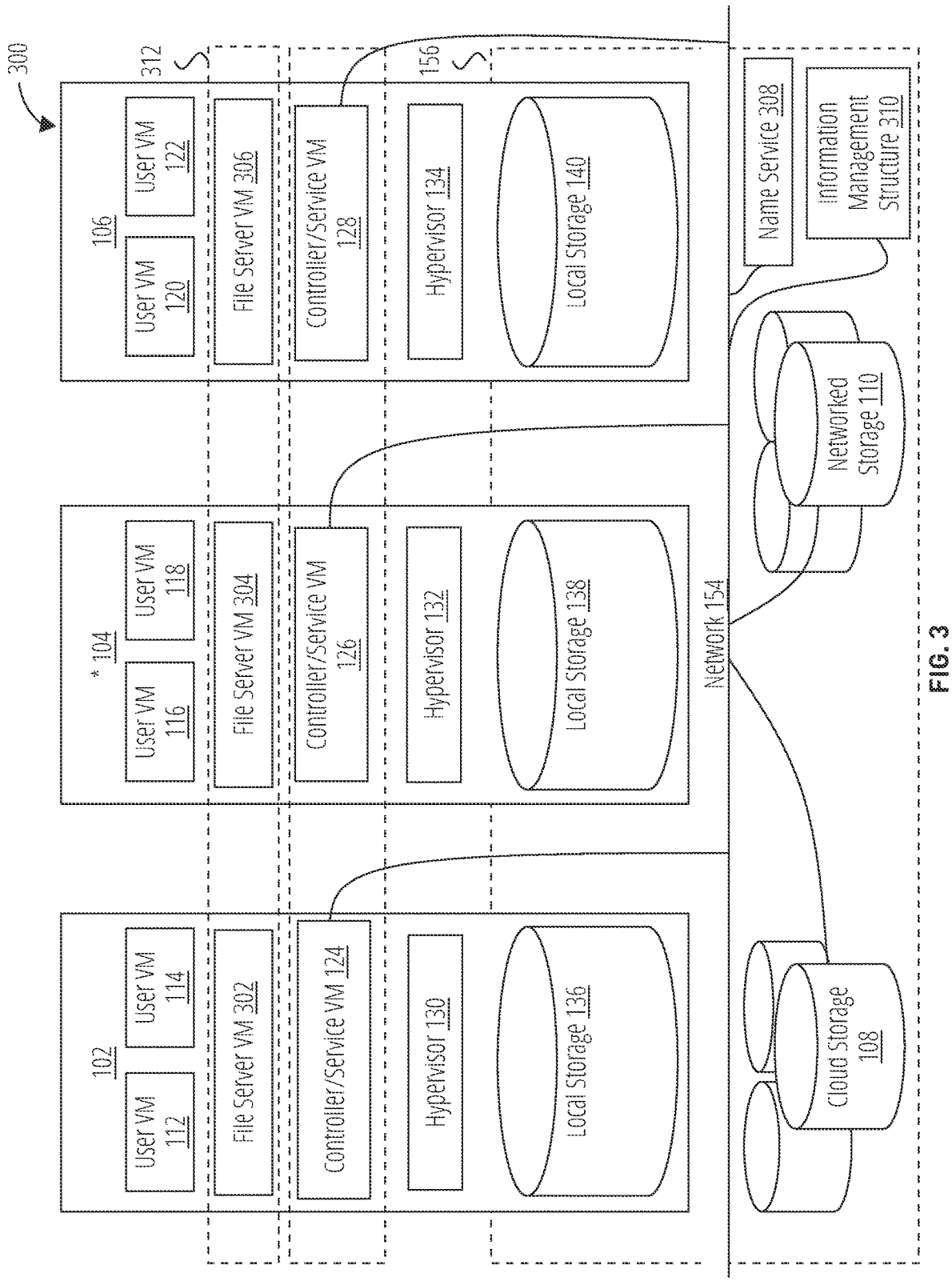
FIG. 3 illustrates a clustered virtualization environment 300 implementing a virtualized file server according to particular embodiments.

FIG. 3 illustrates a clustered virtualization environment 300 implementing a virtualized file server (VFS) 358 according to particular embodiments. In particular embodiments, the VFS 312 provides file services to user VMs 112, 114, 116, 118, 120, and 122. The file services may include storing and retrieving data persistently, reliably, and efficiently. The user virtual machines may execute user processes, such as office applications or the like, on computing nodes 102, 104, and 106. The stored data may be represented as a set of storage items, such as files organized in a hierarchical structure of folders (also known as directories), which can contain files and other folders, and shares, which can also contain files and folders.

In particular embodiments, the VFS 312 may include a set (e.g., a cluster) of File Server Virtual Machines (FSVMs) 302, 304, and 306 that execute on computing nodes 102, 104, and 106 and process storage item access operations requested by user VMs executing on the computing nodes 102, 104, and 106. The FSVMs 302, 304, and 306 may communicate with storage controllers provided by CVMs 124, 132, 128 executing on the computing nodes 102, 104, 106 to store and retrieve files, folders, SMB shares, or other storage items on local storage 136, 138, 140 associated with, e.g., local to, the computing nodes 102, 104, 106. The FSVMs 326, 328, 330 may store and retrieve block-level data on the computing nodes 102, 104, 106, e.g., on the local storage 136, 138, 140 of the computing nodes 102, 104, 106. The block-level data may include block-level representations of the storage items. The network protocol used for communication between user VMs, FSVMs, and CVMs via the network 154 may be Internet Small Computer Systems Interface (iSCSI), Server Message Block (SMB), Network Filesystem (NFS), pNFS (Parallel NFS), or another appropriate protocol.

For the purposes of VFS 312, computing node 106 may be designated as a leader node within a cluster of host machines. In this case, FSVM 306 on computing node 106 may be designated to perform such operations. A leader may be responsible for monitoring or handling requests from FSVMs on other host machines throughout the virtualized environment. If FSVM 306 fails, a new leader may be designated for VFS 312.

In particular embodiments, the user VMs may send data to the VFS 312 using write requests, and may receive data from it using read requests. The read and write requests, and their associated parameters, data, and results, may be sent between a user VM and one or more file server VMs (FSVMs) located on the same computing node as the user VM or on different computing nodes from the user VM. The read and write requests may be sent between computing nodes 102, 104, 106 via network 154, e.g., using a network communication protocol such as iSCSI, CIFS, SMB, TCP, IP, or the like. When a read or write request is sent between two VMs located on the same one of the computing nodes 102, 104, 106 (e.g., between the 112 and the FSVM 302 located on the computing node 102), the request may be sent using local communication within the computing node 102 instead of via the network 154. As described above, such local communication may be substantially faster than communication via the network 154. The local communication may be performed by, e.g., writing to and reading from shared memory accessible by the user VM 112 and the FSVM 302, sending and receiving data via a local "loopback" network interface, local stream communication, or the like.

In particular embodiments, the storage items stored by the VFS 312, such as files and folders, may be distributed amongst multiple FSVMs 302, 304, 306. In particular embodiments, when storage access requests are received from the user VMs, the VFS 312 identifies FSVMs 302, 304, 306 at which requested storage items, e.g., folders, files, or portions thereof, are stored, and directs the user VMs to the locations of the storage items. The FSVMs 302, 304, 306 may maintain a storage map, such as a sharding map, that maps names or identifiers of storage items to their corresponding locations. The storage map may be a distributed data structure of which copies are maintained at each FSVM 302, 304, 306 and accessed using distributed locks or other storage item access operations. Alternatively, the storage map may be maintained by an FSVM at a leader node such as the FSVM 306, and the other FSVMs 302 and 304 may send requests to query and update the storage map to the leader FSVM 306. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application executing in a user VM 112 on one of the computing nodes 102 initiates a storage access operation, such as reading or writing data, the user VM 112 may send the storage access operation in a request to one of the FSVMs 302, 304, 306 on one of the computing nodes 102, 104, 106. A FSVM 304 executing on a computing node 104 that receives a storage access request may use the storage map to determine whether the requested file or folder is located on the FSVM 304. If the requested file or folder is located on the FSVM 304, the FSVM 304 executes the requested storage access operation. Otherwise, the FSVM 304 responds to the request with an indication that the data is not on the FSVM 304, and may redirect the requesting user VM 112 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 302 by sending a file service operation that creates the file or folder to a CVM 124 associated with (e.g., located on the same host machine as) the FSVM 302. The CVM 124 subsequently processes file service commands for that file for the FSVM 302 and sends corresponding storage access operations to storage devices associated with the file. The CVM 124 may associate 136 with the file if there is sufficient free space on 136. Alternatively, the CVM 124 may associate a storage device located on another computing node 202, e.g., in local storage 138, with the file under certain conditions, e.g., if there is insufficient free space on the local storage 136, or if storage access operations between the CVM 124 and the file are expected to be infrequent. Files and folders, or portions thereof, may also be stored on other storage devices, such as the network-attached storage (NAS) network-attached storage 110 or the cloud storage 108 of the storage pool 156.

In particular embodiments, a name service 308, such as that specified by the Domain Name System (DNS) Internet protocol, may communicate with the computing nodes 102, 104, 106 via the network 154 and may store a database of domain name (e.g., host name) to IP address mappings. The domain names may correspond to FSVMs, e.g., fsvm1.domain.com or ip-addr1.domain.com for an FSVM named FSVM-1. The name service 308 may be queried by the user VMs to determine the IP address of a particular computing node 102, 104, 106 given a name of the computing node, e.g., to determine the IP address of the host name ip-addr1 for the computing node 102. The name service 308 may be located on a separate server computer system or on one or more of the computing nodes 102, 104, 106. The names and IP addresses of the computing nodes of the VFS 312, e.g., the computing nodes 102, 104, 106, may be stored in the name service 308 so that the user VMs may determine the IP address of each of the computing nodes 102, 104, 106, or FSVMs 302, 304, 306. The name of each VFS instance, e.g., FS1, FS2, or the like, may be stored in the name service 308 in association with a set of one or more names that contains the name(s) of the computing nodes 102, 104, 106 or FSVMs 302, 304, 306 of the VFS instance VFS 312. The FSVMs 302, 304, 306 may be associated with the host names ip-addr1, ip-addr2, and ip-addr3, respectively. For example, the file server instance name FS1.domain.com may be associated with the host names ip-addr1, ip-addr2, and ip-addr3 in the name service 308, so that a query of the name service 308 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 308 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 308 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 308. The IP addresses ip-addr1, ip-addr2, and ip-addr3 described above are examples of external IP addresses. The internal IP addresses may be used for iSCSI communication to CVMs, e.g., between the FSVMs 302, 304, 306 and the CVMs 124, 132, 128. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 312 is provided by a distributed set of FSVMs 302, 304, 306, which may form a cluster, the user VMs that access particular requested storage items, such as files or folders, do not necessarily know the locations of the requested storage items when the request is received. A distributed file system protocol, e.g., MICROSOFT DFS or the like, is therefore used, in which a user VM 112 may request the addresses of FSVMs 302, 304, 306 from a name service 308 (e.g., DNS). The name service 308 may send one or more network addresses of FSVMs 302, 304, 306 to the user VM 112, in an order that changes for each subsequent request. These network addresses are not necessarily the addresses of the FSVM 304 on which the storage item requested by the user VM 112 is located, since the name service 308 does not necessarily have information about the mapping between storage items and FSVMs 302, 304, 306. Next, the user VM 112 may send an access request to one of the network addresses provided by the name service, e.g., the address of FSVM 304. The FSVM 304 may receive the access request and determine whether the storage item identified by the request is located on the FSVM 304. If so, the FSVM 304 may process the request and send the results to the requesting user VM 112. However, if the identified storage item is located on a different FSVM 306, then the FSVM 304 may redirect the user VM 112 to the FSVM 306 on which the requested storage item is located by sending a "redirect" response referencing FSVM 306 to the user VM 112. The user VM 112 may then send the access request to FSVM 306, which may perform the requested operation for the identified storage item.

A particular VFS 312, including the items it stores, e.g., files and folders, may be referred to herein as a VFS "instance" and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS instance may store different folders, files, or portions thereof at different locations, e.g., on different FSVMs, the use of different FSVMs or other elements of storage pool 156 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three computing nodes, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different computing nodes, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 312 determines the location, e.g., FSVM, at which to store a storage item when the storage item is created. For example, a FSVM 302 may attempt to create a file or folder using a CVM 124 on the same computing node 102 as the user VM 114 that requested creation of the file, so that the CVM 124 that controls access operations to the file folder is co-located with the user VM 114. In this way, since the user VM 114 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 312 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In particular embodiments, if a virtual machine, such as a user VM 112, CVM 124, or FSVM 302, moves from a computing node 102 to a destination computing node 104, e.g., because of resource availability changes, and data items such as files or folders associated with the VM are not locally accessible on the destination computing node 104, then data migration may be performed for the data items associated with the moved VM to migrate them to the new computing node 104, so that they are local to the moved VM on the new computing node 104. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 312 may change the location of the file by, for example, copying the file from its existing location(s), such as local storage 136 of a computing node 102, to its new location(s), such as local storage 138 of computing node 104 (and to or from other host machines, such as local storage 140 of computing node 106 if appropriate), and deleting the file from its existing location(s). Write operations on the file may be blocked or queued while the file is being copied, so that the copy is consistent. The VFS 312 may also redirect storage access requests for the file from an FSVM at the file's existing location to a FSVM at the file's new location.

In particular embodiments, VFS 312 includes at least three File Server Virtual Machines (FSVMs) 302, 304, 306 located on three respective computing nodes 102, 104, 106. To provide high-availability, there may be a maximum of one FSVM for a particular VFS instance VFS 312 per host machine in a cluster. If two FSVMs are detected on a single host machine, then one of the FSVMs may be moved to another host machine automatically, or the user (e.g., system administrator) may be notified to move the FSVM to another host machine. The user may move a FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which would be more disruptive and more difficult to recover from than loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

Figure 4:
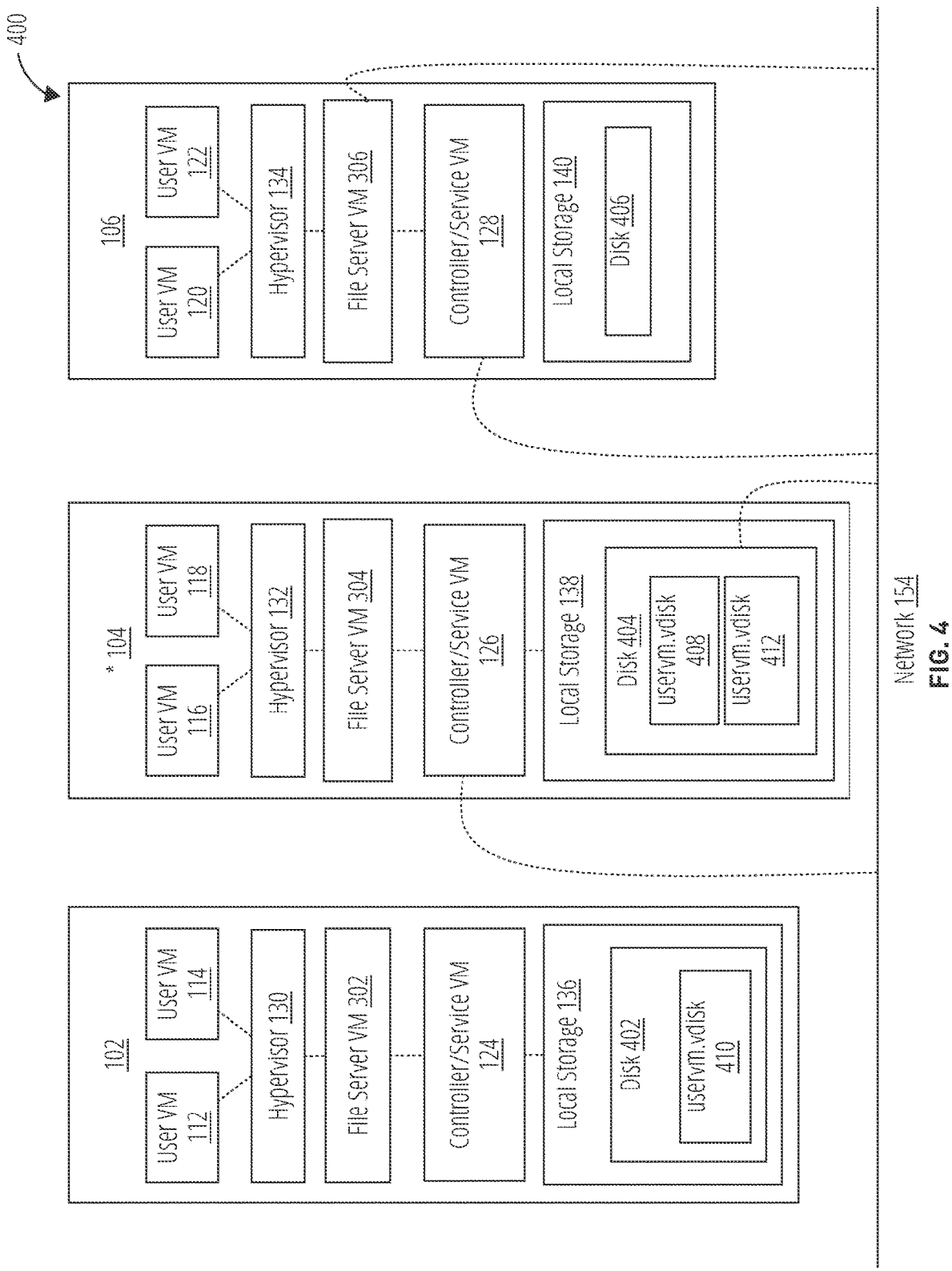
FIG. 4 illustrates a clustered virtualization environment 400 implementing a virtualized file server in which files used by user VMs are stored locally on the same host machines as the user VMs according to particular embodiments.

FIG. 4 illustrates data flow within a clustered virtualization environment 400 implementing a VFS instance (e.g., VFS 312) in which stored items such as files and folders used by user VMs are stored locally on the same computing nodes as the user VMs according to particular embodiments. As described above, one or more user VMs and a Controller/Service VM may run on each computing node along with a hypervisor. As a user VM processes I/O commands (e.g., a read or write operation), the I/O commands may be sent to the hypervisor on the same server or host machine as the user VM. For example, the hypervisor may present to the user VMs a VFS instance, receive an I/O command, and facilitate the performance of the I/O command by passing the command to a FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly-available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via Controller/Service VMs. As described above with reference to FIG. 2, a CVM 124 may have the ability to perform I/O operations using local storage 136 within the same computing node 102 by connecting via the network 154 to cloud storage or NAS, or by connecting via the network 154 to 138, 140 within another computing node 104, 106 (e.g., by connecting to another CVM 126, 128).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders. For example, FIG. 4 illustrates three virtual machine images 410, 408, 412. The virtual machine image 410 may be a file named UserVM.vmdisk (or the like) stored on disk 402 of 136 of computing node 102. The virtual machine image 410 may store the contents of the 112's hard drive. The disk 402 on which the virtual machine image 410 is "local to" the user VM 112 on computing node 102 because the disk 402 is in local storage 136 of the computing node 102 on which the user VM 112 is located. Thus, the user VM 112 may use local (intra-host machine) communication to access the virtual machine image 410 more efficiently, e.g., with less latency and higher throughput, than would be the case if the virtual machine image 410 were stored on disk 404 of local storage 138 of a different computing node 104, because inter-host machine communication across the network 154 would be used in the latter case. Similarly, a virtual machine image 408, which may be a file named UserVM.vmdisk (or the like), is stored on disk 404 of local storage 138 of computing node 104, and the image 408 is local to the user VM 116 located on computing node 104. Thus, the user VM 116 may access the virtual machine image 408 more efficiently than the virtual machine 114 on computing node 102, for example. In another example, the CVM 128 may be located on the same computing node 106 as the user VM 120 that accesses a virtual machine image 412 (UserVM.vmdisk) of the user VM 120, with the virtual machine image 412 being stored on a different computing node 104 than the user VM 120 and the CVM 128. In this example, communication between the user VM 120 and the CVM 128 may still be local, e.g., more efficient than communication between the user VM 120 and a CVM 126 on a different computing node 104, but communication between the CVM 128 and the disk 404 on which the virtual machine image 412 is stored is via the network 154, as shown by the dashed lines between CVM 128 and the network 154 and between the network 154 and local storage 138. The communication between CVM 128 and the disk 404 is not local, and thus may be less efficient than local communication such as may occur between the CVM 128 and a disk 406 in 140 of computing node 106. Further, a user VM 120 on computing node 106 may access data such as the virtual disk image 412 stored on a remote (e.g., non-local) disk 404 via network communication with a CVM 126 located on the remote computing node 104. This case may occur if CVM 128 is not present on computing node 106, e.g., because CVM 128 has failed, or if the FSVM 306 has been configured to communicate with local storage 138 on computing node 104 via the CVM 126 on computing node 104, e.g., to reduce computational load on computing node 106.

In particular embodiments, since local communication is expected to be more efficient than remote communication, the FSVMs may store storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 410 may be associated with the user VM 112 by configuration information of the user VM 112. Storage items may also be associated with a user VM via the identity of a user of the user VM. For example, files and folders owned by the same user ID as the user who is logged into the user VM 112 may be associated with the user VM 112. If the storage items expected to be accessed by a user VM 112 are not stored on the same computing node 102 as the user VM 112, e.g., because of insufficient available storage capacity in local storage 136 of the computing node 102, or because the storage items are expected to be accessed to a greater degree (e.g., more frequently or by more users) by a user VM 116 on a different computing node 104, then the user VM 112 may still communicate with a local CVM 124 to access the storage items located on the remote computing node 104, and the local CVM 124 may communicate with local storage 138 on the remote computing node 104 to access the storage items located on the remote computing node 104. If the user VM 112 on a computing node 102 does not or cannot use a local CVM 124 to access the storage items located on the remote computing node 104, e.g., because the local CVM 124 has crashed or the user VM 112 has been configured to use a remote CVM 126, then communication between the user VM 112 and local storage 138 on which the storage items are stored may be via a remote CVM 126 using the network 154, and the remote CVM 126 may access local storage 138 using local communication on computing node 104. As another example, a user VM 112 on a computing node 102 may access storage items located on a disk 406 of local storage 140 on another computing node 106 via a CVM 126 on an intermediary computing node 104 using network communication between the computing nodes 102 and 104 and between the computing nodes 104 and 106.

Figure 5:
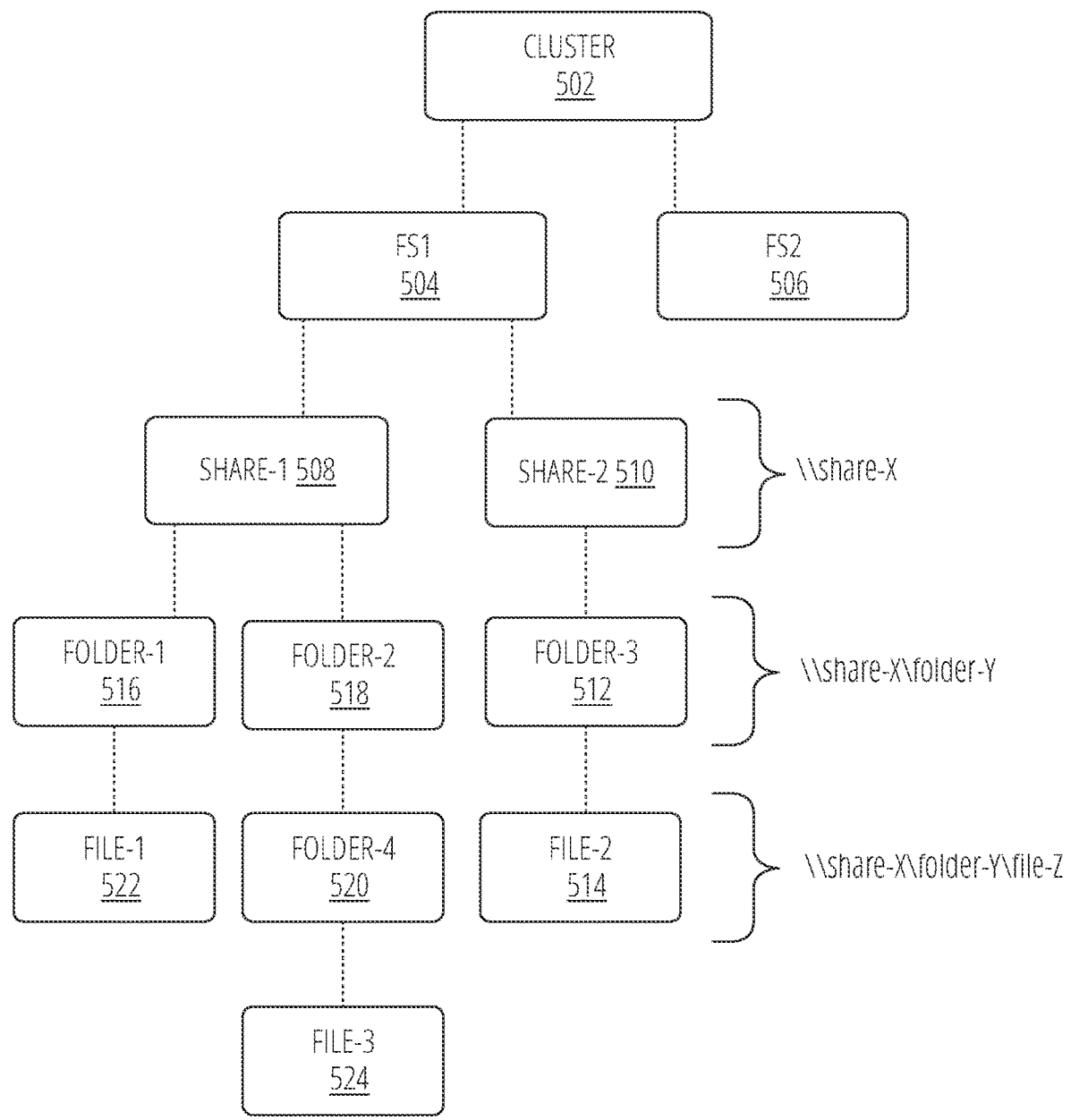
FIG. 5 illustrates an example hierarchical structure of a VFS instance in a cluster according to particular embodiments.

FIG. 5 illustrates an example hierarchical structure of a VFS instance in a cluster according to particular embodiments. A Cluster 502 contains two VFS instances, FS1 504 and FS2 506. Each VFS instance may be identified by a name such as "\instance", e.g., "\FS1" for WINDOWS file systems, or a name such as "instance", e.g., "FS1" for UNIX-type file systems. The VFS instance FS1 504 contains shares, including Share-1 508 and Share-2 510. Shares may have names such as "Users" for a share that stores user home directories, or the like. Each share may have a path name such as \\FS1\Share-1 or \\FS1\Users. As an example and not by way of limitation, a share may correspond to a disk partition or a pool of file system blocks on WINDOWS and UNIX-type file systems. As another example and not by way of limitation, a share may correspond to a folder or directory on a VFS instance. Shares may appear in the file system instance as folders or directories to users of user VMs. Share-1 508 includes two folders, Folder-1 516, and Folder-2 518, and may also include one or more files (e.g., files not in folders). Each folder 516, 518 may include one or more files 522, 524. Share-2 510 includes a folder Folder-3 512, which includes a file File-2 514. Each folder has a folder name such as "Folder-1", "Users", or "Sam" and a path name such as "\\FS1\Share-1\Folder-1" (WINDOWS) or "share-1:/fs1/Users/Sam" (UNIX). Similarly, each file has a file name such as "File-1" or "Forecast.xls" and a path name such as "\\FS1\Share-1\Folder-1\File-1" or "share-1:/fs1/Users/Sam/Forecast.xls".

Figure 6:
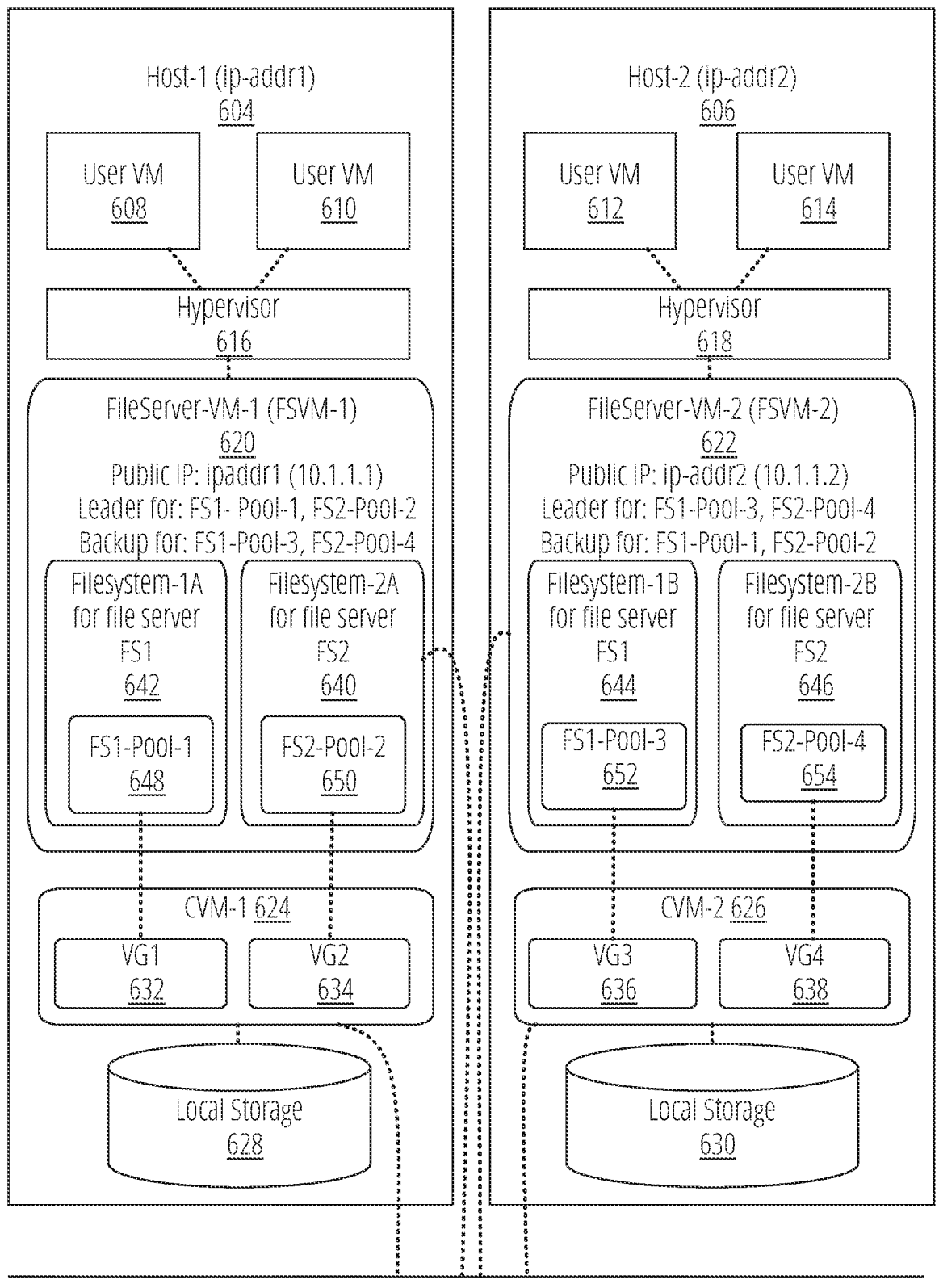
FIG. 6 illustrates two example host machines, each providing file storage services for portions of two VFS instances FS1 and FS2 according to particular embodiments.

FIG. 6 illustrates two example host machines 604 and 606, each providing file storage services for portions of two VFS instances FS1 and FS2 according to particular embodiments. The first host machine, Host-1 604, includes two user VMs 608, 610, a Hypervisor 616, a FSVM named File-Server-VM-1 (abbreviated FSVM-1) 620, a Controller/Service VM named CVM-1 624, and local storage 628. Host-1's FileServer-VM-1 620 has an IP (Internet Protocol) network address of 10.1.1.1, which is an address of a network interface on Host-1 102. Host-1 has a hostname ip-addr1, which may correspond to Host-1's IP address 10.1.1.1. The second host machine, Host-2 606, includes two user VMs 612, 614, a Hypervisor 618, a File Server VM named FileServer-VM-2 (abbreviated FSVM-2) 622, a Controller/Service VM named CVM-2 626, and local storage 630. Host-2's FileServer-VM-2 622 has an IP network address of 10.1.1.2, which is an address of a network interface on Host-2 606.

In particular embodiments, file systems FileSystem-1A 642 and FileSystem-2A 640 implement the structure of files and folders for portions of the FS1 and FS2 file server instances, respectively, that are located on (e.g., served by) FileServer-VM-1 620 on Host-1 604. Other file systems on other host machines may implement other portions of the FS1 and FS2 file server instances. The file systems 642 and 640 may implement the structure of at least a portion of a file server instance by translating file system operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The file systems 642, 640 may thus store their file system data, including the structure of the folder and file hierarchy, the names of the storage items (e.g., folders and files), and the contents of the storage items on one or more storage devices, such as local storage 628. The particular storage device or devices on which the file system data for each file system are stored may be specified by an associated file system pool (e.g., 648 and 650). For example, the storage device(s) on which data for FileSystem-1A 642 and FileSystem-2A, 640 are stored may be specified by respective file system pools FS1-Pool-1 648 and FS2-Pool-2 650. The storage devices for the pool may be selected from volume groups provided by CVM-1 624, such as volume group VG1 632 and volume group VG2 634. Each volume group 632, 634 may include a group of one or more available storage devices that are present in local storage 628 associated with (e.g., by iSCSI communication) the CVM-1 624. The CVM-1 624 may be associated with a local storage 628 on the same host machine 102 as the CVM-1 624, or with a local storage 630 on a different host machine 606. The CVM-1 624 may also be associated with other types of storage, such as cloud storage, networked storage or the like. Although the examples described herein include particular host machines, virtual machines, file servers, file server instances, file server pools, CVMs, volume groups, and associations there between, any number of host machines, virtual machines, file servers, file server instances, file server pools, CVMs, volume groups, and any associations there between are possible and contemplated.

In particular embodiments, the file system pool 648 may associate any storage device in one of the volume groups 632, 634 of storage devices that are available in local storage 628 with the file system FileSystem-1A 642. For example, the file system pool FS1-Pool-1 648 may specify that a disk device named hd1 in the volume group VG1 632 of local storage 628 is a storage device for FileSystem-1A 642 for file server FS1 on FSVM-1 620. A file system pool FS2-Pool-2 650 may specify a storage device FileSystem-2A 650 for file server FS2 on FSVM-1 620. The storage device for FileSystem-2A 640 may be, e.g., the disk device hd1, or a different device in one of the volume groups 632, 634, such as a disk device named hd2 in volume group VG2 634. Each of the file systems FileSystem-1A 642, FileSystem-2A 640 may be, e.g., an instance of the NTFS file system used by the WINDOWS operating system, of the UFS Unix file system, or the like. The term "file system" may also be used herein to refer to an instance of a type of file system, e.g., a particular structure of folders and files with particular names and content.

In one example, referring to FIG. 5 and FIG. 6, an FS1 hierarchy rooted at File Server FS1 504 may be located on FileServer-VM-1 620 and stored in file system instance FileSystem-1A 642. That is, the file system instance FileSystem-1A 642 may store the names of the shares and storage items (such as folders and files), as well as the contents of the storage items, shown in the hierarchy at and below File Server FS1 504. A portion of the FS1 hierarchy shown in FIG. 5, such the portion rooted at Folder-2 518, may be located on FileServer-VM-2 622 on Host-2 606 instead of FileServer-VM-1 620, in which case the file system instance FileSystem-1B 644 may store the portion of the FS1 hierarchy rooted at Folder-2 518, including Folder-3 512, Folder-4 520 and File-3 524. Similarly, an FS2 hierarchy rooted at File Server FS2 506 in FIG. 5 may be located on FileServer-VM-1 620 and stored in file system instance FileSystem-2A 640. The FS2 hierarchy may be split into multiple portions (not shown), such that one portion is located on FileServer-VM-1 620 on Host-1 604, and another portion is located on FileServer-VM-2 622 on Host-2 606 and stored in file system instance FileSystem-2B 646.

In particular embodiments, FileServer-VM-1 (abbreviated FSVM-1) 620 on Host-1 604 is a leader for a portion of file server instance FS1 and a portion of FS2, and is a backup for another portion of FS1 and another portion of FS2. The portion of FS1 for which FileServer-VM-1 620 is a leader corresponds to a storage pool labeled FS1-Pool-1 648. FileServer-VM-1 is also a leader for FS2-Pool-2 650, and is a backup (e.g., is prepared to become a leader upon request, such as in response to a failure of another FSVM) for FS1-Pool-3 652 and FS2-Pool-4 654 on Host-2 606. In particular embodiments, FileServer-VM-2 (abbreviated FSVM-2) 622 is a leader for a portion of file server instance FS1 and a portion of FS2, and is a backup for another portion of FS1 and another portion of FS2. The portion of FS1 for which FSVM-2 622 is a leader corresponds to a storage pool labeled FS1-Pool-3 652. FSVM-2 622 is also a leader for FS2-Pool-4 654, and is a backup for FS1-Pool-1 648 and FS2-Pool-2 650 on Host-1 102.

In particular embodiments, the file server instances FS1, FS2 provided by the FSVMs 620 and 622 may be accessed by user VMs 608, 610, 612 and 614 via a network file system protocol such as SMB, CIFS, NFS, or the like. Each FSVM 620 and 622 may provide what appears to client applications on user VMs 608, 610, 612 and 614 to be a single file system instance, e.g., a single namespace of shares, files and folders, for each file server instance. However, the shares, files, and folders in a file server instance such as FS1 may actually be distributed across multiple FSVMs 620 and 622. For example, different folders in the same file server instance may be associated with different corresponding FSVMs 620 and 622 and CVMs 624 and 626 on different host machines 102 and 606.

The example file server instance FS1 504 shown in FIG. 5 has two shares, Share-1 508 and Share-2 510. Share-1 508 may be located on FSVM-1 620, CVM-1 624, and local storage 628. Network file system protocol requests from user VMs to read or write data on file server instance FS1 504 and any share, folder, or file in the instance may be sent to FSVM-1 620. FSVM-1 620 may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 624 on the same host machine 102 as the FSVM-1, or a different CVM on a different host machine 606, depending on the configuration of the VFS. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 624, which may in turn access the storage device associated with the requested data as specified in the request, e.g., to write specified data to the storage device or read requested data from a specified location on the storage device. In this example, the associated storage device is in local storage 628, and may be an HDD or SSD. CVM-1 624 may access the HDD or SSD via an appropriate protocol, e.g., iSCSI, SCSI, SATA, or the like. CVM 110a may send the results of accessing local storage 628, e.g., data that has been read, or the status of a data write operation, to CVM 624 via, e.g., SATA, which may in turn send the results to FSVM-1 620 via, e.g., iSCSI. FSVM-1 620 may then send the results to user VM via SMB through the Hypervisor 616.

Share-2 510 may be located on FSVM-2 622, on Host-2. Network file service protocol requests from user VMs to read or write data on Share-2 may be directed to FSVM-2 622 on Host-2 by other FSVMs. Alternatively, user VMs may send such requests directly to FSVM-2 622 on Host-2, which may process the requests using CVM-2 626 and local storage 630 on Host-2 as described above for FSVM-1 620 on Host-1.

A file server instance such as FS1 504 in FIG. 5 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 7:
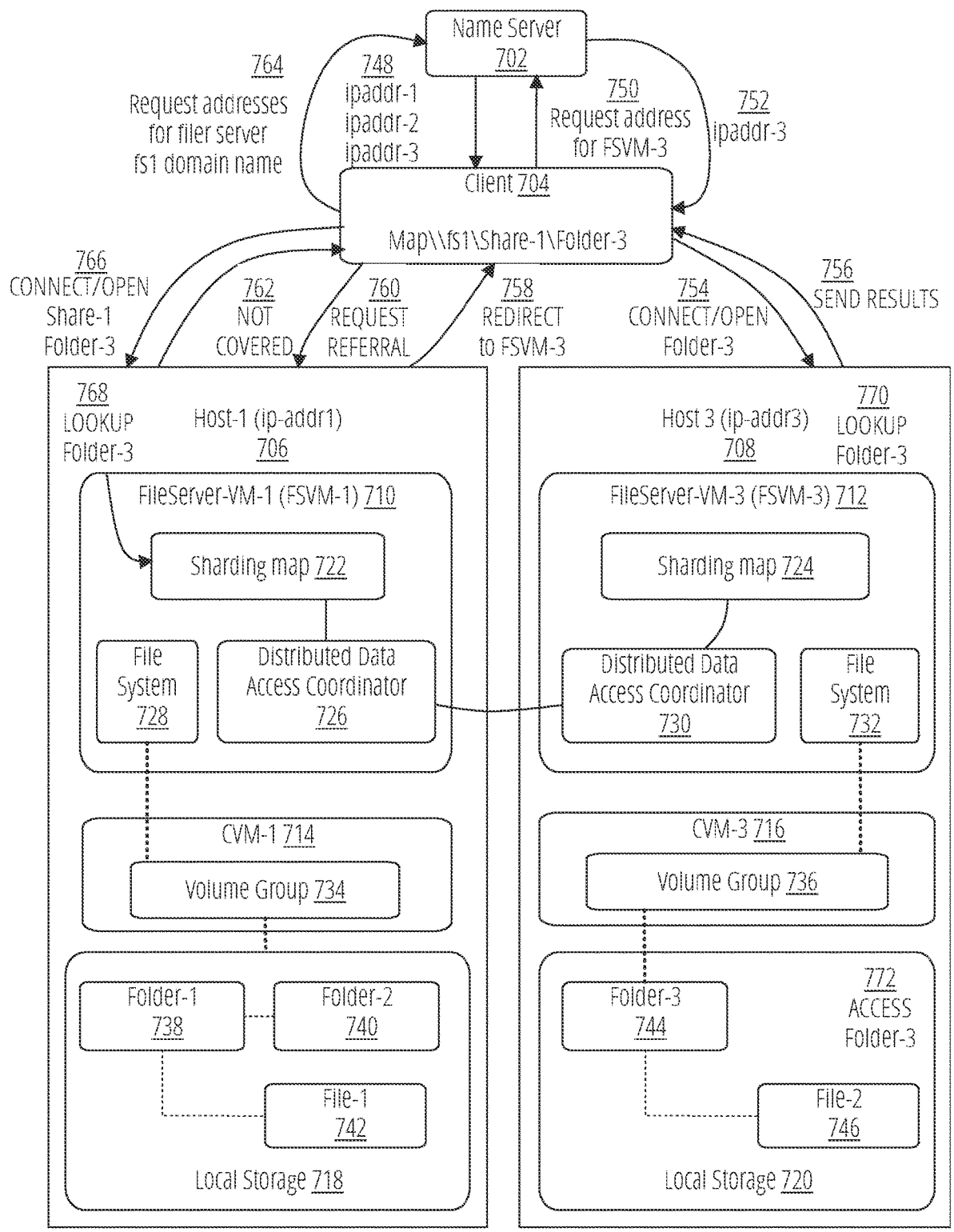
FIG. 7 illustrates example interactions between a client and host machines on which different portions of a VFS instance are stored according to particular embodiments.

FIG. 7 illustrates example interactions between a client 704 and host machines 706 and 708 on which different portions of a VFS instance are stored according to particular embodiments. A client 704, e.g., an application program executing in one of the user VMs and on the host machines of FIGS. 3-4 requests access to a folder \\FS1.domain.name\Share-1\Folder-3. The request may be in response to an attempt to map \\FS1.domain.name\Share-1 to a network drive in the operating system executing in the user VM followed by an attempt to access the contents of Share-1 or to access the contents of Folder-3, such as listing the files in Folder-3.

FIG. 7 shows interactions that occur between the client 704, FSVMs 710 and 712 on host machines 706 and 708, and a name server 702 when a storage item is mapped or otherwise accessed. The name server 702 may be provided by a server computer system, such as one or more of the host machines 706, 708 or a server computer system separate from the host machines 706, 708. In one example, the name server 702 may be provided by an ACTIVE DIRECTORY service executing on one or more computer systems and accessible via the network. The interactions are shown as arrows that represent communications, e.g., messages sent via the network. Note that the client 704 may be executing in a user VM, which may be co-located with one of the FSVMs 710 and 712. In such a co-located case, the arrows between the client 704 and the host machine on which the FSVM is located may represent communication within the host machine, and such intra-host machine communication may be performed using a mechanism different from communication over the network, e.g., shared memory or inter process communication.

In particular embodiments, when the client 704 requests access to Folder-3, a VFS client component executing in the user VM may use a distributed file system protocol such as MICROSOFT DFS, or the like, to send the storage access request to one or more of the FSVMs of FIGS. 3-4. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \\FS1.domain.name\Share-1\Folder-3, then the client retrieves the associated network address from the domain cache and sends the access request to the network address, starting at step 764 as described below.

In particular embodiments, at step 764, the client may send a request for a list of addresses of FSVMs to a name server 702. The name server 702 may be, e.g., a DNS server or other type of server, such as a MICROSOFT domain controller (not shown), that has a database of FSVM addresses. At step 748, the name server 702 may send a reply that contains a list of FSVM network addresses, e.g., ip-addr1, ip-addr2, and ip-addr3, which correspond to the FSVMs in this example. At step 766, the client 704 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 702. The access request may be, e.g., an SMB connect request, an NFS open request, and/or appropriate request(s) to traverse the hierarchy of Share-1 to reach the desired folder or file, e.g., Folder-3 in this example.

At step 768, FileServer-VM-1 710 may process the request received at step 766 by searching a mapping or lookup table, such as a sharding map 722, for the desired folder or file. The map 722 maps stored objects, such as shares, folders, or files, to their corresponding locations, e.g., the names or addresses of FSVMs. The map 722 may have the same contents on each host machine, with the contents on different host machines being synchronized using a distributed data store as described below. For example, the map 722 may contain entries that map Share-1 and Folder-1 to the File Server FSVM-1 710, and Folder-3 to the File Server FSVM-3 712. An example map is shown in Table 1 below.

| Stored Object | Location |
| --- | --- |
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 722 or 724 may be accessible on each of the host machines. As described with reference to FIGS. 3-4, the maps may be copies of a distributed data structure that are maintained and accessed at each FSVM using a distributed data access coordinator 726 and 730. The distributed data access coordinator 726 and 730 may be implemented based on distributed locks or other storage item access operations. Alternatively, the distributed data access coordinator 726 and 730 may be implemented by maintaining a master copy of the maps 722 and 724 at a leader node such as the host machine 708, and using distributed locks to access the master copy from each FSVM 710 and 712. The distributed data access coordinator 726 and 730 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 722 indicates that Folder-3 is located at FSVM-3 712 on Host-3 708, the lookup operation at step 768 determines that Folder-3 is not located at FSVM-1 on Host-1 706. Thus, at step 762 the FSVM-1 710 sends a response, e.g., a "Not Covered" DFS response, to the client 704 indicating that the requested folder is not located at FSVM-1. At step 760, the client 704 sends a request to FSVM-1 for a referral to the FSVM on which Folder-3 is located. FSVM-1 uses the map 722 to determine that Folder-3 is located at FSVM-3 on Host-3 708, and at step 758 returns a response, e.g., a "Redirect" DFS response, redirecting the client 704 to FSVM-3. The client 704 may then determine the network address for FSVM-3, which is ip-addr3 (e.g., a host name "ip-addr3.domain.name" or an IP address, 10.1.1.3). The client 704 may determine the network address for FSVM-3 by searching a cache stored in memory of the client 704, which may contain a mapping from FSVM-3 to ip-addr3 cached in a previous operation. If the cache does not contain a network address for FSVM-3, then at step 750 the client 704 may send a request to the name server 702 to resolve the name FSVM-3. The name server may respond with the resolved address, ip-addr3, at step 752. The client 704 may then store the association between FSVM-3 and ip-addr3 in the client's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines and, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 754, the client 704 may send an access request to FSVM-3 712 at ip-addr3 on Host-3 708 requesting the contents of Folder-3 of Share-1. At step 770, FSVM-3 712 queries FSVM-3's copy of the map 724 using FSVM-3's instance of the distributed data access coordinator 730. The map 724 indicates that Folder-3 is located on FSVM-3, so at step 772 FSVM-3 accesses the file system 732 to retrieve information about Folder-3 744 and its contents (e.g., a list of files in the folder, which includes File-2 746) that are stored on the local storage 720. FSVM-3 may access local storage 720 via CVM-3 716, which provides access to local storage 720 via a volume group 736 that contains one or more volumes stored on one or more storage devices in local storage 720. At step 756, FSVM-3 may then send the information about Folder-3 and its contents to the client 704. Optionally, FSVM-3 may retrieve the contents of File-2 and send them to the client 704, or the client 704 may send a subsequent request to retrieve File-2 as needed.

Figure 8:
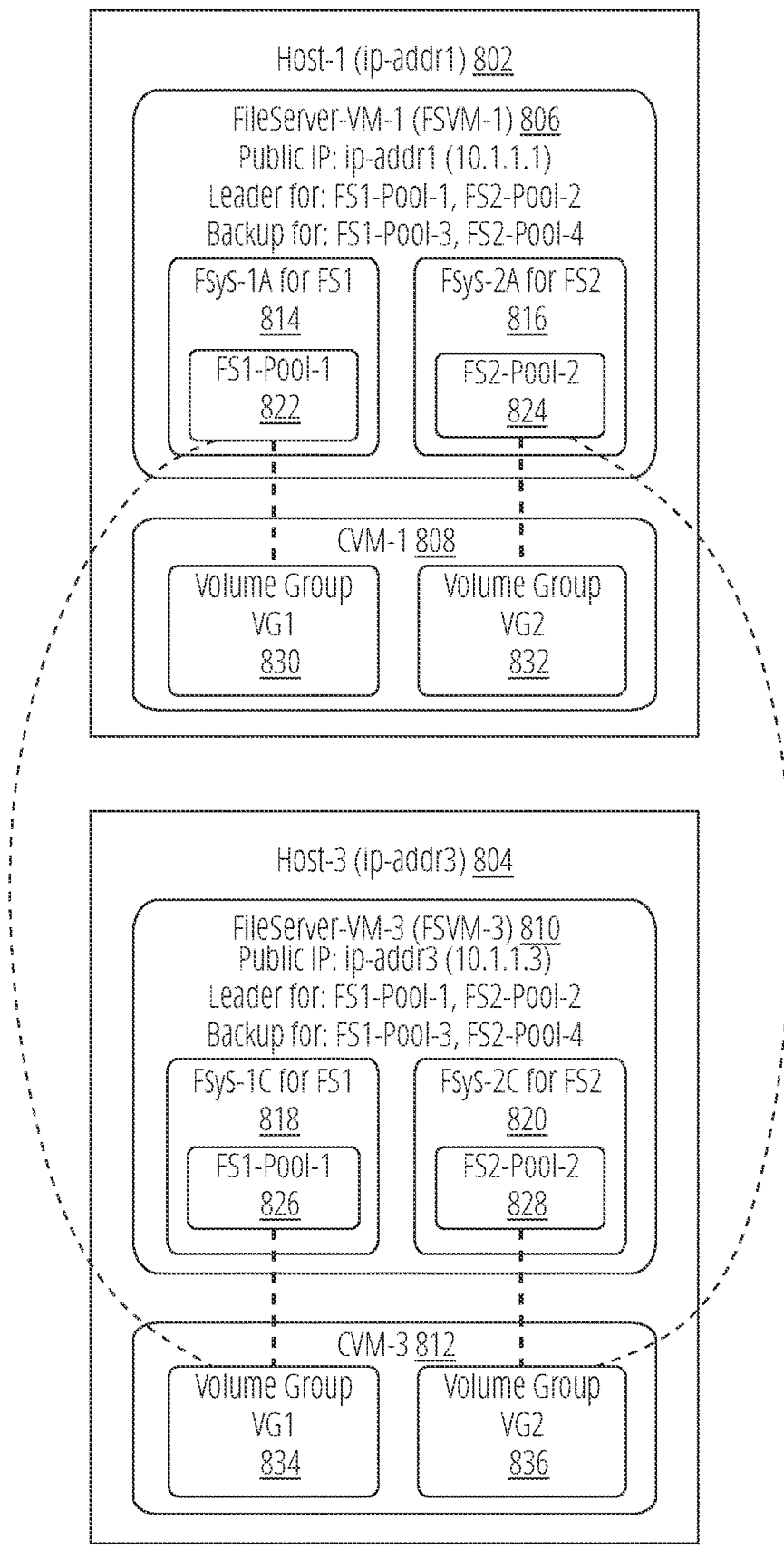
FIG. 8 illustrates an example virtualized file server having a failover capability according to particular embodiments.

FIG. 8 illustrates an example virtualized file server having a failover capability according to particular embodiments. To provide high availability, e.g., so that the file server continues to operate after failure of components such as a CVM, FSVM, or both, as may occur if a host machine fails, components on other host machines may take over the functions of failed components. When a CVM fails, a CVM on another host machine may take over input/output operations for the failed CVM. Further, when an FSVM fails, an FSVM on another host machine may take over the network address and CVM or volume group that were being used by the failed FSVM. If both an FSVM and an associated CVM on a host machine fail, as may occur when the host machine fails, then the FSVM and CVM on another host machine may take over for the failed FSVM and CVM. When the failed FSVM and/or CVM are restored and operational, the restored FSVM and/or CVM may take over the operations that were being performed by the other FSVM and/or CVM. In FIG. 8, FSVM-1 806 communicates with CVM-1 808 to use the data storage in volume groups VG1 830 and VG2 832. For example, FSVM-1 is using disks in VG1 and VG2, which are iSCSI targets. FSVM-1 has iSCSI initiators that communicate with the VG1 and VG2 targets using MPIO (e.g., DM-MPIO on the LINUX operating system). FSVM-1 may access the volume groups VG1 and VG2 via in-guest iSCSI. Thus, any FSVM may connect to any iSCSI target if an FSVM failure occurs.

In particular embodiments, during failure-free operation, there are active iSCSI paths between FSVM-1 and CVM-1, as shown in FIG. 8 by the dashed lines from the FSVM-1 file systems for FS1 814 and FS2 816 to CVM-1's volume group VG1 830 and VG2 832, respectively. Further, during failure-free operation there are inactive failover (e.g., standby) paths between FSVM-1 and CVM-3 812, which is located on Host-3. The failover paths may be, e.g., paths that are ready to be activated in response to the local CVM CVM-1 becoming unavailable. There may be additional failover paths that are not shown in FIG. 8. For example, there may be failover paths between FSVM-1 and a CVM on another host machine. The local CVM CVM-1 808 may become unavailable if, for example, CVM-1 crashes, or the host machine on which the CVM-1 is located crashes, loses power, loses network communication between FSVM-1 806 and CVM-1 808. As an example and not by way of limitation, the failover paths do not perform I/O operations during failure-free operation. Optionally, metadata associated with a failed CVM 808, e.g., metadata related to volume groups 830, 832 associated with the failed CVM 808, may be transferred to an operational CVM, e.g., CVM 812, so that the specific configuration and/or state of the failed CVM 808 may be re-created on the operational CVM 812.

Figure 9:
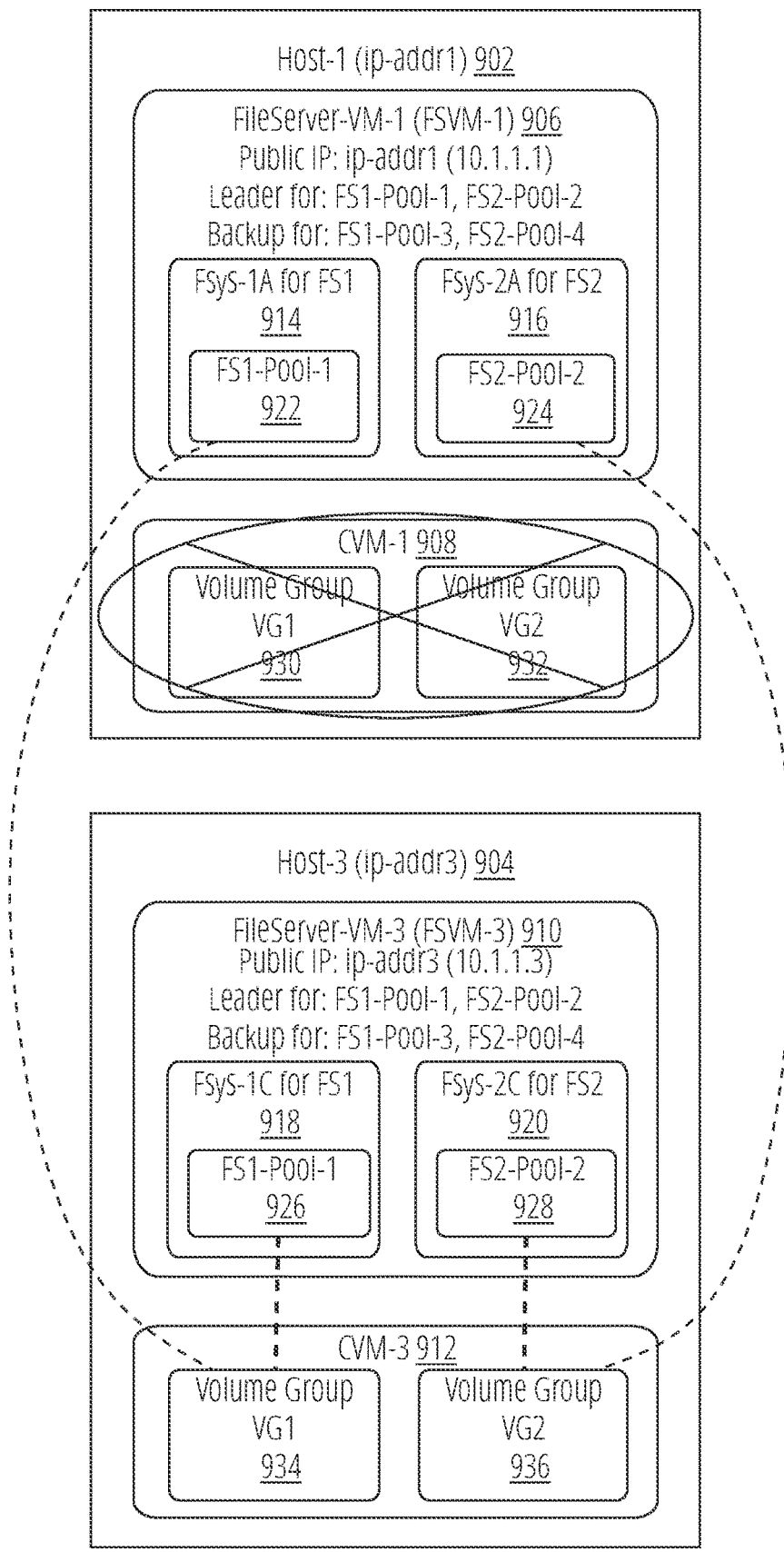
FIG. 9 illustrates an example virtualized file server that has recovered from a failure of a controller/service VM by switching to an alternate controller/service VM according to particular embodiments.

FIG. 9 illustrates an example virtualized file server that has recovered from a failure of Controller/Service VM CVM-1 908 by switching to an alternate Controller/Service VM CVM-3 912 according to particular embodiments. When CVM-1 908 fails or otherwise becomes unavailable, then the FSVM associated with CVM-1, FSVM-1 906, may detect a PATH DOWN status on one or both of the iSCSI targets for the volume groups VG1 930 and VG2 932, and initiate failover to a remote CVM that can provide access to those volume groups VG1 and VG2. For example, when CVM-1 908 fails, the iSCSI MPIO may activate failover (e.g., standby) paths to the remote iSCSI target volume group(s) associated with the remote CVM-3 912 on Host-3 904. CVM-3 provides access to volume groups VG1 and VG2 as VG1 934 and VG2 936, which are on storage device(s) of local storage. The activated failover path may take over I/O operations from failed CVM-1 908. Optionally, metadata associated with the failed CVM-1 908, e.g., metadata related to volume groups 930, 932, may be transferred to CVM-3 so that the specific configuration and/or state of CVM-1 may be re-created on CVM-3. When the failed CVM-1 again becomes available, e.g., after it has been re-started and has resumed operation, the path between FSVM-1 and CVM-1 may reactivated or marked as the active path, so that local I/O between CVM-1 and FSVM-1 may resume, and the path between CVM-3 and FSVM-1 may again become a failover (e.g., standby) path.

Figure 10:
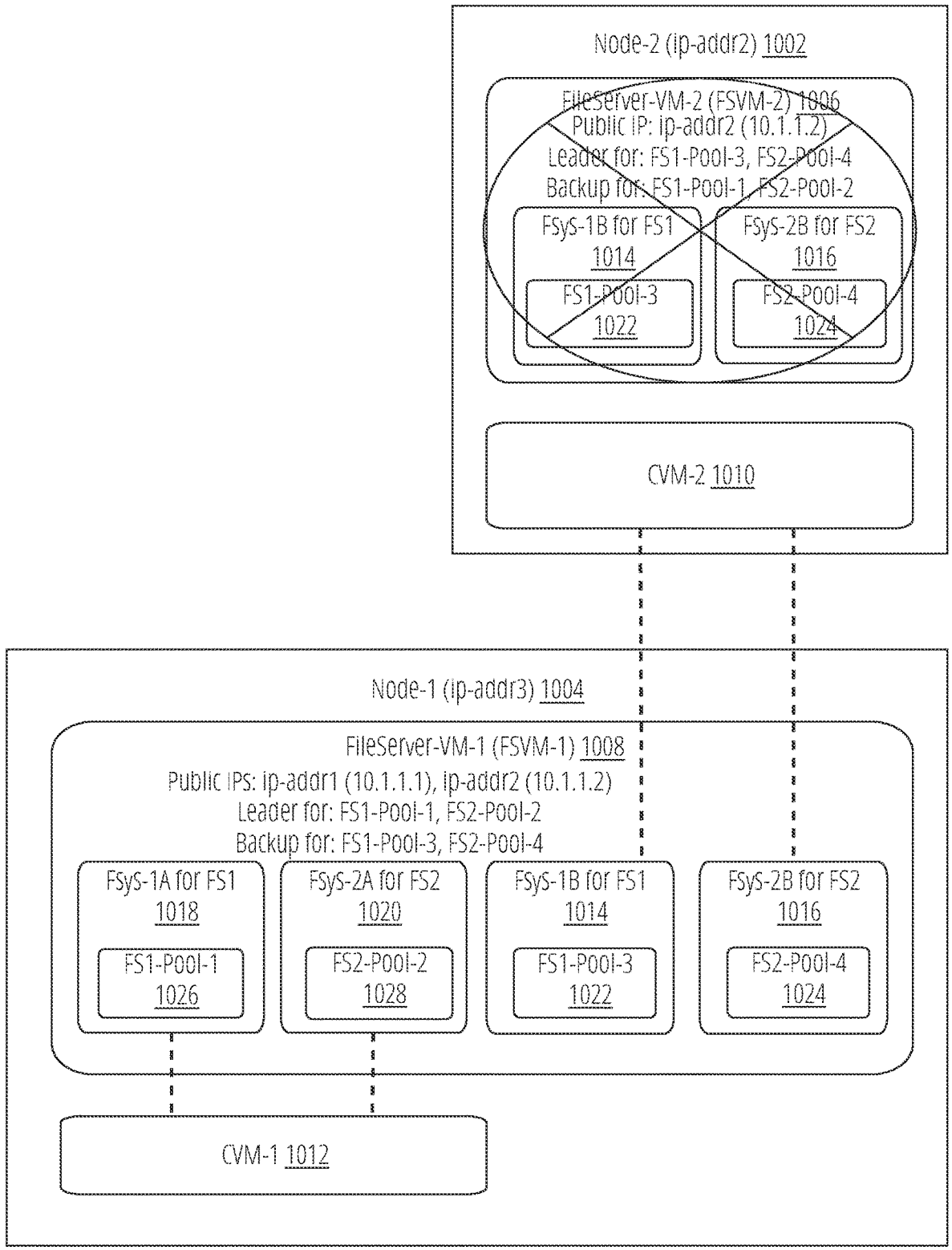
FIG. 10 illustrates an example virtualized file server that has recovered from failure of a file server VM by electing a new leader file server VM according to particular embodiments.

FIG. 10 illustrates an example virtualized file server that has recovered from failure of a FSVM by electing a new leader FSVM according to particular embodiments. When an FSVM-2 1006 fails, e.g., because it has been brought down for maintenance, has crashed, the host machine on which it was executing has been powered off or crashed, network communication between the FSVM and other FSVMs has become inoperative, or other causes, then the CVM that was being used by the failed FSVM, the CVM's associated volume group(s), and the network address of the host machine on which the failed FSVM was executing may be taken over by another FSVM to provide continued availability of the file services that were being provided by the failed FSVM. In the example shown in FIG. 10, FSVM-2 1006 on Host-2 1002 has failed. One or more other FSVMs, e.g., FSVM-1 1008 or FSVM-3, or other components located on one or more other host machines, may detect the failure of FSVM-2, e.g., by detecting a communication timeout or lack of response to a periodic status check message. When FSVM-2's failure is detected, an election may be held, e.g., using a distributed leader election process such as that provided by the centralized coordination service. The host machine that wins the election may become the new leader for the file system pools 1022, 1024 for which the failed FSVM-2 was the leader. In this example, FSVM-1 1008 wins the election and becomes the new leader for the pools 1022, 1024. FSVM-1 1008 thus attaches to CVM-2 1010 by creating file system 1014, 1016 instances for the file server instances FS1 and FS2 using FS1-Pool-3 1022 and FS2-Pool-4 1024, respectively. In this way, FSVM-1 takes over the file systems and pools for CVM-2's volume groups, e.g., volume groups VG1 and VG2 of local storage. Further, FSVM-1 takes over the IP address associated with FSVM-2, 10.10.1.2, so that storage access requests sent to FSVM-2 are received and processed by FSVM-1. Optionally, metadata used by FSVM-1, e.g., metadata associated with the file systems, may be transferred to FSVM-3 so that the specific configuration and/or state of the file systems may be re-created on FSVM-3. Host-2 1002 may continue to operate, in which case CVM-2 1010 may continue to execute on Host-2. When FSVM-2 again becomes available, e.g., after it has been re-started and has resumed operation, FSVM-2 may assert leadership and take back its IP address (10.1.1.2) and storage (FS1-Pool-3 1022 and FS2-Pool-4 1024) from FSVM-1.

Figure 11:
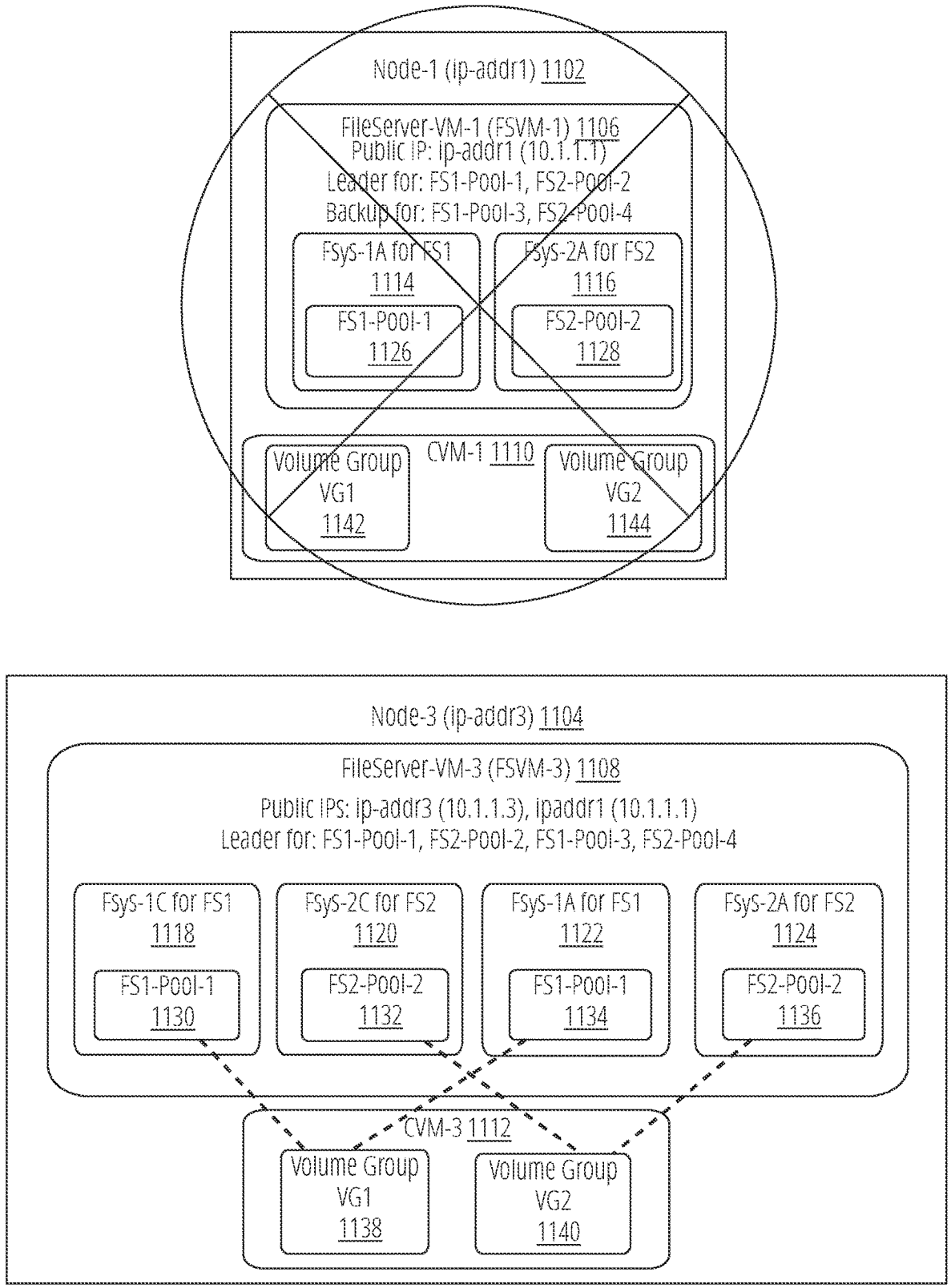
FIG. 11 illustrates an example failure of a host machine that causes failure of both the file server VM and the controller/service VM located on the host machine according to particular embodiments.
Figure 12:
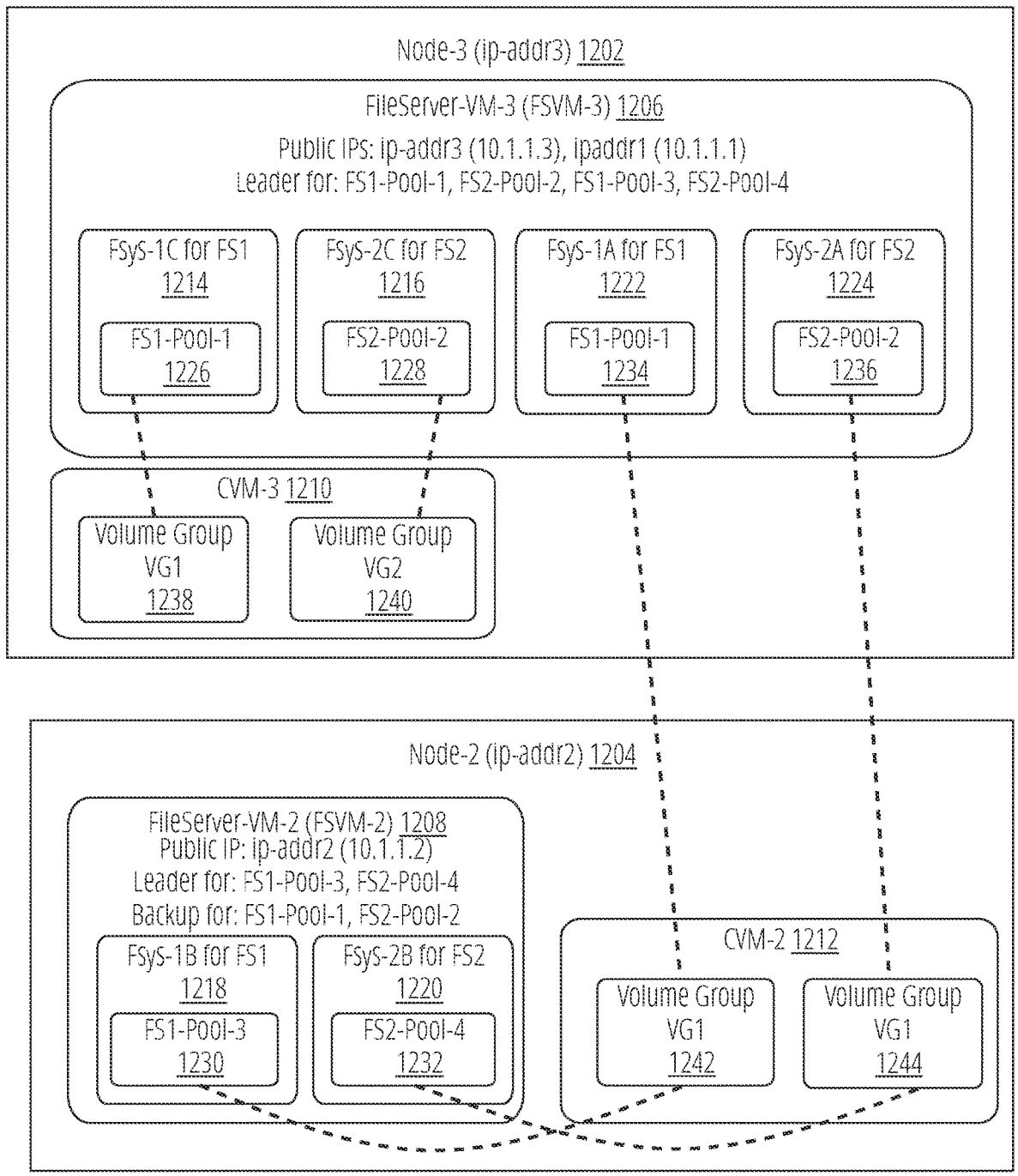
FIG. 12 illustrates an example virtualized file server that has recovered from a host machine failure by switching to a controller/service VM and a file server VM located on a backup host machine according to particular embodiments.

FIGS. 11 and 12 illustrate example virtualized file servers that have recovered from failure of a host machine by switching to another Controller/Service VM and another FSVM according to particular embodiments. The other Controller/Service VM and FSVM are located on a single host machine 1104 in FIG. 10, and on two different host machines 200b, 200c in FIG. 3H. In both FIGS. 3G and 3H, Host-1 has failed, e.g., crashed or otherwise become inoperative or unresponsive to network communication. Both FSVM-1 and CVM-1 located on the failed Host-1 have thus failed. Note that the CVM and FSVM on a particular host machine may both fail even if the host machine itself does not fail. Recovery from failure of a CVM and an FSVM located on the same host machine, regardless of whether the host machine itself failed, may be performed as follows. The failure of FSVM-1 and CVM-1 may be detected by one or more other FSVMs, e.g., FSVM-2, FSVM-3, or by other components located on one or more other host machines. FSVM-1's failure may be detected when a communication timeout occurs or there is no response to a periodic status check message within a timeout period, for example. CVM-1's failure may be detected when a PATH DOWN condition occurs on one or more of CVM-1's volume groups' targets (e.g., iSCSI targets).

When FSVM-1's failure is detected, an election may be held as described above with reference to FIG. 10 to elect an active FSVM to take over leadership of the portions of the file server instance for which the failed FSVM was the leader. These portions are FileSystem-1A 1122 for the portion of file server FS1 located on FSVM-1, and FileSystem-2A 1124 for the portion of file server FS2 located on FSVM-1. FileSystem-1A 1122 uses the pool FS-Pool-1 FS1-Pool-1 1134 and FileSystem-2A 1124 uses the pool FS2-Pool-2 1136. Thus, the FileSystem-1A 364a and FileSystem-2A may be re-created on the new leader FSVM-3 1108 on Host-3 1104. Further, FSVM-3 1108 may take over the IP address associated with failed FSVM-1 1106, 10.1.1.1, so that storage access requests sent to FSVM-1 are received and processed by FSVM-3.

One or more failover paths from an FSVM to volume groups on one or more CVMs may be defined for use when a CVM fails. When CVM-1's failure is detected, the MPIO may activate one of the failover (e.g., standby) paths to remote iSCSI target volume group(s) associated with a remote CVM. For example, there may be a first predefined failover path from FSVM-1 to the volume groups VG1 1138, 1140 in CVM-3 (which are on the same host as FSVM-1 when FSVM-1 is restored on Host-3 in examples of FIGS. 11 and 12), and a second predefined failover path to the volume groups VG1 1242, VG2 1242 in CVM-2. The first failover path, to CVM-3, is shown in FIG. 11, and the second failover path, to CVM-2 is shown in FIG. 12. An FSVM or MPIO may choose the first or second failover path according to the predetermined MPIO failover configuration that has been specified by a system administrator or user. The failover configuration may indicate that the path is selected (a) by reverting to the previous primary path, (b) in order of most preferred path, (c) in a round-robin order, (d) to the path with the least number of outstanding requests, (e) to the path with the least weight, or (f) to the path with the least number of pending requests. When failure of CVM-1 is detected, e.g., by FSVM-1 or MPIO detecting a PATH DOWN condition on one of CVM-1's volume groups VG1 or VG2, the alternate CVM on the selected failover path may take over I/O operations from the failed CVM-1. As shown in FIG. 11, if the first failover path is chosen, CVM-3 1112 on Host-3 1104 is the alternate CVM, and the pools FS1-Pool-1 1134 and FS2-Pool-2 1136, used by the file systems FileSystem-1A 1122 and FileSystem-2A 1124, respectively, which have been restored on FSVM-3 on Host-3, may use volume groups VG1 1138 and VG2 1140 of CVM-3 1112 on Host-3 when the first failover path is chosen. Alternatively, as shown in FIG. 12, if the second failover path is chosen, CVM-2 on Host-2 is the alternate CVM, and the pools FS1-Pool-1 1234 and FS2-Pool-2 1236 used by the respective file systems FileSystem-1A 1222 and FileSystem-2A 1224, which have been restored on FSVM-3, may use volume groups VG1 1242 and VG2 1244 on Host-2, respectively.

Optionally, metadata used by FSVM-1 1106, e.g., metadata associated with the file systems, may be transferred to FSVM-3 as part of the recovery process so that the specific configuration and/or state of the file systems may be re-created on FSVM-3. Further, metadata associated with the failed CVM-1 1110, e.g., metadata related to volume groups 1142, 1144, may be transferred to the alternate CVM (e.g., CVM-2 or CVM-3) that the specific configuration and/or state of CVM-1 may be re-created on the alternative CVM. When FSVM-1 again becomes available, e.g., after it has been re-started and has resumed operation on Host-1 1102 or another host machine, FSVM-1 may assert leadership and take back its IP address (10.1.1.1) and storage assignments (FileSystem-1A and FS1-Pool-1 1126, and FileSystem-2A and FS2-Pool-2 1128) from FSVM-3. When CVM-1 again becomes available, MPIO or FSVM-1 may switch the FSVM to CVM communication paths (iSCSI paths) for FileSystem-1A 1114 and FileSystem-2A 1116 back to the pre-failure paths, e.g., the paths to volume groups VG1 1142 and 1144 in CVM-1 1110, or the selected alternate path may remain in use. For example, the MPIO configuration may specify that fail back to FSVM-1 is to occur when the primary path is restored, since communication between FSVM-1 and CVM-1 is local and may be faster than communication between FSVM-1 and CVM-2 or CVM-3. In this case, the paths between CVM-2 and/or CVM-3 and FSVM-1 may again become failover (e.g., standby) paths.

Figure 13:
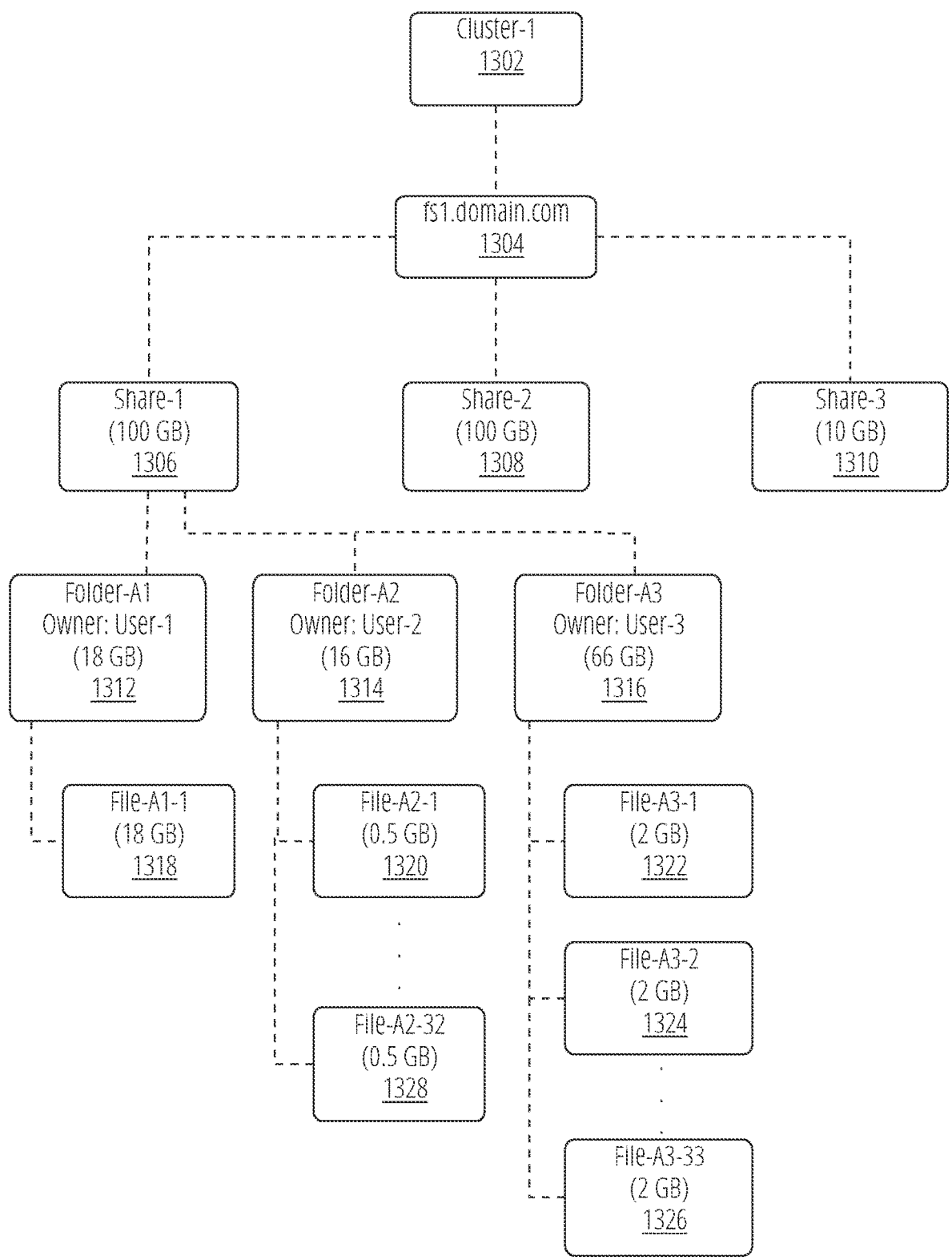
FIG. 13 illustrates an example hierarchical namespace of a file server according to particular embodiments.
Figure 14:
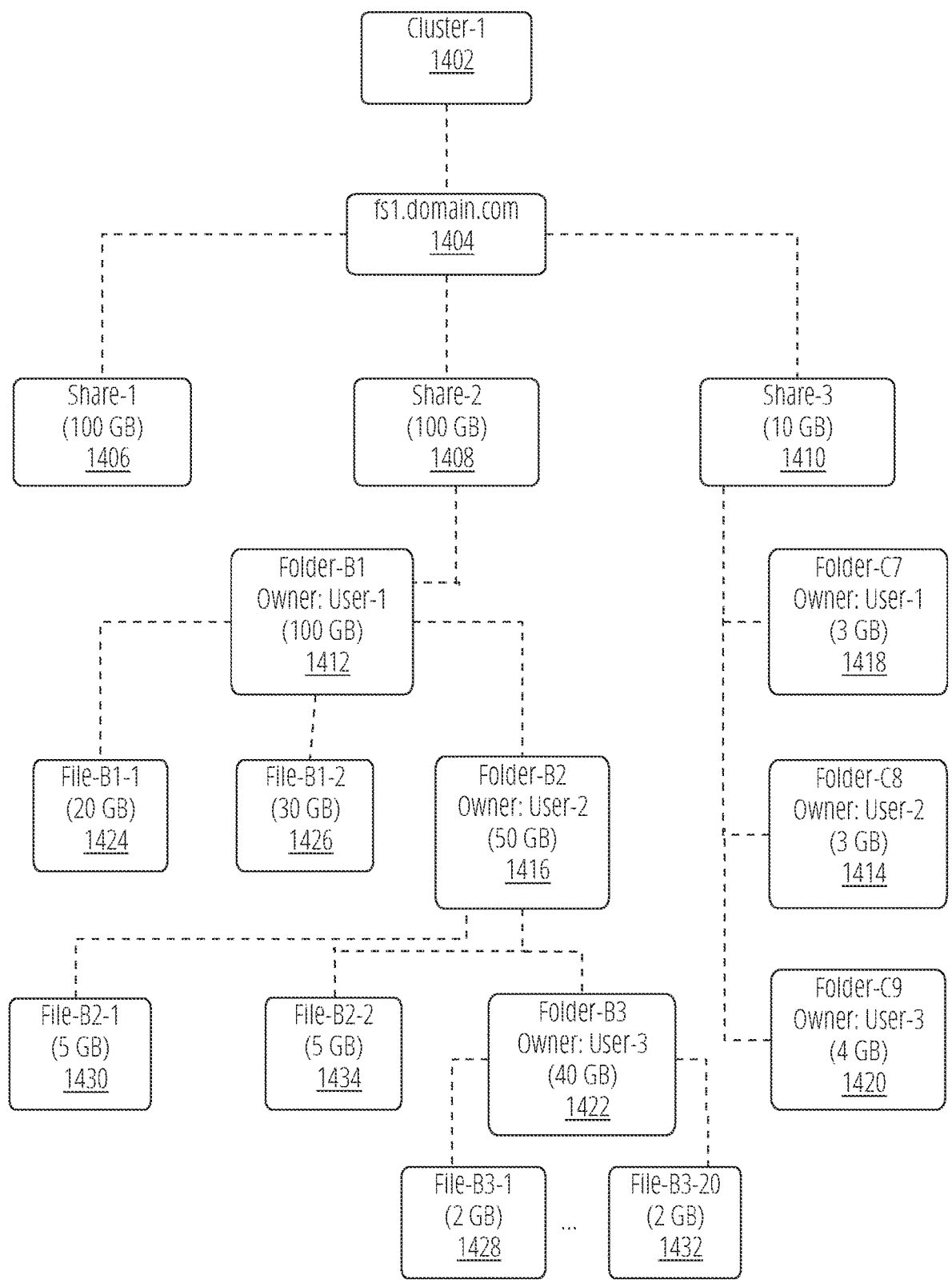
FIG. 14 illustrates an example hierarchical namespace of a file server according to particular embodiments.

FIGS. 13 and 14 illustrate an example hierarchical namespace of a file server according to particular embodiments. Cluster-1 1302 is a cluster, which may contain one or more file server instances, such as an instance named FS1.domain.com 1304. Although one cluster is shown in FIGS. 13 and 14, there may be multiple clusters, and each cluster may include one or more file server instances. The file server FS1.domain.com 1304 contains three shares: Share-1 1306, Share-2 1308, and Share-3 1310. Share-1 may be a home directory share on which user directories are stored, and Share-2 and Share-3 may be departmental shares for two different departments of a business organization, for example. Each share has an associated size in gigabytes, e.g., 100 GB (gigabytes) for Share-1, 100 GB for Share-2, and 10 GB for Share-3. The sizes may indicate a total capacity, including used and free space, or may indicate used space or free space. Share-1 includes three folders, Folder-A1 1312, Folder-A2 1314, and Folder-A3 1316. The capacity of Folder-A1 is 18 GB, Folder-A2 is 16 GB, and Folder-A3 is 66 GB. Further, each folder is associated with a user, referred to as an owner. Folder-A1 is owned by User-1, Folder-A2 by User-2, and Folder-A3 by User-3. Folder-A1 contains a file named File-A1-1 418, of size 18 Gb. Folder-A2 contains 32 files, each of size 0.5 GB, named File-A2-1 1320 through File-A2-32 1328. Folder-A3 contains 33 files, each of size 2 GB, named File-A3-1 1322 and File-A3-2 1324 through File-A3-33 1326.

FIG. 14 shows the contents of Share-2 1408 and Share-3 1410 of FS1.domain.com 1404. Share-2 contains a folder named Folder-B1 440, owned by User-1 and having a size of 100 Gb. Folder-B1 contains File-B1-1 1424 of size 20 Gb, File-B1-2 1426 of size 30 Gb, and Folder-B2 1416, owned by User-2 and having size 50 Gb. Folder-B2 contains File-B2-1 1430 of size 5 Gb, File-B2-2 1434 of size 5 Gb, and Folder-B3 1422, owned by User-3 and having size 40 Gb. Folder-B3 1422 contains 20 files of size 2 Gb each, named File-B3-1 1428 through File-B3-20 1432. Share-3 contains three folders: Folder-C7 1418 owned by User-1 of size 3 GB, Folder-C8 1414 owned by User-2 of size 3 GB, and Folder-C9 1420 owned by User-3 of size 4 GB.

Figure 15:
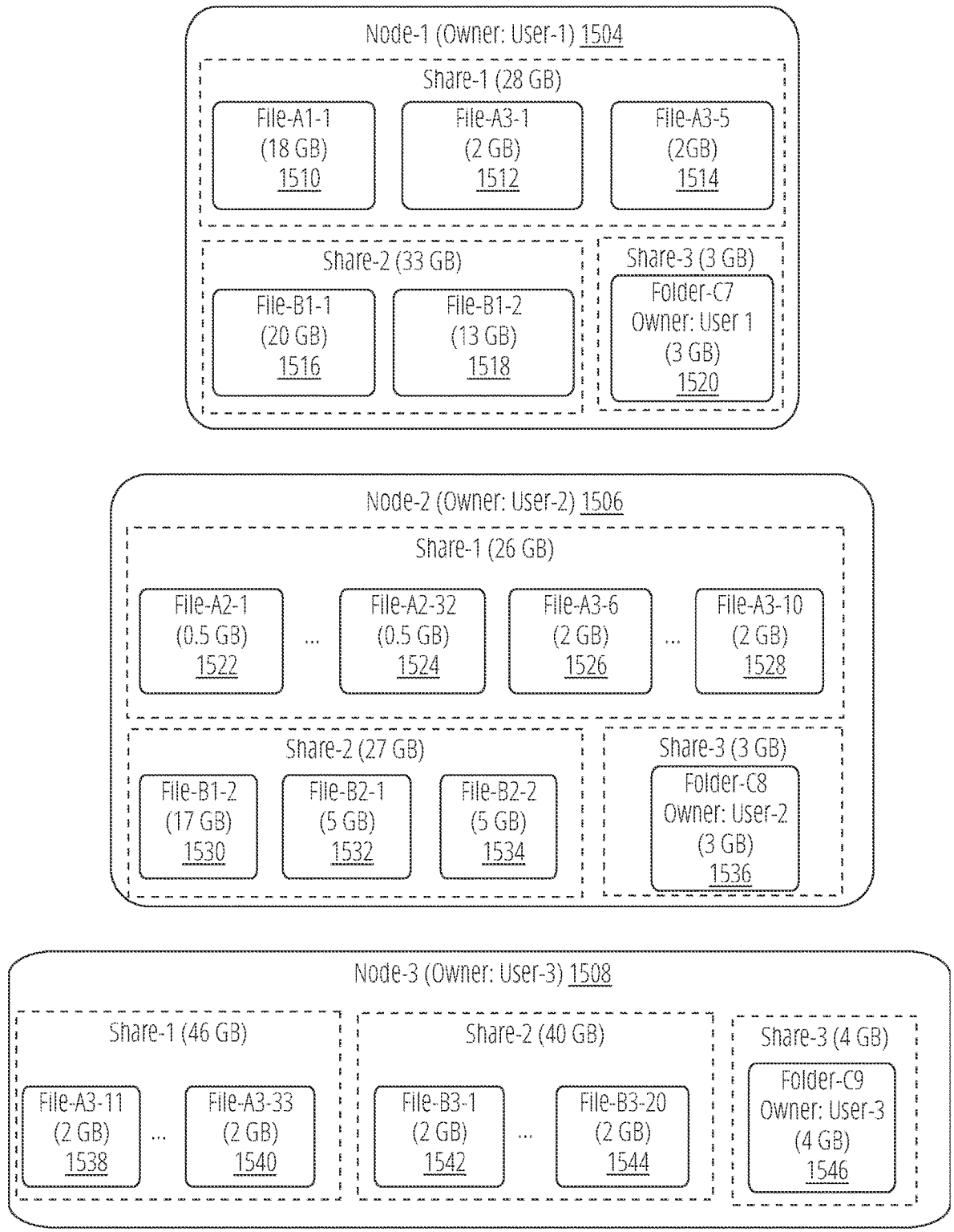
FIG. 15 illustrates distribution of stored data amongst host machines in a virtualized file server according to particular embodiments.

FIG. 15 illustrates distribution of stored data amongst host machines in a virtualized file server according to particular embodiments. In the example of FIG. 15, the three shares are spread across three host machines 1504, 1506, and 1508. Approximately one-third of each share is located on each of the three FSVMs. For example, approximately one-third of Share-3's files are located on each of the three FSVMs. Note that from a user's point of a view, a share looks like a directory. Although the files in the shares (and in directories) are distributed across the three host machines 1504, 1506, and 1508, the VFS provides a directory structure having a single namespace in which client executing on user VMs may access the files in a location-transparent way, e.g., without knowing which host machines store which files (or which blocks of files).

In the example of FIG. 15, Host-1 stores (e.g., is assigned to) 28 Gb of Share-1, including 18 Gb for File-A1-1 1510 and 2 Gb each for File-A3-1 1512 through File-A3-5 1514, 33 Gb of Share-2, including 20 Gb for File-B1-1 and 13 Gb for File-B1-2, and 3 Gb of Share-3, including 3 Gb of Folder-C7. Host-2 stores 26 Gb of Share-1, including 0.5 Gb each of File-A2-1 1522 through File-A2-32 1524 (16 Gb total) and 2 Gb each of File-A3-6 1526 through File-A3-10 1528 (10 Gb total), 27 Gb of Share-2, including 17 Gb of File-B1-2, 5 Gb of File-B2-1, and 5 Gb of File-B2-2, and 3 Gb of Share-3, including 3 Gb of Folder-C8. Host-3 stores 46 GB of Share-1, including 2 GB each of File-A3-11 1538 through File-A3-33 1540 (66 GB total), 40 GB of Share-2, including 2 GB each of File-B3-1 1542 through File-B3-20 1544, and Share-3 stores 4 GB of Share-3, including 4 GB of Folder-C9 1546.

In particular embodiments, a system for managing communication connections in a virtualization environment includes a plurality of host machines implementing a virtualization environment. Each of the host machines includes a hypervisor and at least one user virtual machine (user VM). The system may also include a connection agent, an I/O controller, and/or a virtual disk comprising a plurality of storage devices. The virtual disk may be accessible by all of the I/O controllers, and the I/O controllers may conduct I/O transactions with the virtual disk based on I/O requests received from the user VMs. The I/O requests may be, for example, requests to perform particular storage access operations such as list folders and files in a specified folder, create a new file or folder, open an existing file for reading or writing, read data from or write data to a file, as well as file manipulation operations to rename, delete, copy, or get details, such as metadata, of files or folders. Each I/O request may reference, e.g., identify by name or numeric identifier, a file or folder on which the associated storage access operation is to be performed. The system further includes a virtualized file server, which includes a plurality of FSVMs and associated local storage. Each FSVM and associated local storage device is local to a corresponding one of the host machines. The FSVMs conduct I/O transactions with their associated local storage based on I/O requests received from the user VMs. For each one of the host machines, each of the user VMs on the one of the host machines sends each of its respective I/O requests to a selected one of the FSVMs, which may be selected based on a lookup table, e.g., a sharding map, that maps a file, folder, or other storage resource referenced by the I/O request to the selected one of the FSVMs).

In particular embodiments, the initial FSVM to receive the request from the user VM may be determined by selecting any of the FSVMs on the network, e.g., at random, by round robin selection, or by a load-balancing algorithm, and sending an I/O request to the selected FSVM via the network or via local communication within the host machine. Local communication may be used if the file or folder referenced by the I/O request is local to the selected FSVM, e.g., the referenced file or folder is located on the same host machine as the selected FSVM. In this local case, the I/O request need not be sent via the network. Instead, the I/O request may be sent to the selected FSVM using local communication, e.g., a local communication protocol such as UNIX domain sockets, a loopback communication interface, inter-process communication on the host machine, or the like. The selected FSVM may perform the I/O transaction specified in the I/O request and return the result of the transaction via local communication. If the referenced file or folder is not local to the selected FSVM, then the selected FSVM may return a result indicating that the I/O request cannot be performed because the file or folder is not local to the FSVM. The user VM may then submit a REFERRAL request or the like to the selected FSVM, which may determine which FSVM the referenced file or folder is local to (e.g., by looking up the FSVM in a distributed mapping table), and return the identity of that FSVM to the user VM in a REDIRECT response or the like. Alternatively, the selected FSVM may determine which FSVM the referenced file or folder is local to, and return the identity of that FSVM to the user VM in the first response without the REFERRAL and REDIRECT messages. Other ways of redirecting the user VM to the FSVM of the referenced file are contemplated. For example, the FSVM that is on the same host as the requesting user VM (e.g., local to the requesting user VM) may determine which FSVM the file or folder is local to, and inform the requesting user VM of the identity of that FSVM without communicating with a different host.

In particular embodiments, the file or folder referenced by the I/O request includes a file server name that identifies a virtualized file server on which the file or folder is stored. The file server name may also include or be associated with a share name that identifies a share, file system, partition, or volume on which the file or folder is stored. Each of the user VMs on the host machine may send a host name lookup request, e.g., to a domain name service, that includes the file server name, and may receive one or more network addresses of one or more host machines on which the file or folder is stored.

In particular embodiments, as described above, the FSVM may send the I/O request to a selected one of the FSVMs. The selected one of the FSVMs may be identified by one of the host machine network addresses received above. In one aspect, the file or folder is stored in the local storage of one of the host machines, and the identity of the host machines may be determined as described below.

In particular embodiments, when the file or folder is not located on storage local to the selected FSVM, e.g., when the selected FSVM is not local to the identified host machine, the selected FSVM responds to the I/O request with an indication that the file or folder is not located on the identified host machine. Alternatively, the FSVM may look up the identity of the host machine on which the file or folder is located, and return the identity of the host machine in a response.

In particular embodiments, when the host machine receives a response indicating that the file or folder is not located in the local storage of the selected FSVM, the host machine may send a referral request (referencing the I/O request or the file or folder from the I/O request) to the selected FSVM. When the selected FSVM receives the referral request, the selected FSVM identifies one of the host machines that is associated with a file or folder referenced in the referral request based on an association that maps files to host machines, such as a sharding table (which may be stored by the centralized coordination service). When the selected FSVM is not local to the host machine, then the selected FSVM sends a redirect response that redirects the user VM on the host machine to the machine on which the selected FSVM is located. That is, the redirect response may reference the identified host machine (and by association the selected second one of the FSVMs). In particular embodiments, the user VM on the host machine receives the redirect response and may cache an association between the file or folder referenced in the I/O request and the host machine referenced in the redirect response.

In particular embodiments, the user VM on the host machine may send a host name lookup request that includes the name of the identified host machine to a name service, and may receive the network address of the identified host machine from the name service. The user VM on the host machine may then send the I/O request to the network address received from the name service. The FSVM on the host machine may receive the I/O request and performs the I/O transaction specified therein. That is, when the FSVM is local to the identified host machine, the FSVM performs the I/O transaction based on the I/O request. After performing or requesting the I/O transaction, the FSVM may send a response that includes a result of the I/O transaction back to the requesting host machine. I/O requests from the user VM may be generated by a client library that implements file I/O and is used by client program code (such as an application program).

Particular embodiments may provide dynamic referral type detection and customization of the file share path. When a user VM (e.g., client or one of the user VMs) sends a request for a storage access operation specifying a file share to a FSVM node in the VFS cluster of FSVM nodes, the user VM may be sent a referral to another FSVM node that is assigned to the relevant file share. Certain types of authentication may use either host-based referrals (e.g., Kerberos) or IP-based referrals (e.g., NTLM). In order to flexibly adapt to any referral type, particular embodiments of the FSVMs may detect the referral type in an incoming request and construct a referral response that is based on the referral type and provide the referral. For example, if the user VM sends a request to access a storage item at a specified file share using an IP address, particular embodiments may construct and provide an IP address-based referral; if the user VM sends a request to access the storage item at the specified file share using a hostname, then particular embodiments may construct and provide a hostname-based referral, including adding the entire fully qualified domain name.

For example, if a user VM sends a request for File-A2-1 (which resides on Node-2) to Node-1 using a hostname-based address \fs1\share-1\File-A2-1, VFS may determine that File-A2-1 actually resides on Node-2 and send back a referral in the same referral type (hostname) as the initial request: \\fs2.domain.com\share-1\File-A2-1. If a user VM sends a request for File-A2-1 to Node-1 using an IP-based address \\198.82.0.23\share-1\File-A2-1, after determining that File-A2-1 actually resides on Node-2, VFS may send back a referral in the same referral type (IP) as the initial request: \\198.82.0.43\share-1\File-A2-1.

In particular embodiments, the hostname for the referral node may be stored in a distributed cache in order to construct the referral dynamically using hostname, current domain, and share information.

Accordingly, examples of distributed virtualized file server systems have been described with reference to FIGS. 1-15. Examples of virtualized file server systems may include a cluster of file server virtual machines used to implement a file system in a distributed manner.

Examples described herein describe examples of systems and methods which may be used to backup virtualized file server systems, such as those described with reference to FIGS. 1-15. Examples described herein may allow a client system to specify a number of threads available for a backup process. Based on that number, a server may generate a number of streams of backup data and utilize those streams to maintain a number of parallel threads to perform a backup that efficiently utilizes time and network resources.

Figure 16:
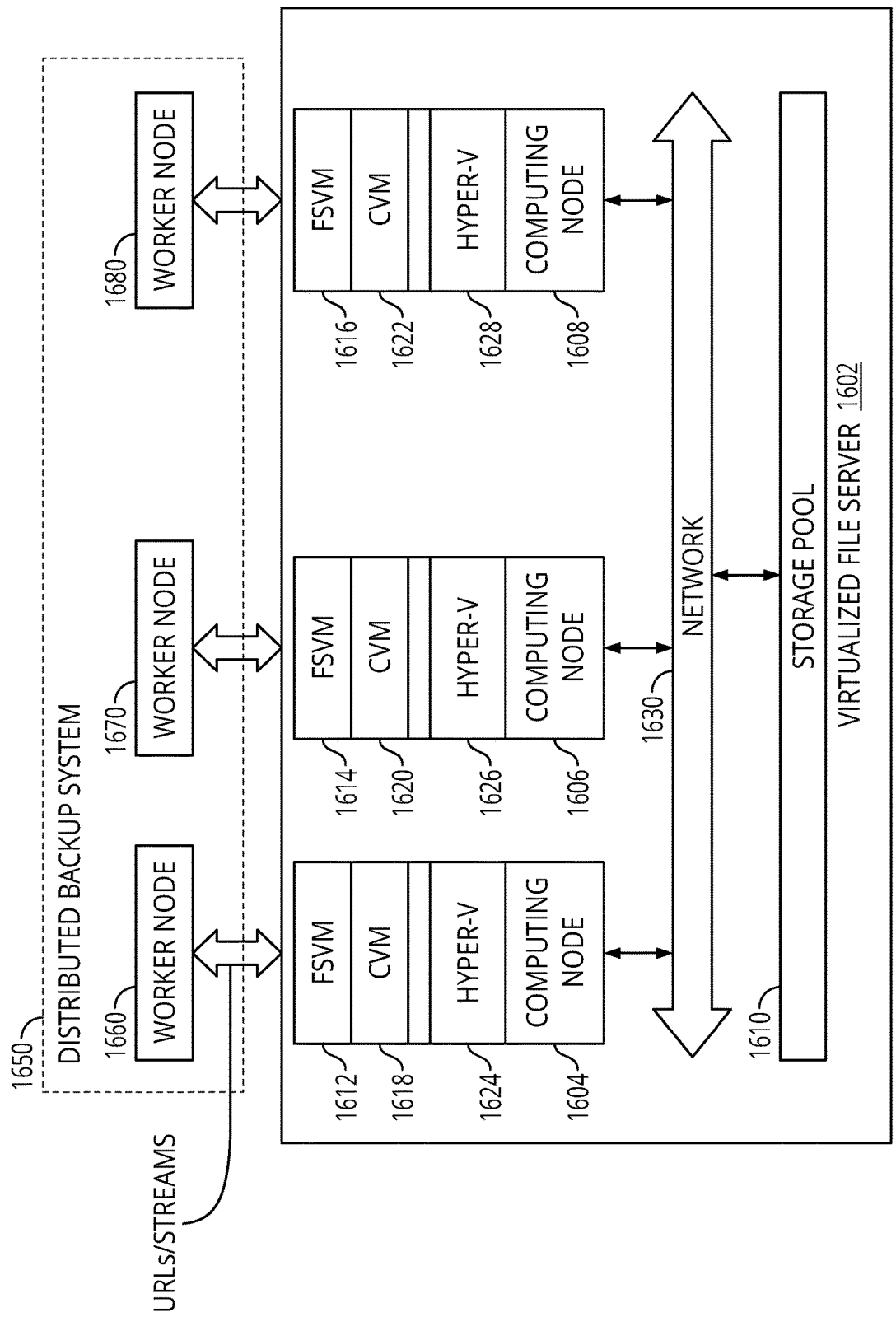
FIG. 16 is a block diagram of a distributed FSVM system communicatively coupled to a distributed backup system, according to one illustrated embodiment.

FIG. 16 shows a block diagram of a distributed FSVM system communicatively coupled to a distributed backup system 1650, according to one illustrated embodiment. The backup system 1650 may be coupled to the virtualized file server 1602 over any type of network, wired or wireless. The virtualized file server 1602 may in some examples be implemented using any of the virtualized file servers described herein, such as with reference to FIGS. 1-15. The virtualized file server 1602 of FIG. 16 includes computing node 1604 having FSVM 1612, CVM 1618, and hypervisor 1624. The virtualized file server 1602 of FIG. 16 includes computing node 1606 having FSVM 1614, CVM 1620, and hypervisor 1626. The virtualized file server 1602 of FIG. 16 includes computing node 1608 having FSVM 1616, CVM 1622, and hypervisor 1628. The computing nodes 1604, 1606, and 1608 may be in communication with storage pool 1610 over network 1630. Local storage of any of the computing nodes 1604, 1606, and 1608 may also form part of storage pool 1610. In some examples, the computing nodes 102, 104, and 106 of FIG. 1 and/or FIG. 3 may be used to implement the computing nodes 1604, 1606, and 1608. The storage 156 of FIG. 1 and/or FIG. 3 may be used to implement storage pool 1610.

The backup system 1650 may include multiple worker computing nodes, such as nodes 1660, 1670, and 1680 in FIG. 16, although any number may be present. The computing nodes of the distributed backup system 1650 may include various resources, such as, CPU, memory, storage and network resources. The worker nodes may be deployed with the operating system, binaries, and internally managed databases to create a hyperconverged data protection platform. For example, the backup system 1650 may itself be a scale-out storage architecture for delivering web-scale data protection services. In some examples, the backup system 1650 may include multiple Hard Disk Drives (HDD) attached to each worker node to form a storage pool and act as a single mount path, in an analogous manner to other distributed systems described herein, such as with reference to FIGS. 1-15. The storage pool may start small and expand dynamically as needed. Additionally, multiple generations of hardware may be mixed in a single pool to rapidly benefit from newer architectures and drive densities.

The scale-out architecture of the backup system 1650 may, for example, be operated by a third party vendor that communicates with the distributed file server 1602. Examples described herein contemplate leveraging the scale-out architecture of the backup system 1650 together with the scale-out architecture of the virtualized file server 16502 to implement an efficient backup of data stored across the computing nodes of the virtualized file server 1602.

The virtualized file server 1602 may implement parallel Change File Tracking (CFT). The CFT process facilitates parallel and concurrent backup of the scale-out virtualized file server 1602 using underlying snapshot technology. The CFT process may allow for point-in-time backup of all files and directories stored in the virtualized file server 1602. The point-in-time backup provides a time record of the backup time of each file. Additionally, all files may be backed up, irrespective of state. For example, "in use" files may also be backed up.

As will be explained further below the CFT process provides for a smart incremental backup by tracking changes (e.g., all changes) to the files and directories in the virtualized file server since the last snapshot. The CFT process allows for users to backup only the incremental changes rather than having to backup the entirety of changed and unchanged files stored in the virtualized file server 1602. In contrast, legacy technology (e.g., NDMP) may have utilized a scan of the entire virtualized file server 1602 for all changed files every time a backup is initiated which may slow the backup process down considerably. As such, CFT may provide a substantial reduction in time to backup and a reduction in the amount of space allocated or used for backup.

The CFT method utilized by the virtualized file server 1602 may utilize multiple concurrent streams to a single VM (e.g., FSVM 1612) and multiple parallel backup streams to multiple FSVMs (e.g., FSVM 1612, 1614, and 1616) of the virtualized file server 1602. For example, each FSVM may support two backup streams. If 15 FSVMs are included in the cluster (only 3 are shown in FIG. 16), a total of 32 parallel backup streams may be provided for the virtualized file server 1602. Any number of streams to a single VM and parallel streams to multiple VMs may generally be supported.

Generally, to back up a computing node of the virtualized file server 1602 using CFT, the backup system 1650 may first implement a full backup (e.g., a backup of the storage pool 1610). After that, the backup system (e.g., one or more of the worker nodes 1660, 1670, and 1680) may instruct the computing nodes of the virtualized file server 1602 to take a new snapshot and determine a diff of files and directories that changed since the last backup. Accordingly, the FSVMs and/or CVMs of the virtualized file server may analyze the storage pool 1610, compare the files hosted by the FSVMs in the virtualized file server 1602 with a previous snapshot and generate a list of changed files in the virtualized file server 1602 since the last snapshot. The FSVMs and/or CVMs of the virtualized file server 1602 (and/or a lead FSVM and/or CVM) mat provide the identity of changed files to the distributed backup system 1650. Once the backup system 1650 obtains the identification of changed files, the backup system 1650 may implement parallel and concurrent backups of the changed files and directories in each of the computing nodes across the virtualized file server 1602. This feature may be available based on an input parameter provided to the API called by the backup system 1650 on the virtualized file server 1602.

Figure 17:
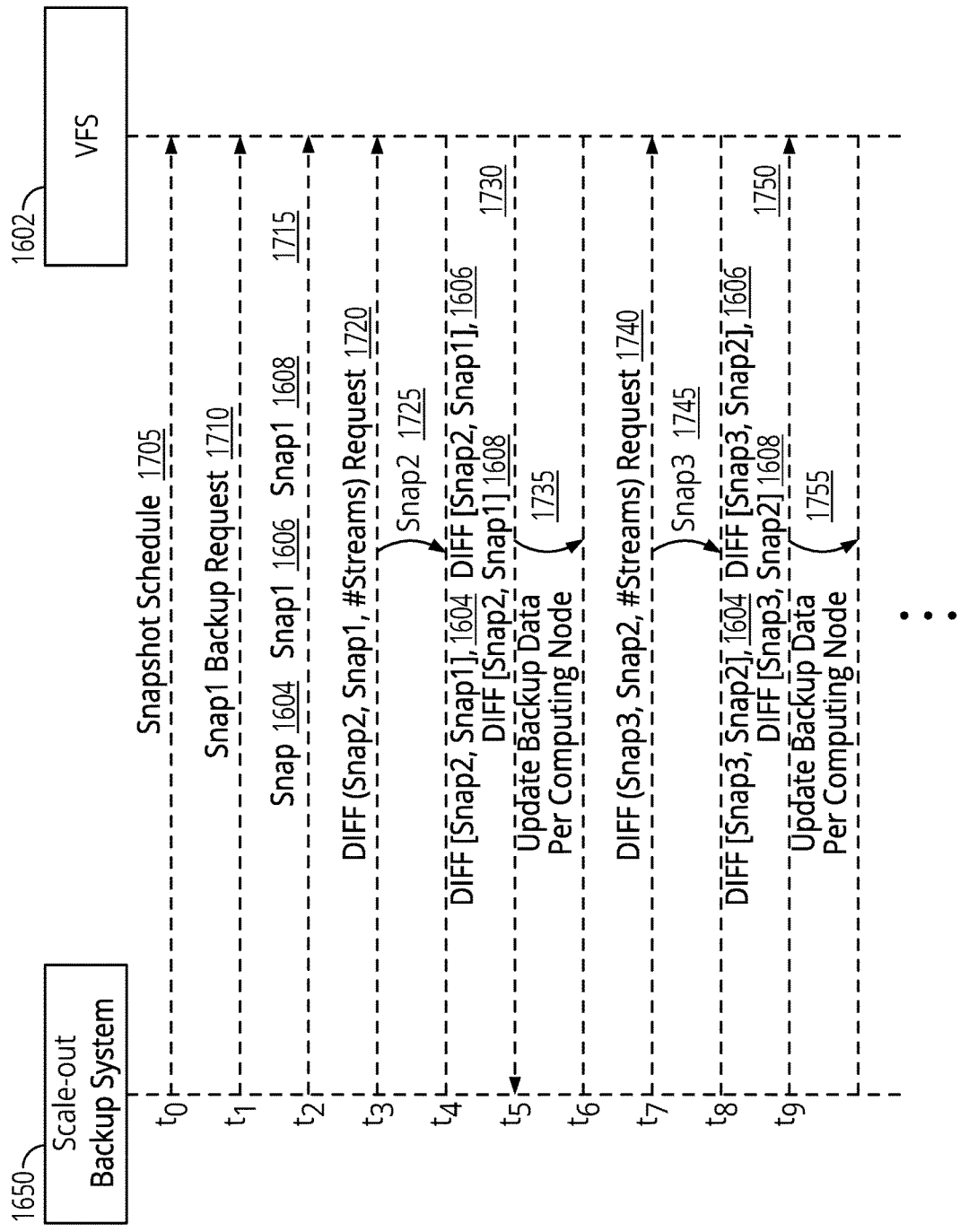
FIG. 17 is a directional flow diagram of transmissions by and between the FSVM system and the distributed backup system, according to one illustrated embodiment.

FIG. 17 illustrates a directional flow diagram of transmissions by and between the virtualized file server 1602 and the backup system 1650, according to one illustrated embodiment. Communications to the backup system 1650 may occur to a computing node of the backup system 1650 (e.g., a lead node) and/or to an administrative interface exposed by the backup system 1650. Communications to the virtualized file server 1602 may occur to one or more FSVMs and/or CVMs (e.g., a lead FSVM and/or CVM) and/or may be provided to an administrative node or interface exposed by the VFS 1602.

In one example, each backup node of the backup system 1650 may communicate with a respective one of the computing nodes of the VFS 1602 via REST calls to associated APIs. While examples of backup systems interacting with and backing up virtualized file servers are described herein, it is to be understood that analogous APIs may be used for backup systems to communicate with and backup generally any kind of distributed system. Each backup computing node may receive a DIFF of first and second snapshots of the files stored at local storage of respective computing nodes of the VFS 1602 and/or managed by FSVMs hosted on the respective computing node. For example, each computing node of the VFS 1602 may provide the identification of changed files hosted by and/or stored at that node (e.g., DIFF files) and provide them to a corresponding one or more nodes of the backup system 1650. In this manner, the computing nodes of the VFS 1602 may transmit a per computing node identification of DIFF files to the respective backup nodes of the backup system 1650. Referring to FIG. 16, FSVM 1612 and/or CVM 1618 may provide to worker node 1660 an identification of DIFF files hosted by the computing node 1604 (e.g., stored in local storage of the computing node 1604 and/or managed by the FSVM 1612). It will be appreciated that a list of DIFF files refers to a listing of those files that include data which was changed between a snapshot and a subsequent (e.g., successive) snapshot ("first and second snapshots"). As such, responsive to receipt of the list of DIFF files, the backup system 1650 may backup those particular files that have changed since last snapshot rather than backing the entirety of files, which may include changed and unchanged files.

Optionally, at 1705, the backup system 1650 may transmit a snapshot schedule to the VFS 1602. For example, the backup system may instruct the VFS 1602 (e.g. by communicating with one or more FSVMs, CVMs and/or lead FSVMs and/or CVMs) to implement snapshots of the files within the computing nodes according to a particular schedule (e.g., daily at a particular time(s), or a particular time(s)/day(s) each week, month, quarter, etc.

In some embodiments, the VFS 1602 (e.g., one or more FSVMs) may take snapshots of all or portions of the storage pool 1610 responsive to real-time requests from the backup system 1650. For example, at 1710, the backup system 1650 may transmit a first snapshot request to the VFS 1602. At 1715, responsive to the first snapshot ("snap1") request, the VFS 1602 may perform a complete backup of the file system files stored in the storage pool 1610. In practice, the first snapshot or complete backup of all files may be a per computing node backup rather than a flat list of files. For example, responsive to a REST call, the listing of all files may be concurrently transmitted to the backup system 1650 in association with the respective computing node at which the file is stored and/or which manages access to the file rather than a flat list of files.

At 1720, the VFS 1602 (e.g., one or more FSVMs) may receive an indication of a number of URL streams (or worker nodes) supported by the backup system 1650. Each stream may in some examples be associated with a particular computing node of the backup system 1650 and/or a particular process running on the backup system 1650. The streams may each have a URL—e.g., a URL that the back-up system 1650 may use to call a computing node of the VFS 1602 associated with that stream. The VFS 1602 and/or the backup system 1650 may decide how to allocate the available streams among the various computing nodes of the VFS 1602. In some examples, available streams may be allocated evenly (or as evenly as possible) among the computing nodes of the VFS 1602 (e.g., one stream per node, two streams per node, three streams per node, etc.). In some examples, streams may be allocated in accordance with amount of data changed between snapshots hosted by each node of the VFS 1602 (e.g., a larger number of streams may be allocated to computing nodes hosting and/or storing a larger amount of file server data that had changed between snapshots and/or file server data relating to a DIFF file in need of backup). In some examples, streams may be allocated by shares or size of data within the shares. In some examples, in 1720, a DIFF request may be made for first and second snapshots (e.g., DIFF (snap2, snap 1, #streams)). Depending on the specific assignment of the URLs, each of the worker nodes may call a URL for a specific computing node, data share across multiple computing nodes, size of data across shares, etc.

At 1725, the VFS 1602 (e.g., one or more FSVMs) performs a second snapshot (snap2) or backup of files (e.g., all files) stored and/or hosted in a file system by the computing nodes of the VFS 1602. The VFS 1602 may perform a DIFF function to detect those files that have been changed since the previous first snapshot (snap1). At 1730, each computing node 1604, 1606, 1608 may send its own DIFF list of files (e.g., list of changed files between first and second snapshots) via the respective streams (e.g., URLs). Of course, depending on the assignment of URLs, each data share or size category of data across computing nodes may have its own DIFF list of files to transmit across the respective backup URL streams. Although reference is made to the example where each computing node transmits its own DIFF list, it will be appreciated that DIFF lists may be organized by any number of categorical arrangements.

At 1735, the worker nodes of the backup system 1650 may receive the respective DIFF lists of changed files, in parallel, from respective computing nodes and perform an update of the stored snap1 backup files based on the DIFF list(s). For example, the worker nodes may implement concurrent and incremental updates to the already backed up data from snap1 by updating those files which have changed, as indicated by the respective computing nodes. For example, the worker nodes may each have a respective DIFF list, may request the files on the DIFF list from their associated computing node in the VFS 1602, receive the changed files, and replace the old file with the changed file in the backup system 1650. Multiple nodes of the back-up system 1650 are able to receive changed files from multiple nodes of the VFS 1602 in parallel, speeding the overall backup process. The VFS 1602 may receive the URL calls for snap2 from the worker nodes in parallel, allowing for efficient incremental backup of a distributed FSVM architecture.

The actions 1720-1735 may be repeated responsive to a subsequent (e.g., successive) third snapshot request (DIFF (snap3,snap2, #streams)), as illustrated in 1740-1755 of FIG. 2. It will be appreciated that 1720-1735 may be repeated for any number of subsequent snapshot requests where the subsequent snapshots are compared to a prior (e.g., an immediately prior) snapshot. In some examples, the VFS 1602 may run a comparison between two subsequent snapshots, and using methods described herein, provide DIFF lists of changed files for each of the computing nodes 1604, 1606, 1608. The DIFF lists may be leveraged by the worker nodes for incremental revisions or updates to the backed up files already stored in the backup system 1650.

An example implementation may include a backup system 1650 first calling a partner server registration API to identify the vendor name and basic information. This may allow a CFT backup feature to be enabled at the VFS 1602. For backing up NFS exports, the partner server may specify the backup client's IP addresses, access needed, and any backup AD user (e.g., for NFS AD authentication).

Once a backup begins, the backup system 1650 may implement a REST call to the file system of the VFS 1602 (e.g., to one or more file server VMs) to take a snapshot of a share (e.g., mount-target, which the backup vendor wishes to start backing up) by specifying a snapshot name, for example, (mount-target-name: target1, snapshot: snap1).

To backup the data, backup software may leverage the SMB client (for SMB mount-targets) and NFS client (for nfs mount-targets). The backup client may start the full backup by mounting \\afs-fs\target1 (or /afs-fs/export for NFS exports) and locating the correct snapshot in directory .snapshot/snap1. For the incremental backups, backup software may implement a subsequent REST call to take a snapshot or snap2 of target1.

Once the snapshot is taken, the backup software may issue another REST call to get the list of the files changed between the two snapshots (e.g., between snap2 as current snapshot and snap1 as base snapshot).

As an output of this API, the VFS 1602 instance may return a URL. This URL may be an ephemeral URL and would last until the backup software obtains the complete CFT information between the two subsequent snapshots. This API may, for example, be paginated and return up to a particular number (e.g., 300) objects per page while including a token to call the next page. The number of objects returned may be configurable, e.g., by a backup system described herein. Backup systems described herein may include a parameter in an API request to a virtualized file server which indicates a number of objects per page to return. For example, the page size can be configured as part of the API. For example, the diffs may be paginated. After each page, an example virtualized file server may send a token for a next page. The token request for a next page may recur until a last page is returned in some examples.

Once the list is obtained, the backup system 1650 may start backing up the modified objects using the SMB client for SMB shares or NFS client for NFS exports as made available by the FSVMs and/or CVMs of the VFS 1602. The backup system 1650 may start backing up files as soon as the first page is received in some examples. Finally, upon completing the incremental backup, the base snapshot (e.g., snap1) may be deleted.

Figure 18:
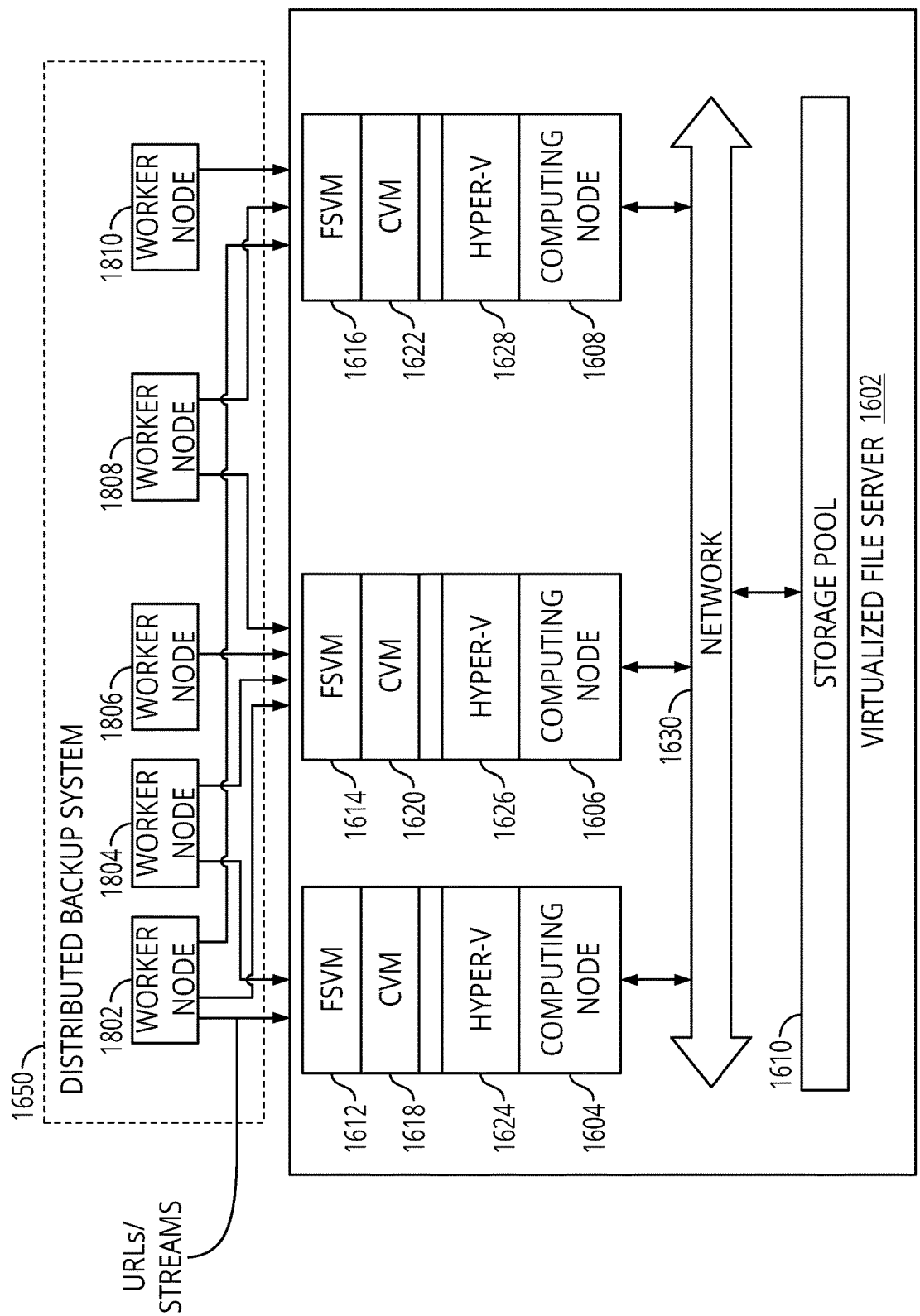
FIG. 18 is a block diagram of the distributed FSVM system of FIG. 16, where a number of worker nodes exceed a number of computing nodes, according to one illustrated embodiment.

In some examples, the VFS 1602 (e.g., one or more FSVMs) may determine an arrangement for parallel processing of backup data based on the number of streams supported by the backup system 1650 (e.g., worker nodes)s. FIG. 18 shows a block diagram of the distributed FSVM system of FIG. 16, where the number of worker nodes of the distributed backup system 1650 exceed the number of computing nodes of the virtualized file server, according to one illustrated embodiment. For example, if there are more supported streams (URLs) or worker nodes available on the backup system 1650 than computing nodes of the virtualized file server 1602, or computing nodes having files for backup, the virtualized file server 1602 may allocate more than one stream (e.g. URL) to a particular computing node.

In some examples, the FSVMs 1612, 1614, 1616 may allocate URLs to the worker nodes 1802-1810 and the computing nodes 1604, 1606, 1608. The VFS 1602 (e.g., a lead FSVM and/or admin system of the VFS 1602) may receive an identification of a number of available worker nodes in the distributed backup system 1650 (e.g., 5 nodes in the example of FIG. 18). The VFS 1602 may identify nodes having change files for backup and allocate streams to nodes in accordance with availability of the nodes, share size hosted by the nodes (e.g., share of the storage pool 1610 managed by the nodes), and/or size of data implicated by the DIFF file. The CVMs and/or FSVMs may receive an incremental backup request of the computing nodes in the distributed FSVM system and transmit respective lists of files via the allocated streams (e.g., URLs) to the worker nodes. The FSVMs may be tasked with determining and executing efficient distribution of the URLs between worker nodes and computing nodes based on the number of available worker nodes at the backup system.

In some examples, VFS 1602 may determine for the backup system 1650 a parallel processing arrangement for any given number of available URLs (e.g., streams). In the event the number of streams are greater or even less than the number of worker nodes, the FIG. 17 example process may still apply.

In another embodiment, the VFS 1602 may include a URL distribution layer (UDL) 305. The UDL may be a component or fabric within the FSVM architecture that is common or shared between the computing nodes 1604, 1606, 1608. The UDL may determine and execute distribution of the streams (e.g., URLs) between worker nodes and computing nodes based on the number of available worker nodes at the backup system. Accordingly, the UDL may perform the distribution in accordance with (e.g., as requested by) API calls described herein between backup systems and virtualized file servers.

In one embodiment, the allocated URLs for a single FSVM computing node may be allocated to particular shares of files within the FSVM. Alternatively and/or additionally, the URLs could be assigned by shares, by size of data within FSVM, or by size of data within the shares, and/or amount of data changed between two snapshots. It is contemplated that the FSVMs and/or UDLs of the VFS 1602 may allocate the parallel processing between the worker nodes and the FSVM nodes with change files to achieve load balancing (e.g., the FSVM nodes to be equally loaded and all worker nodes busy).

As mentioned above, each of the worker nodes may call a URL and each computing node may send its own DIFF list of files (between first and second snapshots) via the URL. Alternatively and/or additionally, each DIFF list of files may be per share, per data size category across computing nodes, or per data size categories within shares, to name a few examples. The distributed FSVM system may receive the URL calls from the worker nodes in parallel, allowing for efficient incremental backup of a distributed FSVM architecture. Ultimately, the computing nodes of a VFS transmit respective lists of DIFFS or changed files to the respective backup nodes of a backup system.

This disclosure further contemplates examples where the VFS 1602 may transmit to the worker nodes of the backup system 1650 the DIFF data itself, in addition to the DIFF listing of changed files. In other words, the VFS 1602 may send the actual bytes that changed in the particular changed files to the worker nodes for backup. The VFS 1602 may identify the actual changed data when formulating the DIFF list of changed files to transmit to the backup system 1650. Because the VFS 1602 determines the DIFF files by taking the DIFF between subsequent snapshots, the actual changed data may already be calculated and known to the VFS 1602 which, in turn, may forward to the appropriate worker node for backup.

Generally, CFT (Change File Tracking) reports the files changed between two file system snapshots and provides a flat list of changed files to a backup server. The entire file list from the first snapshot may be stored at a backup system, while the incremental changes are made to that original entire backup list based on the subsequent snapshots of a VFS. By leveraging examples and systems described herein, per file reported, the data blocks changed may also be reported for the respective file. This feature allows for the backup system to perform incremental backup and may substantially reduce the backup time, as the backup system may read the particular data which has changed in terms of Files and blocks within the files. This may be performed as a list of parameters including start offset and bytes changed, for example.

For example, a backup vendor may typically be provided the DIFF of snapshot to show what files have changed. Then, the backup vendor may backup the entire changed file. Examples described herein may advantageously allow the backup vendor to back up only specific bytes that changed in the file. As such, examples described herein may reduce an amount of data the backup vendor processes by causing the file system to specifically communicate to the backup vendor the actual blocks changed in the file.

What is claimed is:

1. At least one non-transitory computer readable medium encoded with executable instructions that, when executed by a processor, cause a system to perform operations comprising:
   receiving, at a distributed system including a plurality of computing nodes, an incremental backup request;
   allocating URLs to available worker nodes of the distributed system available to perform parallel backup;
   assigning a respective URL of the allocated URLs to each computing node of the plurality of computing nodes having an identified change file, the assigning comprising providing multiple parallel backup streams to respective virtual machines of the distributed system;
   using, in parallel and at the available worker nodes, the respective URLs allocated to the worker nodes to call each computing node having the identified change file; and
   transmitting, by each computing node in parallel, respective lists of files via the respective URLs to the worker nodes, wherein transmitting one or more of the respective lists includes providing multiple parallel backup streams to respective computing nodes of the distributed system and transmitting data that changed since a prior snapshot, and wherein receipt of at least one of the respective lists of files causes an update to a stored file based on the data that changed.

2. The at least one non-transitory computer readable medium of claim 1, wherein the incremental backup comprises a backup of changes between successive snapshots.

3. The at least one non-transitory computer readable medium of claim 1, wherein assigning the respective URL of the allocated URLs to each computing node of the plurality of computing nodes having the identified change file comprises assignment by shares, by size of data within the respective computing nodes, or by size of data within the shares or amount of data changed between snapshots.

4. The at least one non-transitory computer readable medium of claim 1, wherein assigning the respective URL of the allocated URLs to each computing node of the computing nodes having the identified change file comprises providing multiple concurrent streams to a single virtual machine within respective computing nodes.

5. The at least one non-transitory computer readable medium of claim 1, wherein each computing node of the computing nodes is further configured to transmit to the worker nodes a list of files that changed since the prior snapshot.

6. The at least one non-transitory computer readable medium of claim 1, wherein each computing node of the computing nodes is further configured to transmit to the worker nodes the data that changed from the list of files that changed since the prior snapshot.

7. A method for parallel incremental backup of respective computing nodes within a distributed system, the method comprising:
   receiving an incremental backup request;
   allocating URLs to available worker nodes of the distributed system available to perform parallel backup;
   assigning a respective URL of the allocated URLs to each computing node of a plurality of computing nodes having an identified change file, the assigning comprising providing multiple parallel backup streams to respective virtual machines of the distributed system;
   using, in parallel and at the available worker nodes, the respective URLs allocated to the worker nodes to call each computing node having the identified change file; and
   transmitting, by each computing node in parallel, respective lists of files via the respective URLs to the worker nodes, wherein transmitting one or more of the respective lists includes providing multiple parallel backup streams to respective computing nodes of the distributed system and transmitting data that changed since a prior snapshot, and wherein receipt of at least one of the respective lists of files causes an update to a stored file based on the data that changed.

8. The method of claim 7, wherein responsive to the incremental backup request, transmitting to the distributed backup system a listing of files changed between successive snapshots.

9. The method of claim 7, further comprising transmitting to the distributed backup system the data that changed from the list of files that changed between successive snapshots.

10. The method of claim 7, wherein assigning the respective URL of the allocated URLs to each computing node of the computing nodes having the identified change file comprises assignment by shares, by size of data within the respective computing nodes, or by size of data within the shares.

11. The method of claim 7, wherein assigning the respective URL of the allocated URLs to each computing node of the computing nodes having the identified change file comprises providing multiple concurrent backup streams to a single virtual machine within respective computing nodes.

12. A system for parallel backup of computing nodes in a distributed system, the system comprising:
   a virtual machine configured to:
      allocate URLs between worker nodes available to perform parallel backup and computing nodes;
      assign a respective URL of the allocated URLs to each computing node of the computing nodes having an identified change file, the assigning comprising providing multiple parallel backup streams to respective virtual machines of the distributed system;
      use, in parallel and at the available worker nodes, the respective URLs allocated to the worker nodes to call each computing node having the identified change file; and
      receive an incremental backup request and transmit, by each computing node, respective lists of files via the respective URLs to the worker nodes, wherein transmitting one or more of the respective lists includes providing multiple parallel backup streams to respective computing nodes of the distributed system and transmitting data that changed since a prior snapshot, and wherein receipt of at least one of the respective lists of files causes an update to a stored file based on the data that changed.

13. The system of claim 12, wherein the virtual machine is configured to perform the incremental backup based on detected changes between successive snapshots.

14. The system of claim 12, wherein the virtual machine is configured to assign the respective URL of the allocated URLs to each computing node of the computing nodes having the identified change file by shares, size of data within the respective computing nodes, or by size of data within the shares.

15. The system of claim 12, further comprising a user virtual machine, the user virtual machine configured to receive multiple concurrent streams from a single one of the worker nodes.

16. The system of claim 12, further comprising a user virtual machine configured to receive the multiple parallel backup streams from the worker nodes.

17. The system of claim 12, wherein the virtual machine is configured to transmit to the worker nodes a list of files that changed between successive snapshots.

18. The system of claim 12, wherein the virtual machine is configured to transmit to the worker nodes the data that changed from the list of files that changed between successive snapshots.

19. At least one non-transitory computer readable medium encoded with executable instructions that, when executed by a processor, cause a system to perform operations comprising:
　receiving, at a distributed system, an indicator of a number of available worker nodes of a distributed backup system and an incremental backup request;
　allocating URLs to the available worker nodes of the distributed system available to perform parallel backup; and
　assigning a respective URL of the allocated URLs to each computing node of a plurality of computing nodes having an identified change file,
　wherein the assigning comprises providing multiple parallel backup streams to resp ve virtual machines of the distributed system;
　wherein the available worker nodes are configured to use, in parallel, the respective URLs allocated to the worker nodes to call each computing node having the identified change file,
　wherein each computing node of the plurality of computing nodes is configured to transmit, in parallel, to the worker nodes one or more respective lists of files, including providing multiple parallel backup streams to respective computing nodes of the distributed system and transmitting data that changed since a prior snapshot from the identified change file via the respective URLs,
　wherein receipt of the data that changed causes an update to a stored file based on the data that changed.

20. The at least one non-transitory computer readable medium of claim 19, wherein the incremental backup comprises a backup of changes between successive snapshots.

21. The at least one non-transitory computer readable medium of claim 19, wherein assigning the respective URL of the allocated URLs to each computing node of the plurality of computing nodes comprises assignment by shares, by size of data within the respective computing nodes, or by size of data within the shares.

22. The at least one non-transitory computer readable medium of claim 19, wherein assigning the respective URL of the allocated URLs to each computing node of the computing nodes having the identified change file comprises providing multiple concurrent streams to a single virtual machine within respective computing nodes.

23. A method for parallel incremental backup of respective computing nodes within a distributed system including a plurality of computing nodes, the method comprising:
　receiving an incremental backup request;
　allocating URLs to available worker nodes of the distributed system available to perform parallel backup; and
　assigning a respective URL of the allocated URLs to each computing node of a plurality of computing nodes having an identified change file,
　wherein the assigning comprises providing multiple parallel backup streams to resp ve virtual machines of the distributed system;
　wherein the available worker nodes are configured to use, in parallel, the respective URLs allocated to the worker nodes to call each computing node having the identified change file, wherein each computing node of the plurality of computing nodes is configured to transmit, in parallel, to the distributed system, including to the worker nodes in the distributed system, one or more respective lists of files, including providing multiple parallel backup streams to respective computing nodes of the distributed system and transmitting data that changed from a prior snapshot from the identified change file via the respective URL, wherein receipt of the data that changed causes an update to a stored file based on the data that changed.

24. The method of claim 23, wherein responsive to the incremental backup request, transmitting to the distributed system the changed data between successive snapshots.

25. The method of claim 23, wherein assigning the respective URL of the allocated URLs to each computing node of the plurality of computing nodes having the identified change file comprises assignment by shares, by size of data within the respective computing nodes, or by size of data within the shares.

26. The method of claim 23, wherein assigning the respective URL of the allocated URLs to each computing node of the computing nodes having the identified change file comprises providing multiple concurrent backup streams to a single virtual machine within respective computing nodes.

* * * * *